US008823892B2

(12) United States Patent
Kim et al.

(10) Patent No.: US 8,823,892 B2
(45) Date of Patent: Sep. 2, 2014

(54) LIQUID CRYSTAL DISPLAY DEVICE

(75) Inventors: Dong-Gyu Kim, Yongin-si (KR); Hye-Seok Na, Suwon-si (KR); Mee-Hye Jung, Suwon-si (KR); Dong-Hyeon Ki, Cheonan-si (KR); Se-Hyoung Cho, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 311 days.

(21) Appl. No.: 13/155,868

(22) Filed: Jun. 8, 2011

(65) Prior Publication Data

US 2012/0013817 A1 Jan. 19, 2012

(30) Foreign Application Priority Data

Jul. 14, 2010 (KR) .................. 10-2010-0067661

(51) Int. Cl.
*G02F 1/136* (2006.01)
*G02F 1/1343* (2006.01)
*G02F 1/141* (2006.01)
*G02F 1/1362* (2006.01)
*G09G 3/36* (2006.01)
*G02F 1/139* (2006.01)

(52) U.S. Cl.
CPC ........ *G02F 1/1393* (2013.01); *G02F 1/136213* (2013.01); *G09G 3/3614* (2013.01); *G09G 2300/0426* (2013.01); *G09G 2300/0452* (2013.01); *G02F 1/136209* (2013.01); *G02F 1/13624* (2013.01); *G02F 1/134363* (2013.01); *G02F 1/136286* (2013.01)
USPC ............... 349/41; 349/37; 349/139

(58) Field of Classification Search
USPC ................. 349/139, 143, 37–43
See application file for complete search history.

(56) References Cited

U.S. PATENT DOCUMENTS

| 6,552,706 | B1 * | 4/2003 | Ikeda et al. .............. 345/96 |
| 6,922,183 | B2 * | 7/2005 | Ting et al. .............. 345/87 |
| 2006/0290863 | A1 | 12/2006 | HoeSup |
| 2008/0198283 | A1 * | 8/2008 | Yoon et al. .............. 349/37 |
| 2009/0262061 | A1 | 10/2009 | Chung et al. |
| 2010/0103085 | A1 | 4/2010 | Lee et al. |
| 2012/0200552 | A1 * | 8/2012 | Jung et al. .............. 345/211 |

OTHER PUBLICATIONS

Extended European Search Report for Application No. EP 11 17 3209 dated Mar. 6, 2012.

* cited by examiner

*Primary Examiner* — Dung Nguyen
(74) *Attorney, Agent, or Firm* — H.C. Park & Associates, PLC

(57) ABSTRACT

A liquid crystal display device includes a substrate, a gate line, first and second data lines, a first power line, first, second, third and fourth switching elements, and first, second, third and fourth pixel electrodes. The first switching element is connected to the gate line and the first data line. The second switching element is connected to the gate line and the first power line. The third switching element is connected to the gate line and the second data line. The fourth switching element is connected to the gate line and the first power line. The first to fourth pixel electrodes are connected to the first to fourth switching elements, respectively. Thus, a light leakage may be prevented and an aperture ratio of a display substrate may be enhanced.

45 Claims, 36 Drawing Sheets

LIQUID CRYSTAL DISPLAY DEVICE

CROSS REFERENCE TO RELATED APPLICATION

This application claims priority from and the benefit of Korean Patent Application No. 2010-67661, filed on Jul. 14, 2010, which is hereby incorporated by reference for all purposes as if fully set forth herein.

BACKGROUND OF THE INVENTION

1. Field of the Invention

Exemplary embodiments of the present invention relate to a liquid crystal display device (LCD). More particularly, exemplary embodiments of the present invention relate to an LCD capable of preventing light from being leaked.

2. Discussion of the Background

An LCD device is one of the most widely used types of flat panel display devices. The LCD device includes a display substrate on which electric field generating electrodes such as a first pixel electrode and a second pixel electrode are formed and an opposite substrate opposite to the display substrate. Moreover, the LCD device includes a liquid crystal (LC) layer interposed between the display substrate and the opposite substrate.

The LCD device displays images by applying voltages to the electric field generating electrodes to generate an electric field in the LC layer, which controls an orientation of LC molecules in the LC layer to affect a polarization of light passing therethrough.

The LC molecules of the LC layer may be operated in a vertical alignment (VA) mode due to an electric field formed between the first pixel electrode and the second pixel electrode. For example, the LCD panel displays a black image when the electric field is not formed between the first and second pixel electrodes, and the LCD panel displays images of various gradations when a horizontal electric field is formed between the first and second pixel electrodes.

However, since different voltages are applied to a first pixel part, which includes the first pixel electrode and the second pixel electrode, and a second pixel part formed adjacent to the first pixel part, light leakage may be generated between the first pixel part and the second pixel part.

SUMMARY OF THE INVENTION

Exemplary embodiments of the present invention provide a liquid crystal display (LCD) device capable of preventing light from being leaked.

Additional features of the invention will be set forth in the description which follows, and in part will be apparent from the description, or may be learned by practice of the invention.

An exemplary embodiment of the present invention discloses an LCD device including a substrate, a gate line, a first data line, a second data line, a first power line, a first switching element, a second switching element, a third switching element, a fourth switching element, a first pixel electrode, a second pixel electrode, a third pixel electrode and a fourth pixel electrode. The gate line is positioned on the substrate. The first data line, the second data line and the first power line are insulated from the gate line to cross with the gate line. The first switching element is connected to the gate line and the first data line. The second switching element is connected to the gate line and the first power line. The third switching element is connected to the gate line and the second data line. The fourth switching element is connected to the gate line and the first power line. The first pixel electrode, the second pixel electrode, the third pixel electrode and the fourth pixel electrode are respectively connected to the first switching element, the second switching element, the third switching element and the fourth switching element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
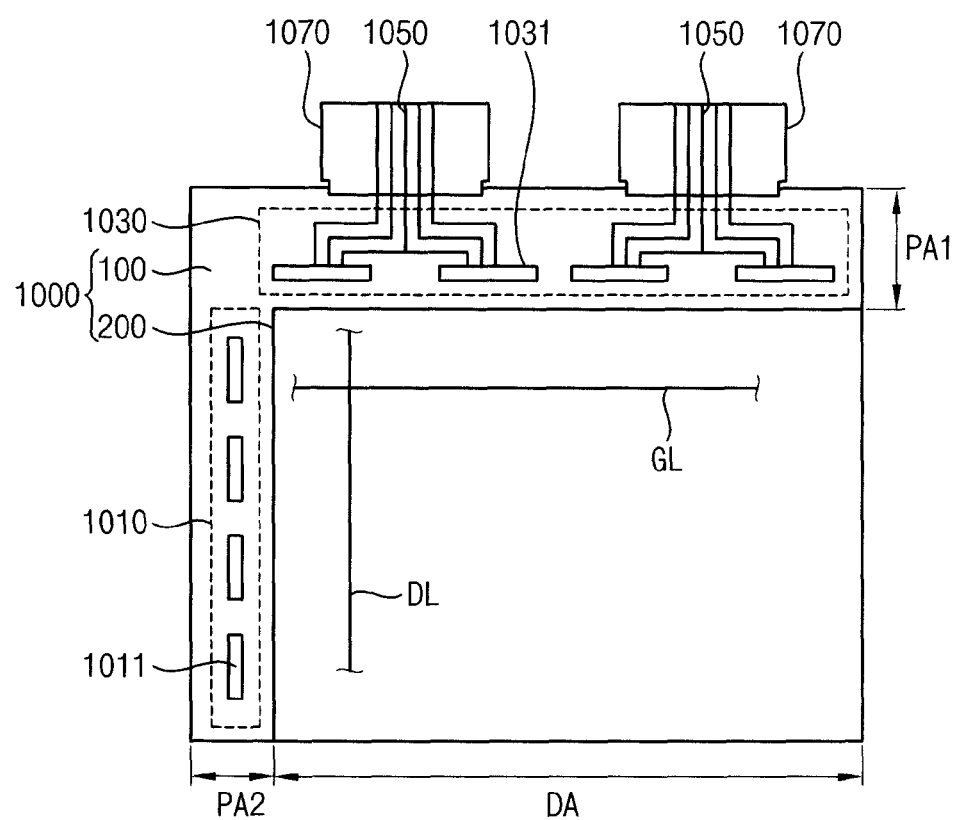
FIG. 1 is a plan view illustrating a liquid crystal display ("LCD") device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present.

Hereinafter, the present invention will be explained in detail with reference to the accompanying drawings.

FIG. 1 is a plan view illustrating a liquid crystal display ("LCD") device according to an exemplary embodiment of the present invention.

Referring to FIG. 1, the LCD device includes an LCD panel 1000, a gate driving part 1010 for driving the LCD panel 1000 and a data driving part 1030 for driving the LCD panel 1000.

The LCD panel 1000 includes a display substrate 100, an opposite substrate 200 (i.e., a color filter substrate) coupled with the display substrate 100, and a liquid crystal (not shown) disposed between the display substrate 100 and the opposite substrate 200. In this case, the LCD panel 1000 may include a display area DA, a first peripheral area PA1 and a second peripheral area PA2. The first and second peripheral areas PA1 and PA2 border perimeters of and may surround the display area DA.

A data line DL transmitting a data signal and a gate line GL transmitting a gate signal are formed in the display area DA. The data line DL is extended in a first direction DI1, and the gate line GL is extended in a second direction DI2 crossing the first direction DI1.

In this case, the first peripheral area PA1 is positioned at a first end portion of the data line DL, and the second peripheral area PA2 is positioned at a first end portion of the gate line GL. In FIG. 1, the second peripheral area PA2 is disposed at a left side of the display area DA when viewed on a plan view. Alternatively, the second peripheral area PA2 may be disposed at a right side of the display area DA.

The gate driving part 1010 includes a shift register in which plural stages are connected one after another to each other, and sequentially outputs the gate signal to the gate lines GLs. In this case, the gate driving part 1010 includes at least one gate driving chip 1011. The gate driving part 1010 is formed on the second peripheral area PA2. Alternatively, the gate driving part 1010 may include a plurality of thin-film transistors formed at the second peripheral area PA2 by a manufacturing process identical to a process for forming a thin-film transistor formed in the display area DA. That is, the gate driving part 1010 may be integrated on the second peripheral area PA2 of the display panel 1000 without the gate line driving chip. Thus, a mounting space for components is not required, so that a slim type display device may be realized.

Moreover, the gate driving chip 1011 may be attached on a tape carrier package (TCP) positioned between a printed circuit board (not shown) and an LCD panel 1000.

The data driving part 1030 outputs an analog type data signal to the data line DL in synchronization with the gate signal. The data driving part 1030 may include at least one data driving chip 1031.

The data driving chip 1031 may be directly attached on the first peripheral area PA1 of the LCD panel 1000 in a chip on glass ("COG") type panel. The data driving chips 1031 may be mounted on a flexible film 1070, and then may be attached on the LCD panel 1000. The flexible film 1070 may include a power line 1050. The power line 1050 may deliver voltages applied to a first bus line and a second line. Moreover, the power line 1050 may deliver voltage provided to the gate driving part 1010.

Figure 2:
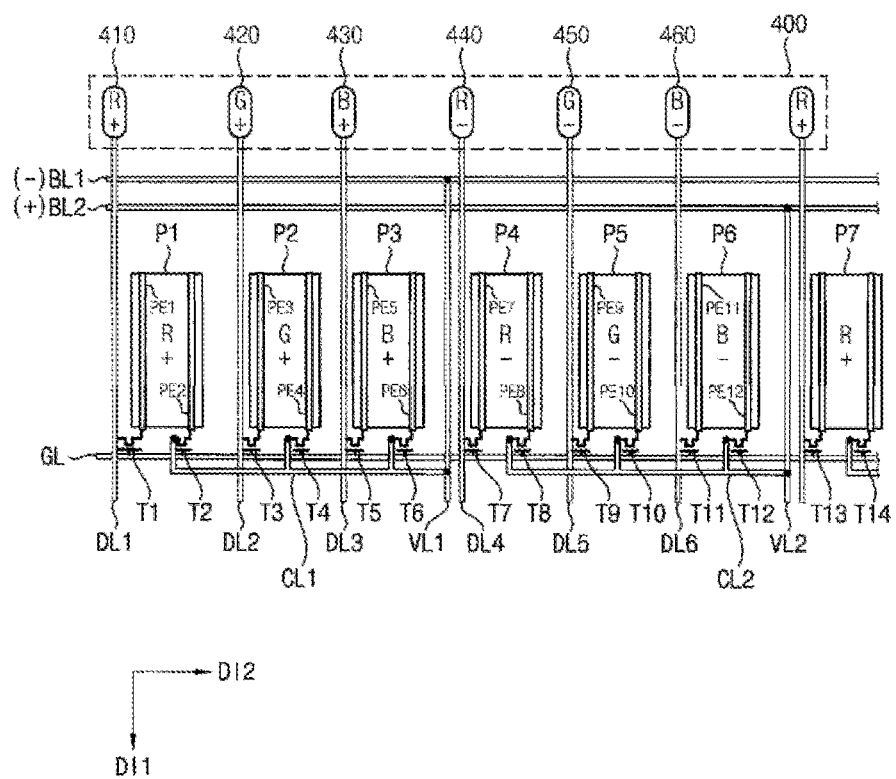
FIG. 2 is a schematic diagram of the LCD panel of FIG. 1.

FIG. 2 is a schematic diagram illustrating the LCD panel 1000 of FIG. 1.

Referring to FIGS. 1 and 2, the LCD panel 1000 includes a pad part 400, a plurality of data lines DL1, DL2, DL3, DL4, DL5 and DL6, a first bus line BL1, a second bus line BL2, a first power line VL1, a second power line VL2, a gate line GL and a plurality of pixel parts P1, P2, P3, P4, P5, P6 and P7.

The pad part 400 includes plural pads 410, 420, 430, 440, 450 and 460 receiving plural data voltages outputted from the data driving part 1030, respectively. A first pad 410 is connected to a first data line DL1, a second pad 420 is connected to a second data line DL2, and a third pad 430 is connected to a third data line DL3. A fourth pad 440 is connected to a fourth data line DL4, a fifth pad 450 is connected to a fifth data line DL5, and a sixth pad 460 is connected to a sixth data line DL6.

The first to sixth data lines DL1, DL2, DL3, DL4, DL5 and DL6 are extended in the first direction DI1, and are arranged in the second direction DI2.

The first bus line BL1 may be extended in the second direction DI2 to be disposed on the first peripheral area PA1. The second bus line BL2 may be extended in the second direction DI2 to be disposed on the first peripheral area PA1 adjacent to the first bus line BL1.

The first power line VL1 is connected to the first bus line BL1 to be extended in the first direction DI1. The second power line VL2 is connected to the second bus line BL2 to be extended in the first direction DI1. A plurality of pixel parts P4, P5 and P6 is arranged between the first and second power lines VL1 and VL2. Each of the first and second power lines VL1 and VL2 provides voltage to a plurality of pixel parts P1, P2 and P3, and P4, P5 and P6, respectively.

The gate line GL is extended in the second direction DI2.

The plural pixel parts P1, P2, P3, P4, P5 and P6 include primary color pixels. The primary color pixels may be a red pixel, a green pixel and a blue pixel.

A first pixel part P1 includes a first pixel electrode PE1, a second pixel electrode PE2, a first switching element T1 and a second switching element T2. The first pixel electrode PE1 is connected to the first data line DL1 and the gate line GL through the first switching element T1. The second pixel electrode PE2 is spaced apart from the first pixel electrode PE1 to be connected to the first power line VL1 and the gate line GL through the second switching element T2. The second switching element T2 is connected to the first power line VL1 through a first connection line CL1. A polarity of a voltage applied to the first pixel electrode PE1 and a polarity of a voltage applied to the second pixel electrode PE2 may be opposite to each other with respect to a reference voltage. For example, when a polarity of a voltage applied to the first pixel electrode PE1 is positive with respect to the reference voltage, a polarity of a voltage applied to the second pixel electrode PE2 may be negative.

A second pixel part P2 includes a third pixel electrode PE3, a fourth pixel electrode PE4, a third switching element T3 and a fourth switching element T4. The third pixel electrode PE3 is connected to the second data line DL2 and the gate line GL through the third switching element T3. The fourth pixel electrode PE4 is spaced apart from the third pixel electrode PE3 to be connected to the first power line VL1 and the gate line GL through the fourth switching element T4. The fourth switching element T4 is connected to the first power line VL1 through the first connection line CL1. A polarity of a voltage applied to the third pixel electrode PE3 and a polarity of a voltage applied to the fourth pixel electrode PE4 may be opposite to each other with respect to a reference voltage.

A third pixel part P3 includes a fifth pixel electrode PE5, a sixth pixel electrode PE6, a fifth switching element T5 and a sixth switching element T6. The fifth pixel electrode PE5 is connected to the third data line DL3 and the gate line GL through the fifth switching element T5. The sixth pixel electrode PE6 is spaced apart from the fifth pixel electrode PE5 to be connected to the first power line VL1 and the gate line GL through the sixth switching element T6. The sixth switching element T6 is connected to the first power line VL1 through the first connection line CL1. A polarity of a voltage applied to the fifth pixel electrode PE5 and a polarity of a voltage applied to the sixth pixel electrode PE6 may be opposite to each other with respect to a reference voltage.

A fourth pixel part P4 includes a seventh pixel electrode PE7, an eighth pixel electrode PE8, a seventh switching element T7 and an eighth switching element T8. The seventh pixel electrode PE7 is connected to the fourth data line DL4 and the gate line GL through the seventh switching element T7. The eighth pixel electrode PE8 is spaced apart from the seventh pixel electrode PE7 to be connected to the second power line VL2 and the gate line GL through the eighth switching element T8. The eighth switching element T8 is connected to the second power line VL2 through a second connection line CL2. A polarity of a voltage applied to the seventh pixel electrode PE7 and a polarity of a voltage applied to the eighth pixel electrode PE8 may be opposite to each other with respect to a reference voltage.

A fifth pixel part P5 includes a ninth pixel electrode PE9, a tenth pixel electrode PE10, a ninth switching element T9 and a tenth switching element T10. The ninth pixel electrode PE9 is connected to the fifth data line DL5 and the gate line GL through the ninth switching element T9. The tenth pixel electrode PE10 is spaced apart from the ninth pixel electrode PE9 to be connected to the second power line VL2 and the gate line GL through the tenth switching element T10. The tenth switching element T10 is connected to the second power line VL2 through the second connection line CL2. A polarity of a voltage applied to the ninth pixel electrode PE9 and a polarity of a voltage applied to the tenth pixel electrode PE10 may be opposite to each other with respect to a reference voltage.

A sixth pixel part P6 includes an eleventh pixel electrode PE11, a twelfth pixel electrode PE12, an eleventh switching element T11 and a twelfth switching element T12. The eleventh pixel electrode PE11 is connected to the sixth data line DL6 and the gate line GL through the eleventh switching element T11. The twelfth pixel electrode PE12 is spaced apart from the eleventh pixel electrode PE11 to be connected to the second power line VL2 and the gate line GL through the twelfth switching element T12. The twelfth switching element T12 is connected to the second power line VL2 through the second connection line CL2. A polarity of a voltage applied to the eleventh pixel electrode PE11 and a polarity of a voltage applied to the twelfth pixel electrode PE12 may be opposite to each other with respect to a reference voltage.

A first voltage is applied to the first bus line BL1, and a second voltage is applied to the second bus line BL2. Voltages, which are inversed per frame unit with respect to an intermediated voltage between the first voltage and the second voltage, are applied to the first and second bus lines BL1 and BL2, respectively. For example, when a minimum voltage is applied to the first bus line BL1 and a maximum voltage is applied to the second bus line BL2 during a current frame, the maximum voltage is applied to the first bus line BL1 and the minimum voltage is applied to the second bus line BL2 during a next frame.

The first power line VL1 is electrically connected to the first bus line BL1 to receive a voltage that is substantially equal to a voltage applied to the first bus line BL1. The second power line VL2 is electrically connected to the second bus line BL2 to receive a voltage that is substantially equal to a voltage applied to the second bus line BL2. For example, the maximum voltage is applied to the first power line VL1, and the minimum voltage is applied to the second power line VL2. Thus, a voltage of a second polarity (+) that is higher than the minimum voltage with respect to the minimum voltage is applied to the first bus line BL1, and a voltage of a first polarity (−) that is lower than the maximum voltage with respect to the maximum voltage is applied to the second bus line BL2.

According to the present exemplary embodiment, one power line is shared by three pixel parts and the same polarity data voltage is applied to one power line, so that a generation of a light leakage in a black state may be minimized. Moreover, the number of the power lines is decreased, so that an aperture ratio of a display substrate may be enhanced.

Hereinafter, as an example, a pixel structure and a manufacturing method of a display substrate 100 according to the present exemplary embodiment will be explained by using the third pixel part P3 of FIG. 2.

Figure 3:
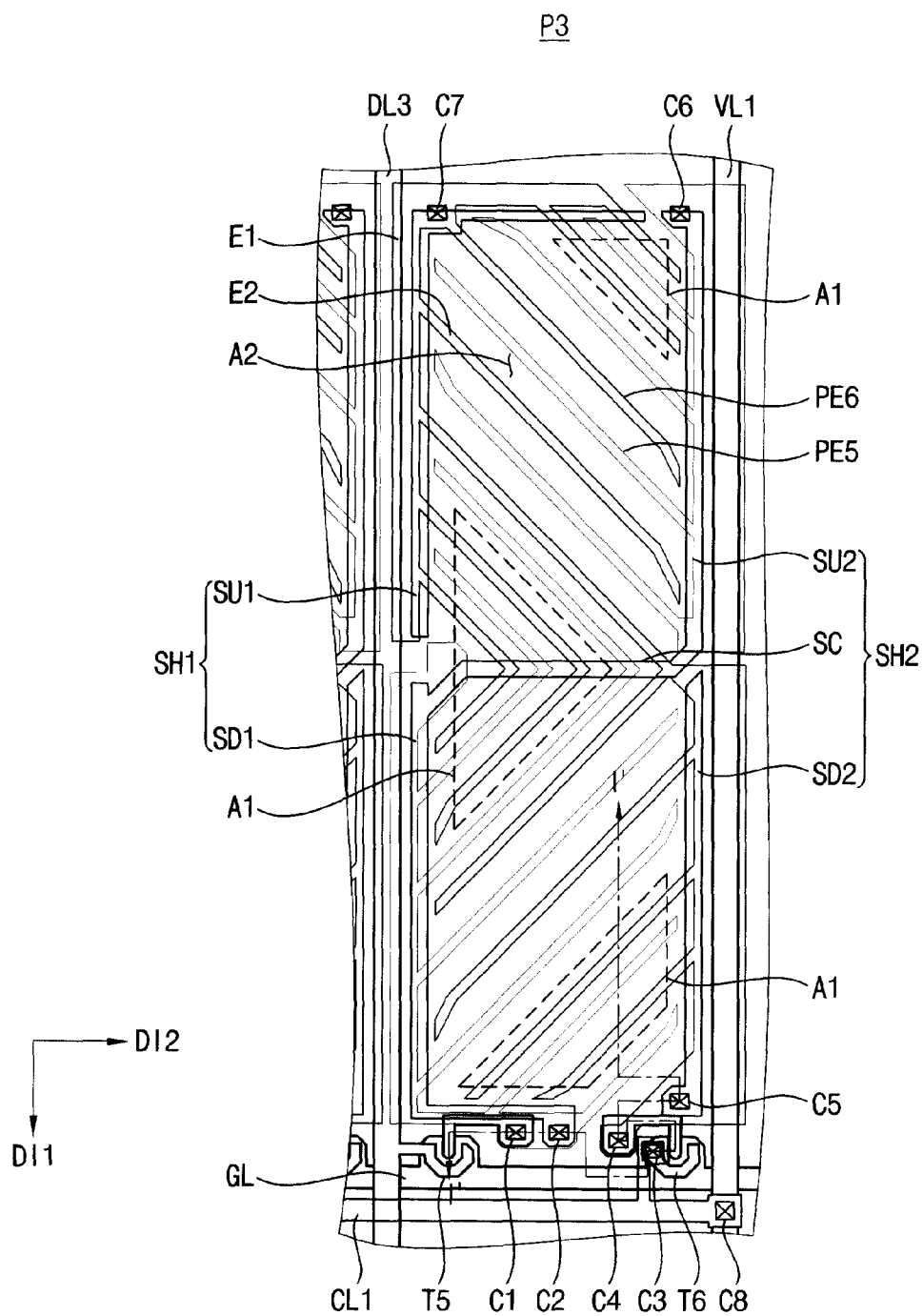
FIG. 3 is a plan view illustrating the LCD panel of FIG. 1.
Figure 4:
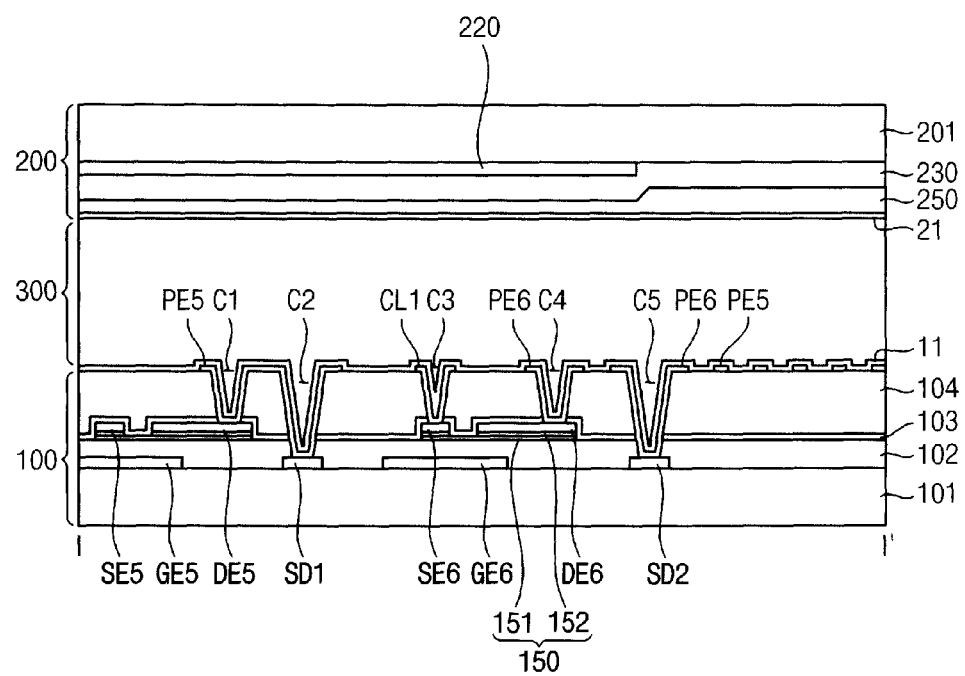
FIG. 4 is a cross-sectional view taken along line I-I' of FIG. 3.

FIG. 3 is a plan view illustrating the LCD panel 1000 of FIG. 1. FIG. 4 is a cross-is sectional view taken along line I-I' of FIG. 3.

Referring to FIGS. 2, 3 and 4, the LCD panel 1000 includes a display substrate 100, an opposite substrate 200 and a liquid crystal layer 300.

The display substrate 100 includes a first base substrate 101, a first metal pattern, a second metal pattern and a transparent electrode pattern. The display substrate 100 may further include a gate insulation layer 102 covering the first metal pattern, a data insulation layer covering the second metal pattern and a first alignment layer 11 covering the transparent electrode pattern. For example, the data insulation layer may be formed in a multiple layer structure in which a protection insulation layer 103 and an organic insulation layer 104 are formed. For another example, the data insulation layer may be formed in a single layer structure in which a protection insulation layer 103 is formed.

The first metal pattern includes the gate line GL, a fifth gate electrode GE5, a sixth gate electrode GE6, a first shield part SH1 and a second shield part SH2. The second metal pattern includes a first power line VL1, a third data line DL3, a fifth source electrode SE5, a fifth drain electrode DE5, a sixth source electrode SE6 and a sixth drain electrode DE6. The transparent electrode pattern includes a fifth pixel electrode PE5, a sixth pixel electrode PE6 and a first connection line CL1.

The gate line GL is extended in the second direction DI2. The fifth and sixth gate electrodes GE5 and GE6 are protruded from the gate line GL when viewed in a plan view.

The first shield part SH1 is disposed adjacent to a self data line delivering a data voltage to the third pixel part P3, that is, the third data line DL3. The first shield part SH1 blocks an electric field of the third data line DL3 from passing through the first base substrate 101, and also blocks light. The first shield part SH1 includes a first upper shield SU1 and a first lower shield SD1 that are spaced apart from each other. The first upper shield SU1 is disposed on an upper area of a pixel area defining the third pixel part P3 adjacent to the third data line DL3, and the first lower shield SD1 is disposed on a lower area of a pixel area defining the third pixel part P3 adjacent to the third data line DL3.

The second shield part SH2 is disposed adjacent to a first power line VL1. The second shield part SH2 blocks an electric field of the first power line VL1 from leaking through the first base substrate 101, and also blocks light. The second shield part SH2 includes a second upper shield SU2, a second lower shield SD2 spaced apart from the second upper shield SU2, and a connection shield SC connecting the first lower shield SD1 and the second upper shield SU2. Moreover, the second shield part SH2 may be disposed adjacent to a neighboring data line which delivers a data voltage to a neighboring pixel part. For example, in a case of the second pixel part P2 shown in FIG. 2, the second shield part SH2 is disposed adjacent to the third data line DL3 delivering a data voltage to the third pixel part P3. An end portion of the first upper shield SU1 is extended along the second direction DI2 to be disposed adjacent to the second upper shield SU2, and an end portion of the first lower shield SD1 is extended along the second direction D12 to be disposed adjacent to the second lower shield SD2.

The first upper shield SU1 is electrically connected to the sixth pixel electrode PE6 through a seventh contact hole C7 to overlap with the sixth pixel electrode PE6, and the second lower shield SD2 is electrically connected to the sixth pixel electrode PE6 through a fifth contact hole C5 to overlap with the sixth pixel electrode PE6. The first upper shield SU1 blocks a light leakage generated between the third data line DL3 and the sixth pixel electrode PE6, and the second lower shield SD2 blocks a light leakage generated between the first power line VL1 and the sixth pixel electrode PE6.

The first lower shield SD1 is electrically connected to the fifth pixel electrode PE5 through a second contact hole C2 to overlap with the fifth pixel electrode PE5, and the second upper shield SU2 is electrically connected to the fifth pixel electrode PE5 through a sixth contact hole C6 to overlap with the fifth pixel electrode PE5. The first lower shield SD1 blocks a light leakage generated between the third data line DL3 and the fifth pixel electrode PE5, and the second upper shield SU2 blocks a light leakage generated between the first power line VL1 and the fifth pixel electrode PE5.

The third data line DL3 is extended in the first direction DI1. The fifth source electrodes SE5 is protruded from the third data line DL3 under a plan view, and is disposed on the fifth gate electrode GE5. The fifth drain electrode DE5 is spaced apart from the fifth source electrode SE5 to be electrically connected to the fifth pixel electrode PE5 through a first contact hole C1.

The sixth source electrode SE6 is electrically connected to the first connection line CL1 through a third contact hole C3, and is disposed on the sixth gate electrode GE6. The first connection line CL1 is electrically connected to the first power line VL1. The sixth drain electrode DE6 is spaced apart from the sixth source electrode SE6 to be electrically connected to the sixth pixel electrode PE6 through a fourth contact hole C4.

The display substrate 100 may further include a semiconductor layer 150. The semiconductor layer 150 may include a first amorphous silicon layer 151 and a second amorphous silicon layer 152 doped with impurities. For example, the first amorphous silicon layer 151 may have amorphous silicon (a-Si:H), and the second amorphous silicon layer 152 may have n+amorphous silicon (n+ a-Si:H) that is heavily doped with an n-type impurity. The source electrode and the drain electrode may be positioned on the semiconductor layer 150. A channel of a switching element may be defined by the semiconductor layer 150 exposed between the source electrode and the drain electrode. The fifth and sixth pixel electrodes PE5 and PE6 are disposed in an alternating arrangement to receive the different voltages from the third data line DL3 and the first power line VL1, respectively. Thus, liquid crystal molecules of the liquid crystal layer 300 are arranged by a horizontal electric field formed between the fifth and sixth pixel electrodes PE5 and PE6, so that a gradation may be realized.

Each of the fifth and sixth pixel electrodes PE5 and PE6 includes a stem portion E1 overlapping with the data line or the power line and a branch portion E2 inclinedly extending from the stem portion E1 toward a pixel area by an angle of about 45 degrees (or about −45 degrees). The stem portion E1 overlaps with the data line or the power line, so that it prevents an electric field of the data line or the power line from being leakage toward an upper portion of the display substrate 100. Moreover, this overlap prevents light from being leaked between the pixel electrode and the data line (or the power line). The potential light leakage may be greater between the third pixel part P3 and the fourth pixel part P4, and between the sixth pixel part P6 and the seventh pixel part P7 in which the polarity of the data voltages is varied, so that light leakages between the third pixel part P3 and the fourth pixel part P4, and between the sixth pixel part P6 and the seventh pixel part P7, as examples, will hereinafter be described.

For example, a plurality of pixel rows is arranged on the display area DA in the first direction DI1. When frames are altered, a data voltage having a different polarity to a previous data voltage may be sequentially provided to the pixel parts in the first direction DI1. Since a first polarity data voltage is applied to an upper pixel row of the display area DA in an initial frame interval and a second polarity data voltage is applied to a lower pixel row of the display area DA in a following frame interval, more light leakage may be generated at each right portion of the third pixel part P3 and the sixth pixel part P6 in the upper pixel row and more light leakage may be generated at each left portion of the fourth pixel part P4 and the seventh pixel part P7 in the lower pixel row. Similar to the above, a similar number of light leakage positions may be generated at a left portion and a right portion of each pixel part positioned at a middle portion of the display area DA. Thus, a right width of a stem portion of the pixel electrode corresponding to the middle portion of the display area DA may be substantially equal to a left width of the stem portion of the pixel electrode corresponding to the middle portion of the display area DA.

Thus, in order to effectively prevent light leakage at each portion of the display area DA, on an upper pixel row of the display area DA, stem portions of pixel electrodes corresponding to a right portion of the third and sixth pixel parts P3 and P6 may be formed to have a wider width, and stem portions of pixel electrodes corresponding to a left portion of the fourth and seventh pixel parts P4 and P7 may be formed to have a narrower width. In a lower pixel row of the display area DA, stem portions of pixel electrodes corresponding to a right portion of the third and sixth pixel parts P3 and P6 may be formed to have a narrower width, and stem portions of pixel electrodes corresponding to a left portion of the fourth and seventh pixel parts P4 and P7 may be formed to have a wider width. As a result, since widths of the stem portions of the pixel parts are different from each other or equal to each other according to which portion of the display area DA the pixel part is positioned in, when data voltages inverted at every frame interval are applied thereto, a light leakage may be effectively prevented, which would otherwise be locally generated at some area as the data voltages are applied to the upper and lower portions of the display area DA at different points of time to have a time interval therebetween.

Referring to FIG. 3, interval distances between the fifth and sixth pixel electrodes PE5 and PE6 branch portions E2 corresponding to a first area A1 are substantially less than interval distances between the fifth and sixth pixel electrodes PE5 and PE6 branch portions E2 corresponding to a second area A2 of the third pixel part P3. For example, the first area A1 includes a center portion (i.e., a portion on which the connection shield SC is disposed) of the pixel area, a right portion (i.e., a portion proximate a portion through which the sixth contact hole C6 is formed) of the pixel area, and a lower portion of the pixel area, and the second area A2 is the remaining area excluding the first area of the pixel area. Accordingly, the pixel area may be divided into multi-domains to be driven.

The first alignment layer 11 is formed on the transparent electrode pattern including the fifth and sixth pixel electrodes PE5 and PE6 to vertically align liquid crystal molecules of the liquid crystal layer 300.

The opposite substrate 200 includes a second base substrate 201. A light-blocking pattern 220, a color filter 230, an overcoating layer 250 and a second alignment layer 21 may be formed on the second base substrate 201.

The light-blocking pattern 220 may be disposed in correspondence with an area on which the first metal pattern and the second metal pattern are formed, and the light-blocking pattern 220 may block light. For example, the light-blocking pattern 220 is disposed on an area on which the third data line DL3, the first power line VL1, the gate line GL and the switching elements T5 and T6 are formed.

The color filter 230 is disposed in correspondence with the pixel area on which the fifth and sixth pixel electrodes PE5 and PE6 are formed. The color filter 230 may include a red filter, a green filter and a blue filter. For example, the first pixel part P1 includes a red filter, the second pixel part P2 includes a green filter, and the third pixel part P3 includes a blue filter.

The overcoating layer 250 is formed on the second base substrate 201 to cover the color filter 230 and the light-blocking pattern 220. The overcoating layer 250 may include an insulation material. The overcoating layer 250 may prevent the color filter 230 from being exposed and provide a planarization surface. The overcoating layer 250 may be omitted.

In this exemplary embodiment, the light-blocking pattern 220 and the color filter 230 are formed on the opposite substrate 200. Alternatively, the light-blocking pattern 220 and the color filter 230 may be formed on the display substrate 100.

The second alignment layer 21 is formed on the overcoating layer 250 to vertically align the liquid crystal molecules of the liquid crystal layer 300.

The liquid crystal layer 300 is disposed between the display substrate 100 and the opposite substrate 200. The liquid crystal layer 300 may have an anisotropy of permittivity. When an electric field is not applied to the liquid crystal molecules of the liquid crystal layer 300, long axes of the liquid crystal molecules may be aligned to be perpendicular with facing surfaces of the two substrates 100 and 200.

An arrangement of the liquid crystal molecules of the liquid crystal layer 300 is altered by an electric field formed between the fifth pixel electrode PE5 and the sixth pixel electrode PE6. As a result, a transmissivity of the liquid crystal layer 300 may be altered in accordance with the strength of the electrical field.

For example, when an electric potential difference between the fifth pixel electrode PE5 and the sixth pixel electrode PE6 is maximum, a horizontal electric field may be generated at a surface of the display substrate 100 and the opposite substrate 200 so that a white mode is realized. In contrast, when an electric potential difference between the fifth pixel electrode PE5 and the sixth pixel electrode PE6 is minimum, an electric field may be not generated at a surface of the display substrate 100 and the opposite substrate 200 so that a black mode is realized.

That is, liquid crystal molecules of the liquid crystal layer 300 are vertically aligned with respect to a surface of the display substrate 100 and the opposite substrate 200 in response to an electric field, so that long axes of the liquid crystal molecules are horizontally inclined with respect to a direction of the electric field. Thus, a polarizing degree of an incident light is altered in accordance with an inclined degree of the liquid crystal molecules. The polarizing degree represents as a transmittance varying by a polarizer, so that the LCD panel may display images due to the varied transmittance.

Accordingly, when vertically aligned liquid crystal molecules are used in the LCD device, a contrast ratio of the LCD device may be increased and a wide viewing angle may be realized. Moreover, two voltages having different polarities are applied to one pixel part, so that a driving voltage may be increased and a response speed may be enhanced.

FIGS. 5A to 5D are plan views explaining a method of manufacturing the display substrate of FIG. 3.

Figure 5A:
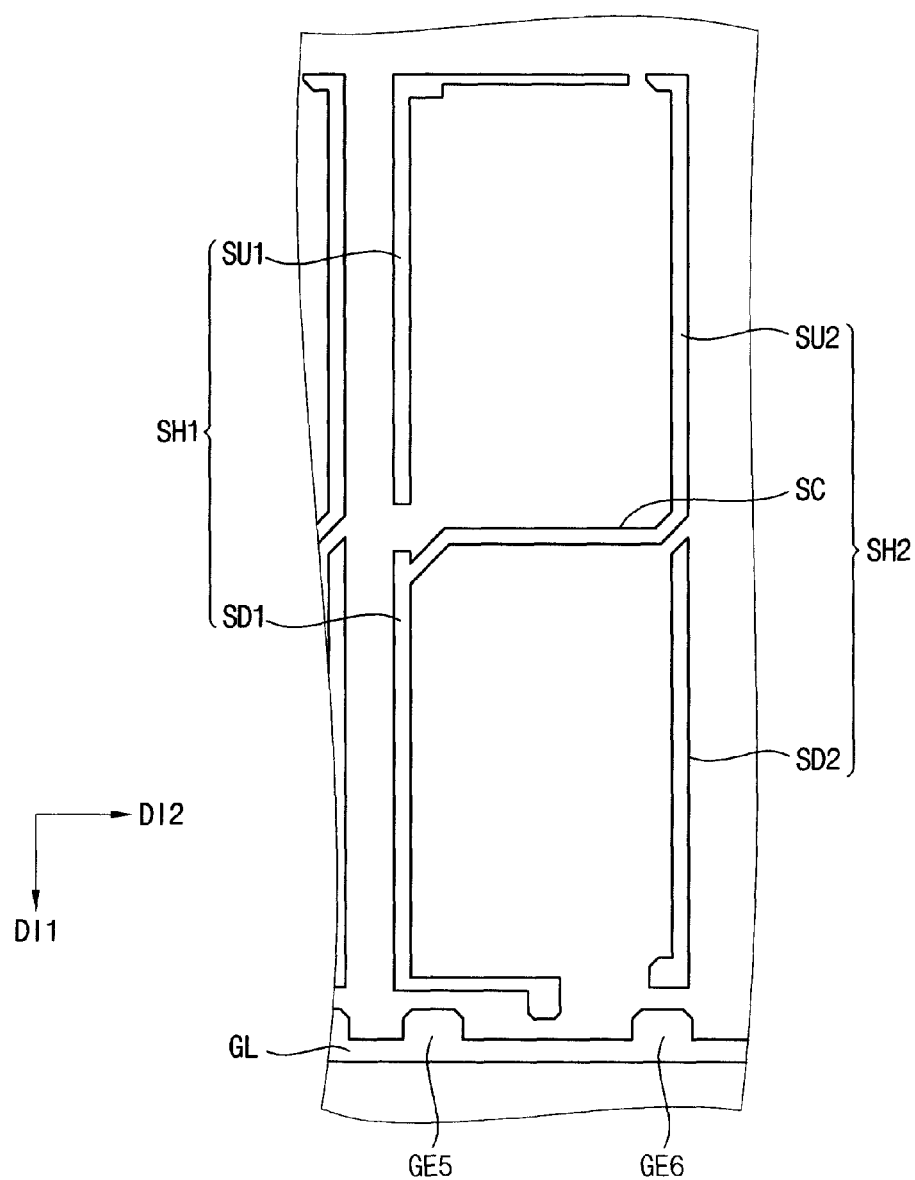
FIG. 5A, FIG. 5B, FIG. 5C and FIG. 5D are plan views explaining a method of manufacturing the display substrate of FIG. 4.

Referring to FIGS. 3, 4 and 5A, a first metal layer is formed on the first base substrate 101, and then the first metal layer is patterned to form a first metal pattern. The first metal pattern includes the gate line GL, the fifth gate electrode GE5, the sixth gate electrode GE6, the first shield part SH1 and the second shield part SH2.

The gate line GL is extended in the second direction DI2. The fifth and sixth gate electrodes GE5 and GE6 are protruded from the gate line GL toward the pixel area in a plan view.

The first shield part SH1 includes the first upper shield SU1 and the first lower shield SD1 that are extended along the first direction DI1. The upper end portion of the first upper shield SU1 is extended in the second direction DI2, and the lower end portion of the first lower shield SD1 is extended in the second direction DI2.

The second shield part SH2 includes the second upper shield SU2 and the second lower shield SU2 that are extended along the first direction DI1. The second shield part SH2 may further include a connection shield SC extended in the second direction DI2 to connect the first lower shield SD1 and the second upper shield SU2.

A gate insulation layer 102 is formed on the first base substrate 101 on which the first metal pattern is formed to cover the first metal pattern. The gate insulation layer 102 may have a multiple layer structure in which a silicon oxide (SiOx) and a silicon nitride (SiNx) are deposited. Alternatively, the gate insulation layer 102 may have a single layer structure in which a silicon oxynitride (SiON) is formed. In this case, the silicon oxynitride (SiON) layer may have an oxide concentration in accordance with a deposition direction thereof. The oxide concentration may be higher when the silicon oxynitride (SiON) layer is closer to a semiconductor pattern.

Figure 5B:
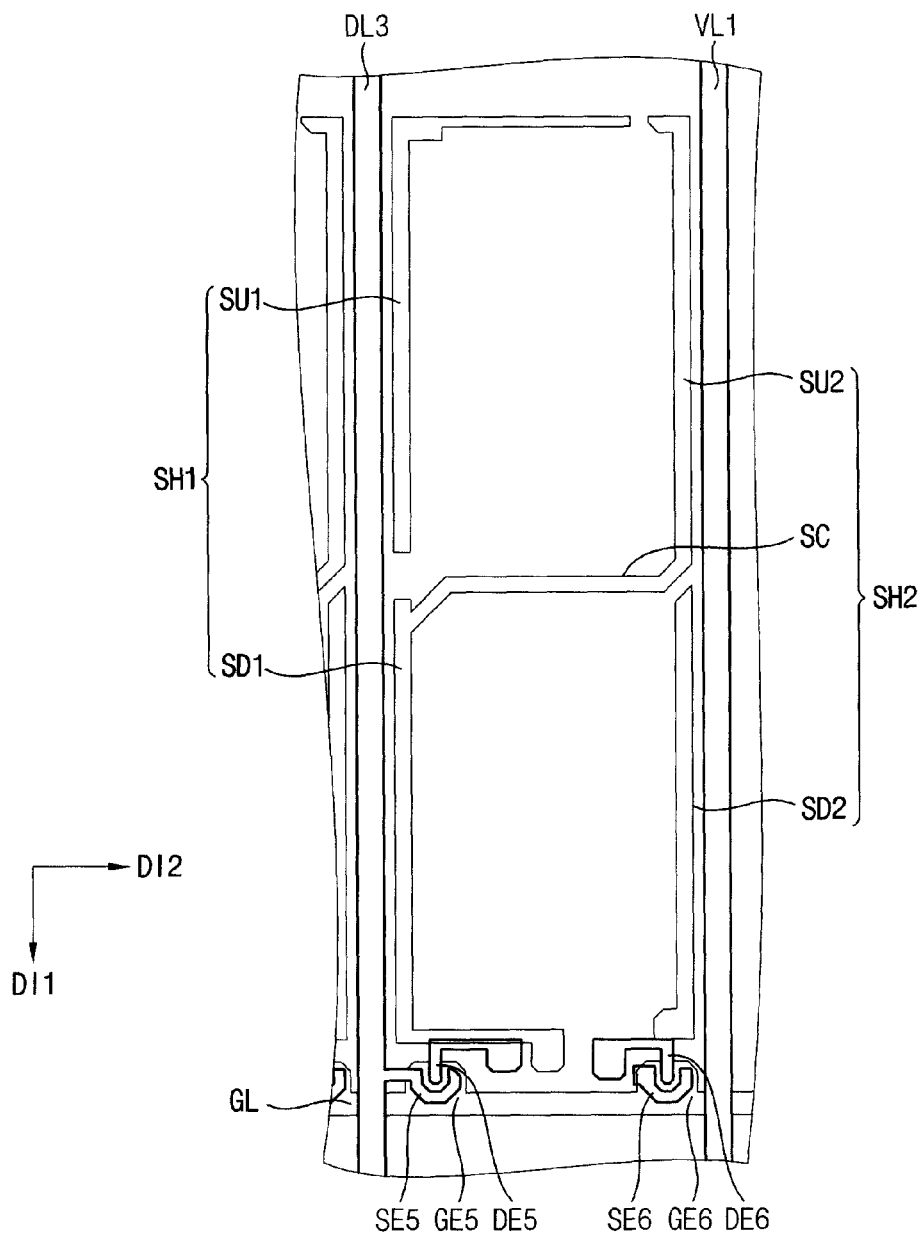

Referring to FIGS. 3, 4 and 5B, a semiconductor layer 150 and a second metal layer are formed on the gate insulation layer 102, and then the semiconductor layer 150 and the second metal layer are patterned to form a second metal pattern. The semiconductor layer 150 may include the first amorphous silicon layer 151 and the second amorphous silicon layer 152 doped with impurities. For example, the first amorphous silicon layer 151 may have amorphous silicon (a-Si:H), and the second amorphous silicon layer 152 may have n+ amorphous silicon (n+a-Si:H) that is heavily doped with an n-type impurity.

Moreover, the semiconductor layer 150 may include an oxide semiconductor material. The oxide semiconductor material may include amorphous oxide including at least one of indium (In), zinc (Zn), gallium (Ga), tin (Sn) and hafnium (Hf). For one example, the oxide semiconductor material may include amorphous oxide including indium (In), zinc (Zn) and gallium (Ga). For another example, the oxide semiconductor material may include amorphous oxide including indium (In), zinc (Zn) and hafnium (Hf). The oxide semiconductor may include an oxide material such as indium zinc oxide (InZnO), indium gallium oxide (InGaO), indium tin oxide (InSnO), zinc tin oxide (ZnSnO), gallium tin oxide (GaSnO), gallium zinc oxide (GaZnO), etc. In addition, the oxide semiconductor may further include at least one of elements of the Group III, elements of the Group IV, elements of the Group V, and transition elements in order to enhance the oxide material characteristics. The oxide semiconductor layer has a higher effective mobility than a hydrogen amorphous silicon by about two times to a hundred times and has an on-off current ratio of about 10:5 to about 10:8, so that the oxide semiconductor layer has superior semiconductor characteristics in comparison with the hydrogen amorphous silicon.

Moreover, since a band gap of the oxide semiconductor is about 3.0 eV to about 3.5 eV, a leakage current for a visible light is not generated. Thus, a light-blocking layer is not formed below a switching element including the oxide semiconductor layer, so that an aperture ratio may be increased.

Alternatively, before the second metal layer is formed, a semiconductor layer may be formed on the gate insulation layer 102 by using an additional mask to form a semiconductor pattern only on the gate electrodes.

The second metal pattern includes the third data line DL3, the fifth source electrode SE5, the fifth drain electrode DE5, the sixth source electrode SE6, the sixth drain electrode DE6 and the first power line VL1.

The third data line DL3 is extended in the first direction DI1, and is formed adjacent to the first shield part SH1. For example, the third data line DL3 is formed adjacent to the first upper shield SU1 and the first lower shield SD1.

The first power line VL1 is extended in the first direction DI1, and is formed adjacent to the second shield part SH2. For example, the first power line VL1 is formed adjacent to the second upper shield SU2 and the second lower shield SD2.

The fifth source electrode SE5 is protruded from the third data line DL3 to be formed on the fifth gate electrode GE5 under a plan view. The fifth drain electrode DE5 is spaced apart from the fifth source electrode SE5 to be formed on the fifth gate electrode GE5. The fifth drain electrode DE5 is extended to have a predetermined length. The sixth source electrode SE6 is formed on the sixth gate electrode GE6, and the sixth drain electrode DE6 is spaced apart from the sixth source electrode SE6 to be formed on the sixth gate electrode GE6. The sixth source electrode SE6 is extended to have a predetermined length.

Figure 5C:
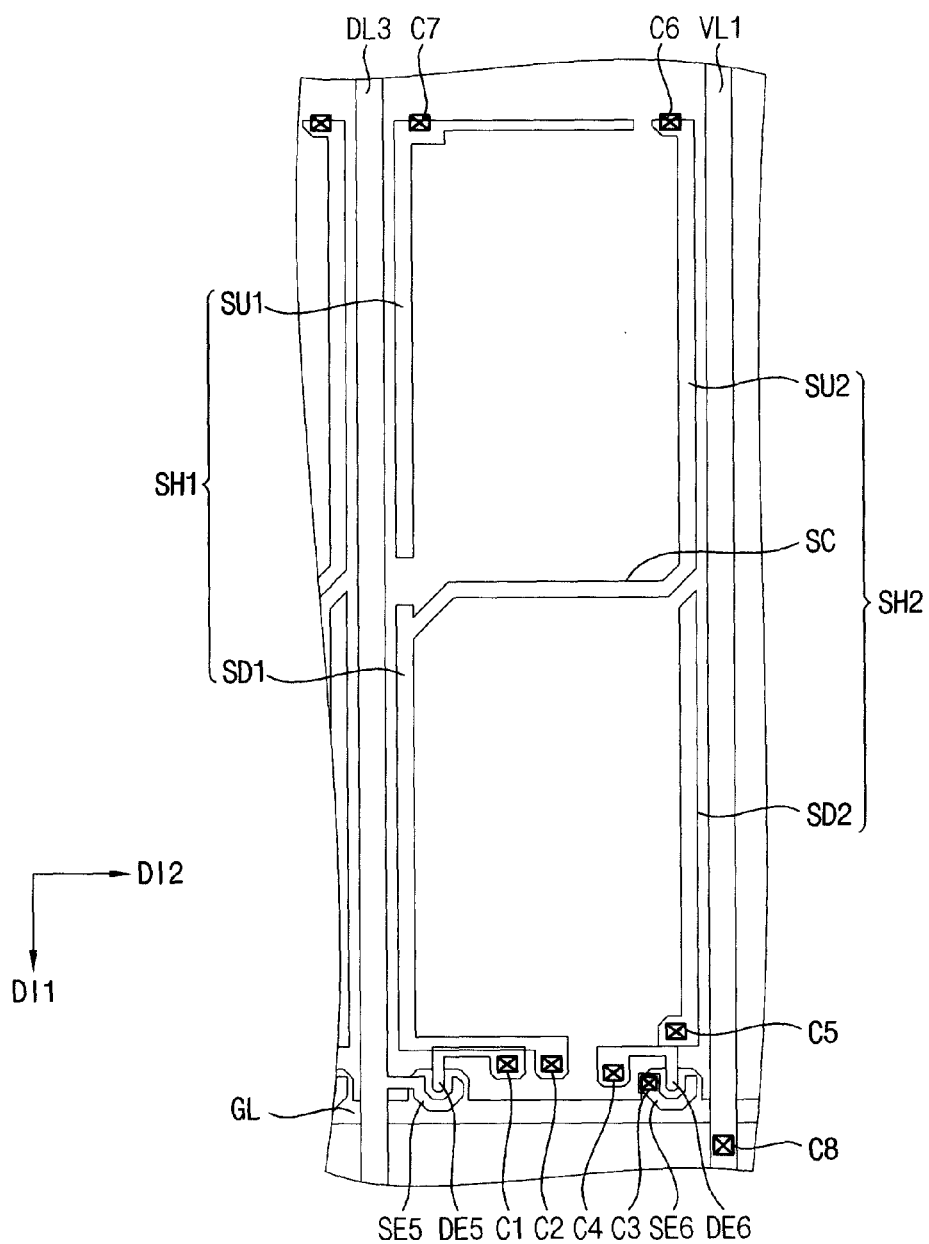

Referring to FIGS. 3 and 5C, the protection insulation layer 103 is formed on the first base substrate 101 on which the second metal pattern is formed. The protection insulation layer 103 may have a multiple layer structure including a silicon oxide (SiOx) and a silicon nitride (SiNx) or a single layer structure. The protection layer 103 is disposed to cover the semiconductor layer, so that deterioration of a thin-film transistor is prevented.

The protection insulation layer 103 and the gate insulation layer 102 are etched to form the first contact hole C1, the second contact hole C2, the third contact hole C3, the fourth contact hole C4, the fifth contact hole C5, the sixth contact hole C6, the seventh contact hole C7 and an eighth contact hole C8. Then, the organic insulation layer 104 is formed on the first base substrate 101 having the first to eighth contact holes C1, C2, C3, C4, C5, C6, C7 and C8 formed thereon. The organic insulation layer 104 is patterned to remove the organic insulation layer 104 in correspondence with the first to eighth contact holes C1, C2, C3, C4, C5, C6, C7 and C8.

As a result, the first metal pattern and the second metal pattern are partially exposed through the first to eighth contact holes C1, C2, C3, C4, C5, C6, C7 and C8.

Figure 5D:
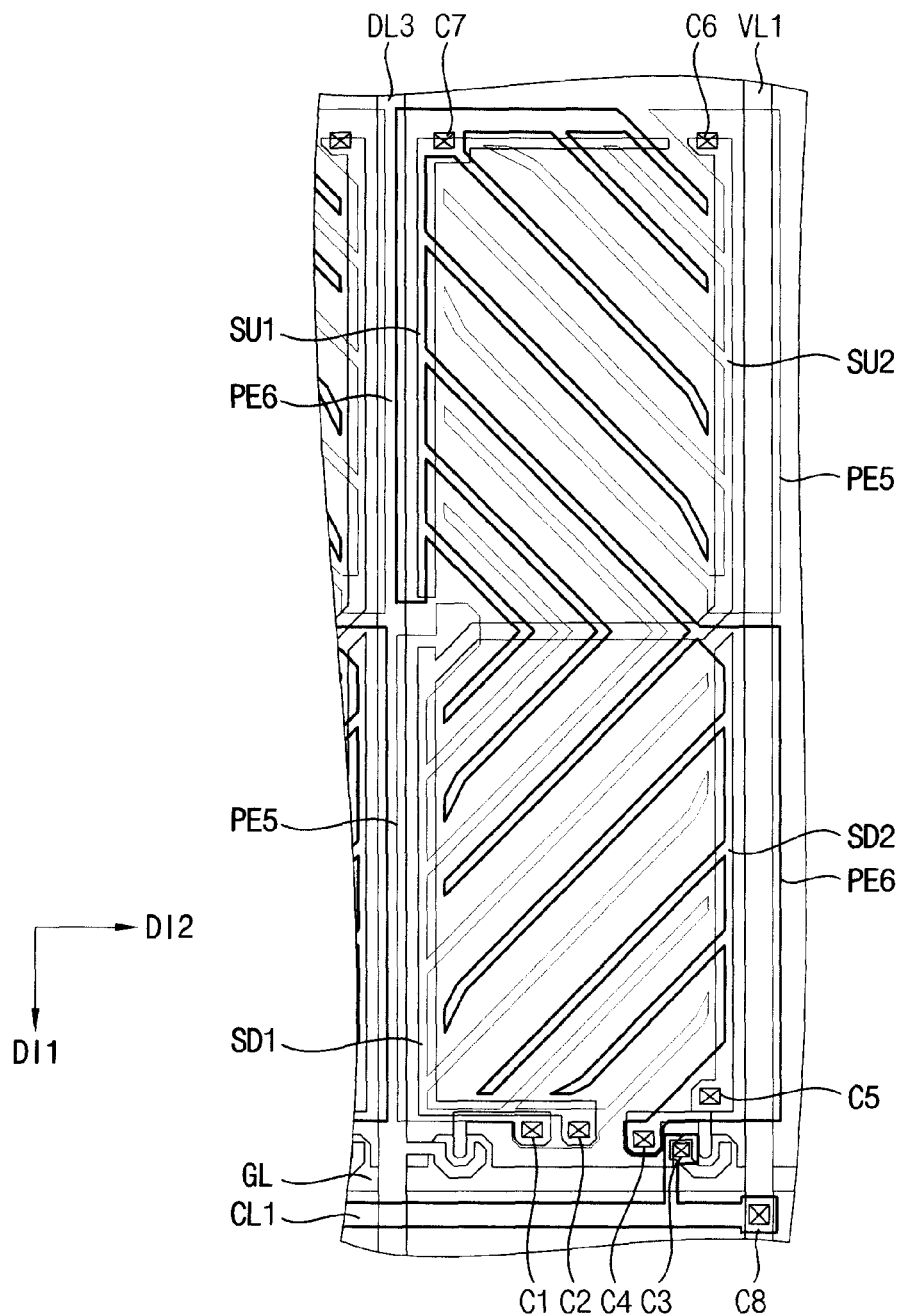

Referring to FIGS. 3 and 5D, a transparent conductive layer is formed on the first base substrate 101 having the first to eighth contact holes C1, C2, C3, C4, C5, C6, C7 and C8 formed thereon, and then the transparent conductive layer is patterned to form a transparent conductive pattern. The transparent conductive layer may include an optically transparent and electrically conductive material such as indium tin oxide (ITO), indium zinc oxide (IZO), etc.

The transparent electrode pattern includes the fifth pixel electrode PE5, the sixth pixel electrode PE6 and the first connection line CL1.

The fifth pixel electrode PE5 is electrically connected to the fifth drain electrode DE5 of the fifth switching element T5 through the first contact hole Cl, and the sixth pixel electrode PE6 is electrically connected to the sixth drain electrode DE6 of the sixth switching element T6 through the fourth contact hole C4. Each of the fifth and sixth pixel electrodes PE5 and PE6 includes a stem portion E1 and a branch portion E2. The stem portions El may partially overlap with the third data line DL3 and the first power line VL1. The branch portions E2 may be inclinedly extended from the respective stem portion El toward the pixel area by an angle of about 45 degrees (or about −45 degrees). The branch portion E2 of the fifth pixel electrode PE5 and the branch portion E2 of the sixth pixel electrode PE6 may be disposed in an alternating arrangement.

The fifth pixel electrode PE5 is electrically connected to the first lower shield SD1 through the second contact hole C2, and is electrically connected to the second upper shield SU2 through the sixth contact hole C6. The sixth pixel electrode PE6 is electrically connected to the second lower shield SD2 through the fifth contact hole C5, and is electrically connected to the first upper shield SU1 through the seventh contact hole C7.

The first connection line CL1 is electrically connected to the first power line VL1 through the eighth contact hole C8 to be extended in the second direction DI2. The first connection line CL1 is protruded toward the sixth source electrode SE6 to be electrically connected to the sixth source electrode SE6 through the third contact hole C3. Thus, the sixth switching element T6 may deliver a voltage applied to the first connection line CL1 to the sixth pixel electrode PE6.

The first alignment layer 11 is formed on the first base substrate 101 having the transparent electrode pattern formed thereon.

Figure 6:
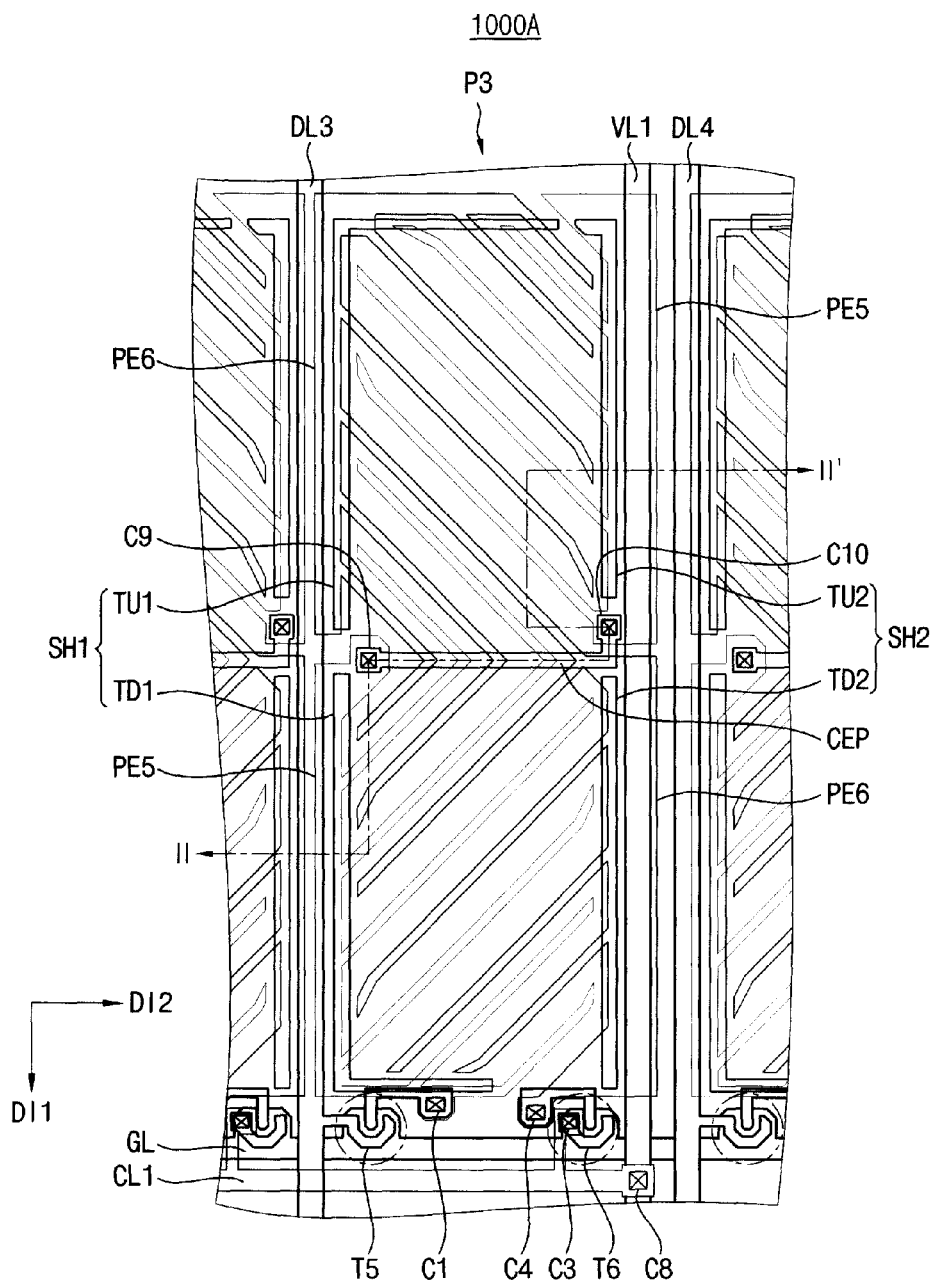
FIG. 6 is a plan view illustrating an LCD panel according to another exemplary embodiment of the present invention.
Figure 7:
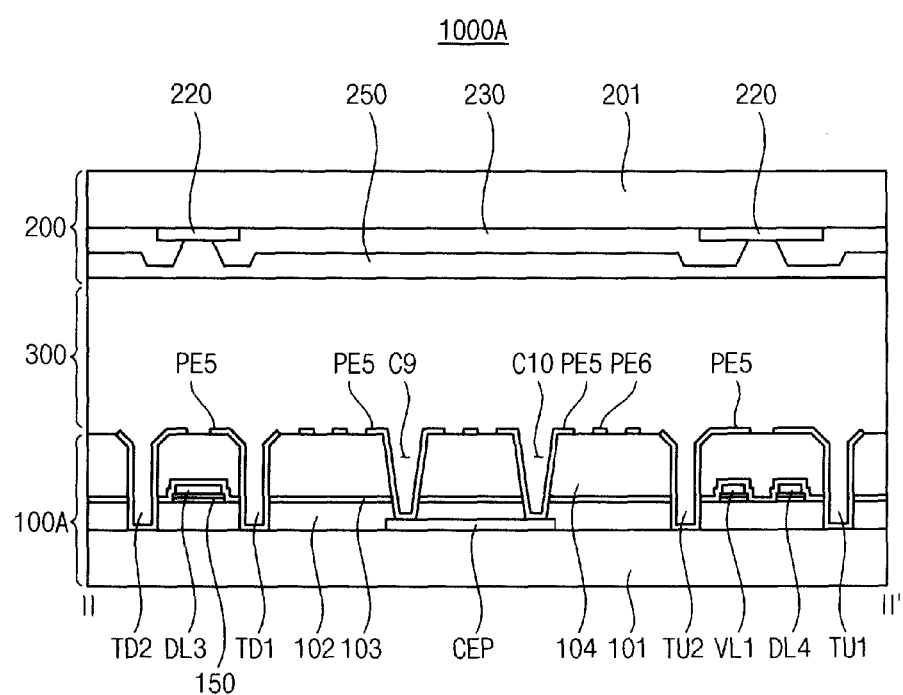
FIG. 7 is a cross-sectional view taken along line II-II' of FIG. 6.

FIG. 6 is a plan view illustrating an LCD panel 1000A according to another exemplary embodiment of the present invention. FIG. 7 is a cross-sectional view taken along line II-II' of FIG. 6.

Referring to FIGS. 2, 6 and 7, the LCD panel 1000A includes a display substrate 100A, an opposite substrate 200 and a liquid crystal layer 300. The LCD panel 1000A according to the present exemplary embodiment may be substantially the same as the LCD device of FIG. 1 except for a first shield part SH1, a second shield part SH2 and a connection electrode pattern CEP, and thus any repetitive detailed explanation will hereinafter be omitted or simplified.

Each of the first and second shield parts SH1 and SH2 includes a trench structure in which the gate insulation layer 102, the protection insulation layer 103 and the organic insulation layer 104 are removed.

The connection electrode pattern CEP may be included in the first metal pattern. The connection electrode pattern CEP is extended from a center portion of the pixel area along the second direction DI2 to electrically connect the fifth pixel electrode PE5 disposed in the lower pixel area and the fifth pixel electrode PE5 disposed in the upper pixel area under a plan view. The connection electrode CEP is electrically connected to the fifth pixel electrode PE5 partially overlapped with the third data line DL3 through a ninth contact hole C9, and is electrically connected to the fifth pixel electrode PE5 partially overlapped with the first power line VL1 through a tenth contact hole C10.

The first shield part SH1 is disposed adjacent to a self data line, that is, the third data line DL3, which delivers a data voltage to the third pixel part P3. The first shield part SH1 includes a first upper trench TU1 and a first lower trench TD1. The gate insulation layer 102, the protection insulation layer 103 and the organic insulation layer 104 are removed to form the first upper trench TU1 and the first lower trench TD1. The sixth pixel electrode PE6 partially overlapped with an upper portion of the third data line DL3 is formed through the first upper trench TU1, and the fifth pixel electrode PE5 partially overlapped with a lower portion of the third data line DL3 is formed through the first lower trench TD 1.

The second shield part SH2 is disposed adjacent to the first power line VL1. Alternatively, the second shield part SH2 may be disposed adjacent to a neighboring data line delivering a data voltage to a neighboring pixel part. The second shield part SH2 includes a second upper trench TU2 and a second lower trench TD2. The gate insulation layer 102, the protection insulation layer 103 and the organic insulation layer 104 are removed to form the second upper trench TU2 and the second lower trench TD2. The fifth pixel electrode PE5 partially overlapped with an upper portion of the first power line VL1 is formed through the second upper trench TU2, and the sixth pixel electrode PE6 partially overlapped with a lower portion of the first power line VL1 is formed through the second lower trench TD2.

As shown in FIG. 6, the first upper trench TU1 may extend along the second direction DI2 at an upper portion of the pixel area adjacent to the second upper trench TU2 in a plan view, and the first lower trench TD1 may extend along the second direction DI2 at a lower portion of the pixel area adjacent to the second lower trench TD2 in a plan view.

Similar to the previous embodiment described in connection with FIGS. 1 to 4, the first and second shield parts SH1 and SH2 may prevent an electric field of the data line or the power line from being leaked, and may prevent a light leakage from being generated between the power line and the pixel electrode or between the data line and the pixel electrode. In addition, the first and second shield parts SH1 and SH2 have a structure in which the pixel electrode is formed through a trench, so that an aperture ratio of the display substrate may be enhanced in comparison with the display substrate according to the previous embodiment described in connection with FIGS. 1 to 4.

FIGS. 8A to 8D are plan views explaining a method of manufacturing the display substrate of FIG. 7. Hereinafter, the same reference numerals will be used to refer to the same or like parts as those described in the previous exemplary embodiment of FIG. 1 and any repetitive detailed explanation concerning the above elements will be omitted or simplified.

Figure 8A:
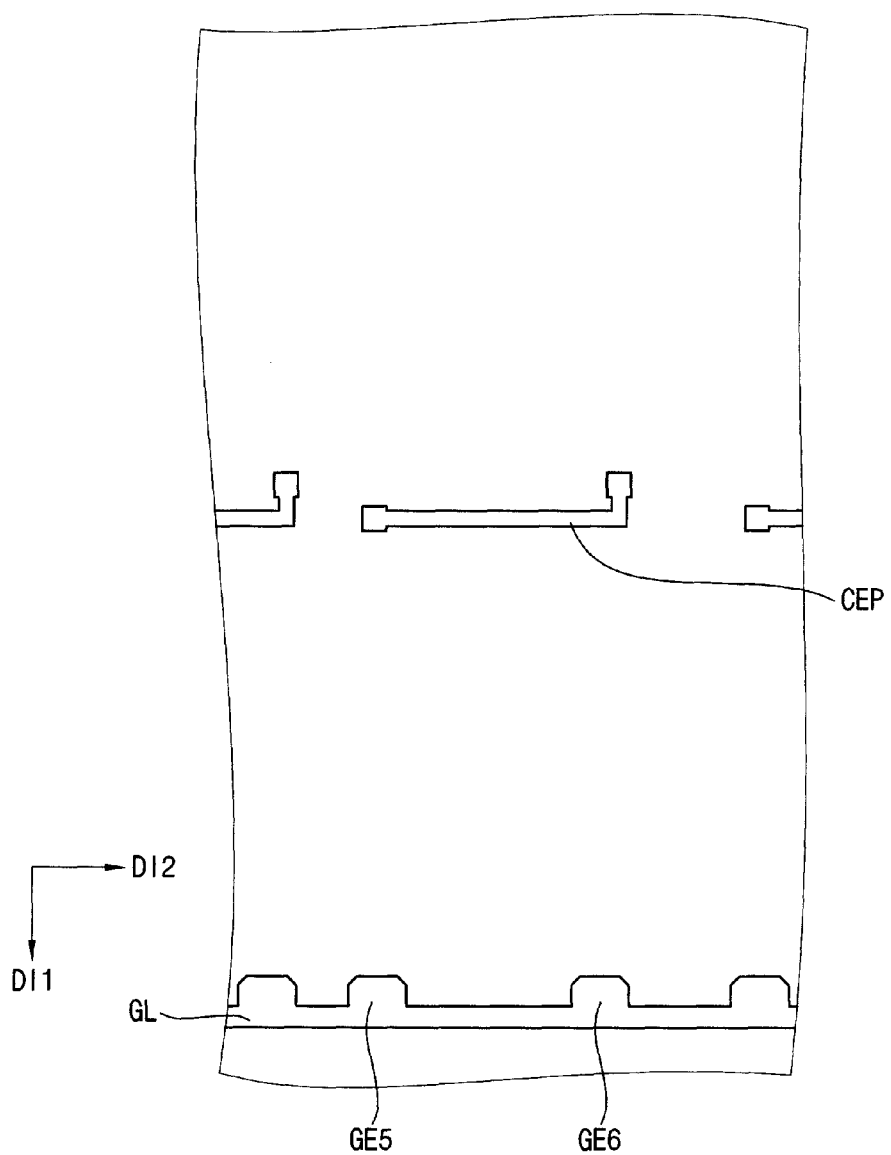
FIG. 8A, FIG. 8B, FIG. 8C and FIG. 8D are plan views explaining a method of manufacturing the display substrate of FIG. 7.

Referring to FIGS. 7 and 8A, a first metal layer is formed on the first base substrate 101, and then the first metal layer is patterned to form a first metal pattern. The first metal pattern includes the gate line GL, a fifth gate electrode GE5, a sixth gate electrode GE6 and the connection electrode pattern CEP.

The gate line GL is extended in the second direction DI2. The fifth and sixth gate electrodes GE5 and GE6 are protruded from the gate line GL toward the pixel area on a plan view.

The connection electrode pattern CEP is extended at a center portion of the pixel area toward the second direction DI2. The connection electrode pattern CEP may divide the pixel area into an upper portion and a lower portion. The pixel area is an area on which the fifth and sixth pixel electrodes PE5 and PE6 are formed by the following process.

The gate insulation layer 102 covering the first metal pattern is formed on the first base substrate 101 on which the first metal pattern is formed.

Figure 8B:
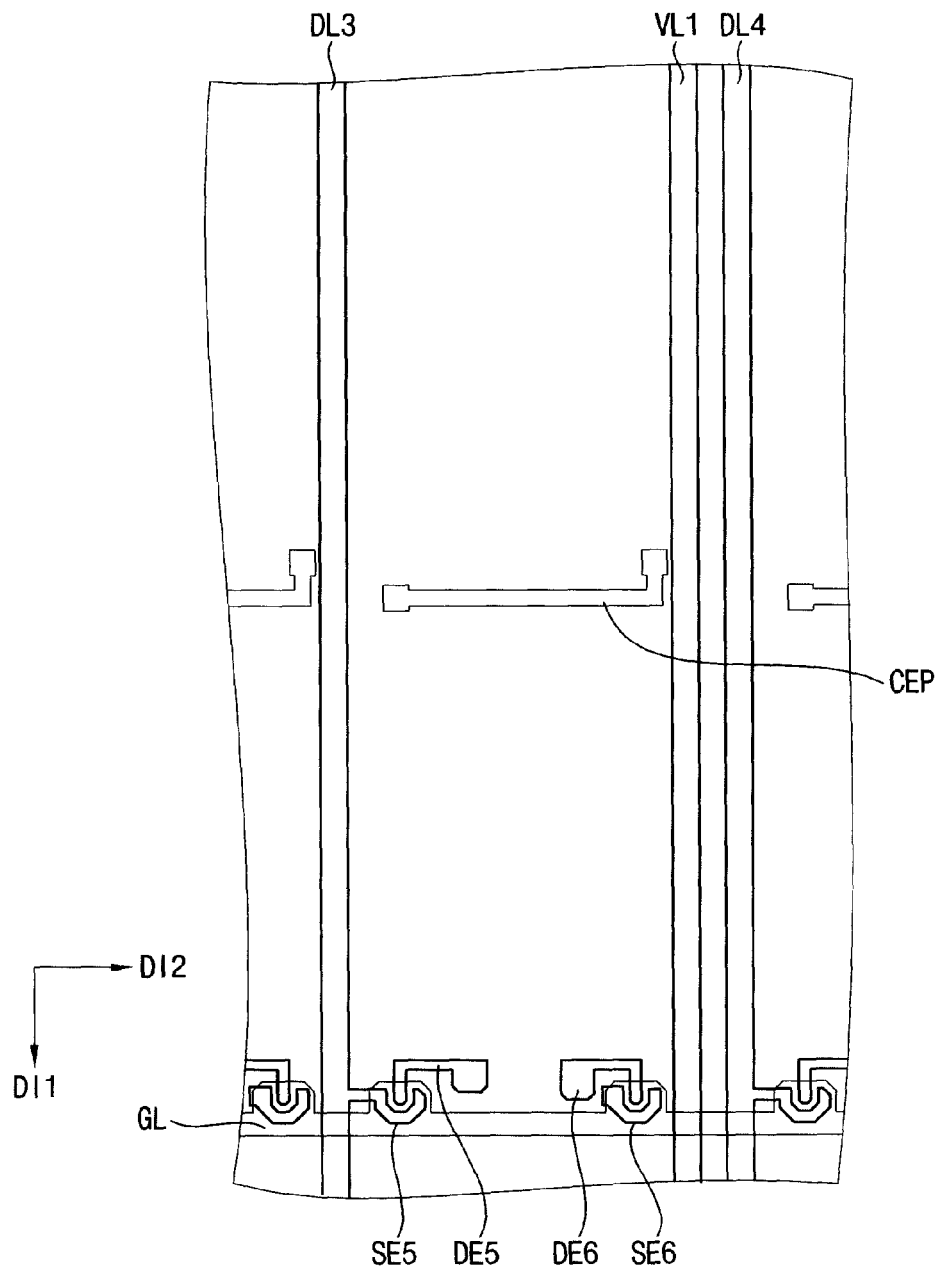

Referring to FIGS. 7 and 8B, a semiconductor layer and a second metal layer are formed on the gate insulation layer 102, and then the semiconductor layer and the second metal layer are patterned to form a second metal pattern.

The second metal pattern includes the third data line DL3, a fifth source electrode SE5, a fifth drain electrode DE5, a sixth source electrode SE6, a sixth drain electrode DE6 and the first power line VL1.

Figure 8C:
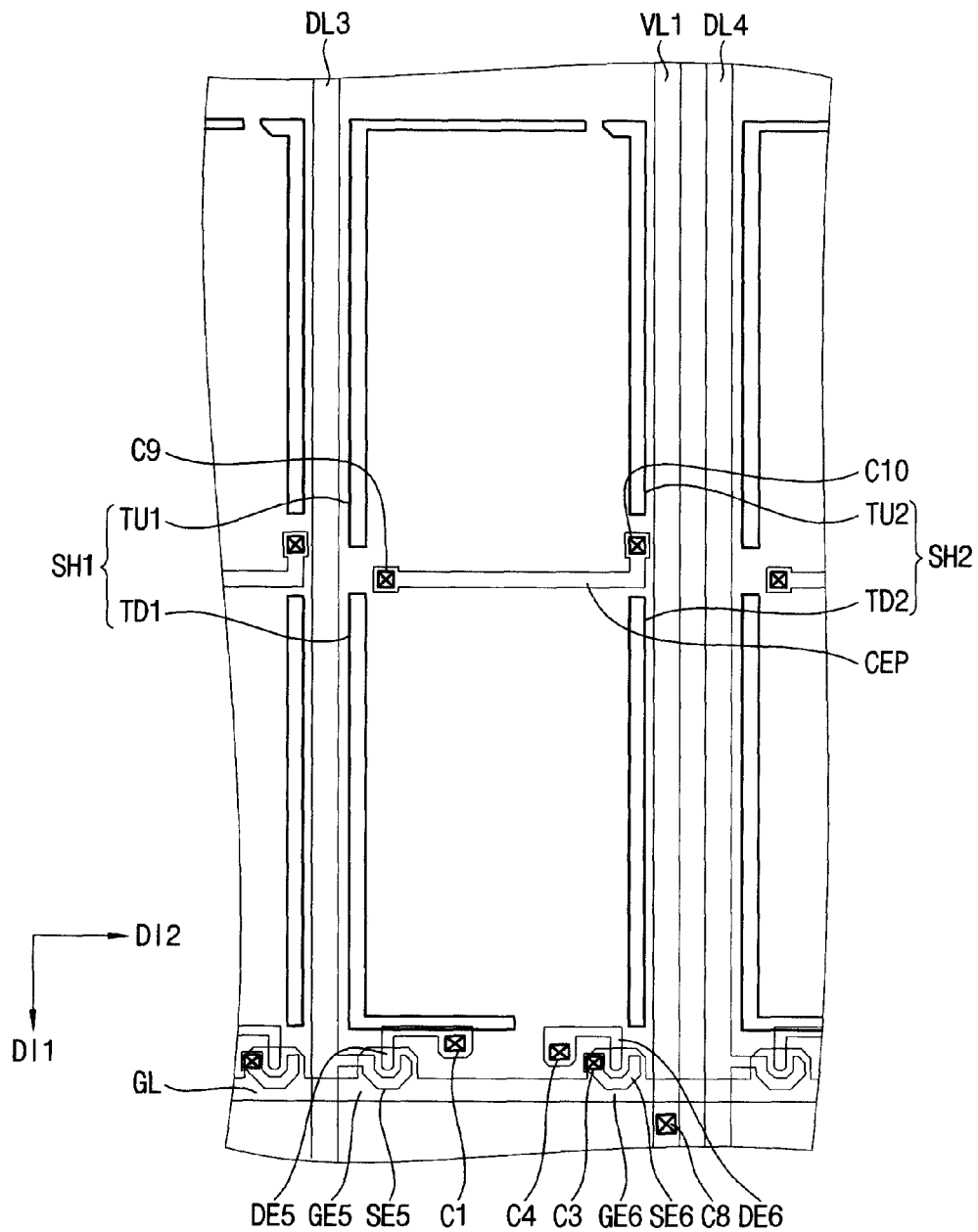

Referring to FIGS. 7 and 8C, the protection insulation layer 103 is formed on the first base substrate 101 on which the second metal pattern is formed to cover the second metal pattern.

The protection insulation layer 103 and the gate insulation layer 102 are etched to form a first, third, fourth, eighth, ninth and tenth contact holes C1, C3, C4, C8, C9 and C10. Moreover, the protection insulation layer 103 and the gate insulation layer 102 are etched to form the first upper trench TU1 and the first lower trench TD1 on the pixel area adjacent to the third data line DL3, and to form the second upper trench TU2 and the second lower trench TD2 on the pixel area adjacent to the first power line VL1.

Then, the organic insulation layer 104 is formed on the first base substrate 101 on which the contact holes C1, C3, C4, C8, C9 and C10 and the trenches TU1, TD1, TU2 and TD2 are formed. The organic insulation layer 104 is patterned, so that the organic insulation layer 104 corresponding to the contact holes C1, C3, C4, C8, C9 and C10 and the trenches TU1, TD1, TU2 and TD2 is removed.

As a result, the first metal pattern and the second metal pattern are partially exposed through the contact holes C1, C3, C4, C8, C9 and C10, and the first base substrate 101 is exposed through the trenches TU1, TD1, TU2 and TD2.

Figure 8D:
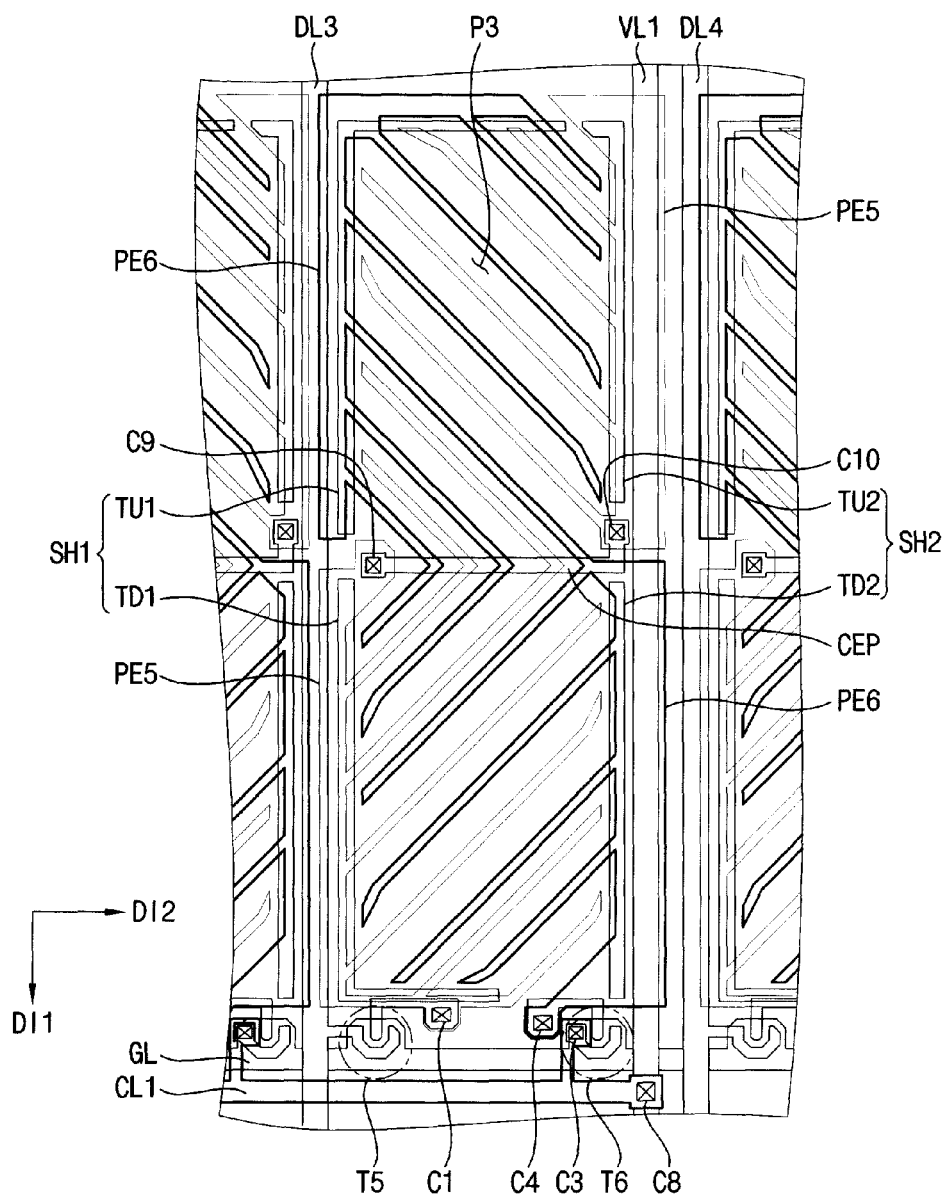

Referring to FIGS. 7 and 8D, a transparent conductive layer is formed on the first base substrate 101 having the contact holes C1, C3, C4, C8, C9 and C10 and the trenches TU1, TD1, TU2 and TD2 formed thereon, and then the transparent conductive layer is patterned to form a transparent electrode pattern.

The transparent electrode pattern includes the fifth pixel electrode PE5, the sixth pixel electrode PE6 and a first connection line CL1.

The fifth pixel electrode PE5 is electrically connected to the fifth drain electrode DE5 of the fifth switching element T5 through the first contact hole C1, and the sixth pixel electrode PE6 is electrically connected to the sixth drain electrode DE6 of the sixth switching element T6. Each of the fifth and sixth pixel electrodes PE5 and PE6 includes a stem portion E1 and a branch portion E2. The stem portions E1 may partially overlap with the third data line DL3 and the first power line VL1. The branch portions E2 may inclinedly extend from the respective stem portions E1 toward the pixel area by an angle of about 45 degrees (or about −45 degrees). The branch portion E2 of the fifth pixel electrode PE5 and the branch portion E2 of the sixth pixel electrode PE6 may be disposed in an alternating arrangement.

The fifth pixel electrode PE5 which is formed at a lower portion of the pixel area with respect to the connection electrode pattern CEP is electrically connected to the connection electrode pattern CEP through the ninth contact hole C9. In addition, the fifth pixel electrode PE5 which is formed at an upper portion of the pixel area with respect to the connection electrode pattern CEP is electrically connected to the connection electrode pattern CEP through the tenth contact hole C10. Thus, the fifth pixel electrode PE5 formed at the upper portion of the pixel area may be electrically connected to the fifth pixel electrode PE5 formed at the lower portion of the pixel area. The sixth pixel electrode PE6 is formed at the upper portion and the lower portion of the pixel area.

The sixth pixel electrode PE6 which partially overlaps with an upper portion of the third data line DL3 is formed through the first upper trench TU1 of the first shield part SH1, and the fifth pixel electrode PE5 which partially overlaps with a lower portion of the third data line DL3 is formed through the first lower trench TD1 of the first shield part SH1. The fifth pixel electrode PE5 which overlaps with an upper portion of the first power line VL1 is formed through the second upper trench TU2 of the second shield part SH2, and the sixth pixel electrode PE6 which overlaps with a lower portion of the first power line VL1 is formed through the second lower trench TD2 of the second shield part SH2.

The first connection line CL1 is electrically connected to the first power line VL1 through the eighth contact hole C8, and is extended in the second direction DI2. The first connection line CL1 is protruded toward the sixth source electrode SE6 to be electrically connected to the sixth source electrode SE6 through the third contact hole C3 on a plan view.

According to the present exemplary embodiment, the first and second shield parts SH1 and SH2 have trenches having the pixel electrodes formed therethrough, so that an aperture ratio of the LCD panel may be enhanced.

Figure 9:
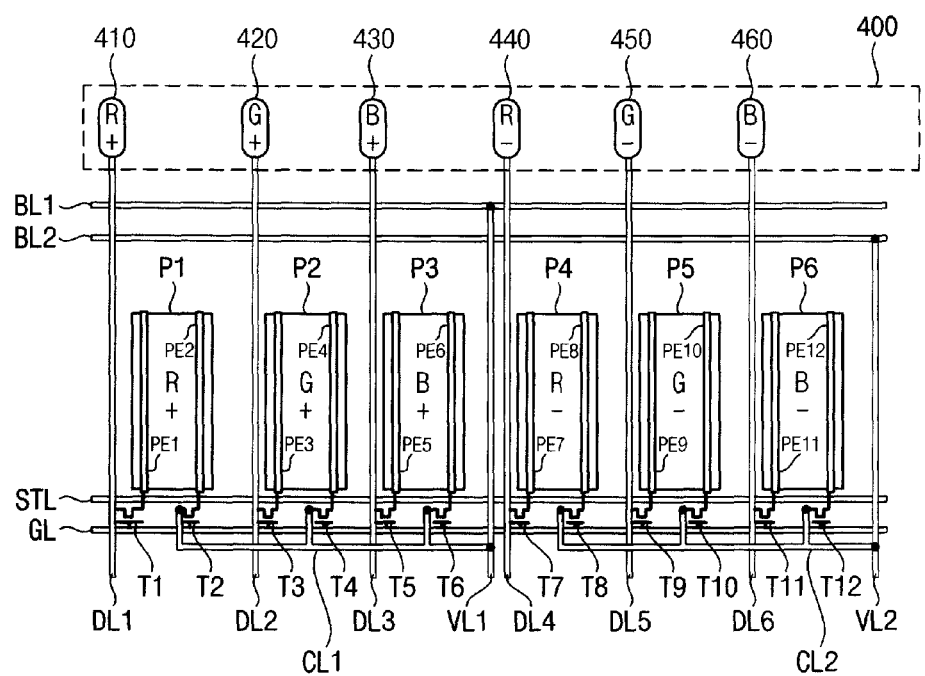
FIG. 9 is a schematic diagram illustrating an LCD panel according to another exemplary embodiment of the present invention.
Figure 9:
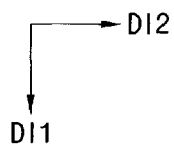

FIG. 9 is a schematic diagram illustrating an LCD panel 1000B according to another exemplary embodiment of the present invention.

Referring to FIG. 9, an LCD device includes the LCD panel 1000B. The LCD panel 1000B may further include a storage line STL in comparison with the LCD panel 1000 of FIGS. 1 to 3.

The storage line STL is extended in the second direction DI2, and is disposed adjacent to the gate line GL. A storage voltage is applied to the storage line STL. The storage voltage may be a direct current (DC) having a predetermined level in spite of a frame. A reference voltage is applied to the storage line STL. A voltage of a first polarity (for example, a negative (−) polarity) with respect to the reference voltage is applied to the first power line VL1, and a voltage of a second polarity (for example, a positive (+) polarity) with respect to the reference voltage is applied to the second power line VL2. In accordance with the above, a voltage of a second polarity (a positive (+) polarity) having a level higher than a voltage applied to the first power line VL1 is applied to the first, second and third data lines DL1, DL2 and DL3, and a voltage of a first polarity (for example, a negative (−) polarity) having a level lower than a voltage applied to the second power line VL2 is applied to the fourth, fifth and sixth data lines DL4, DL5 and DL6.

For example, the storage line STL partially overlaps with extending portions of switching elements included on the first, second, third, fourth, fifth and sixth pixel parts P1, P2, P3, P4, P5 and P6, so that storage capacitors may be defined. A variation of a voltage applied to the pixel parts P1, P2, P3, P4, P5 and P6 is decreased by the storage capacitors, so that display quality may be enhanced.

Hereinafter, as an example, a pixel structure and a manufacturing method according to the present exemplary embodiment will be explained by using the third pixel part P3 of FIG. 9.

Figure 10:
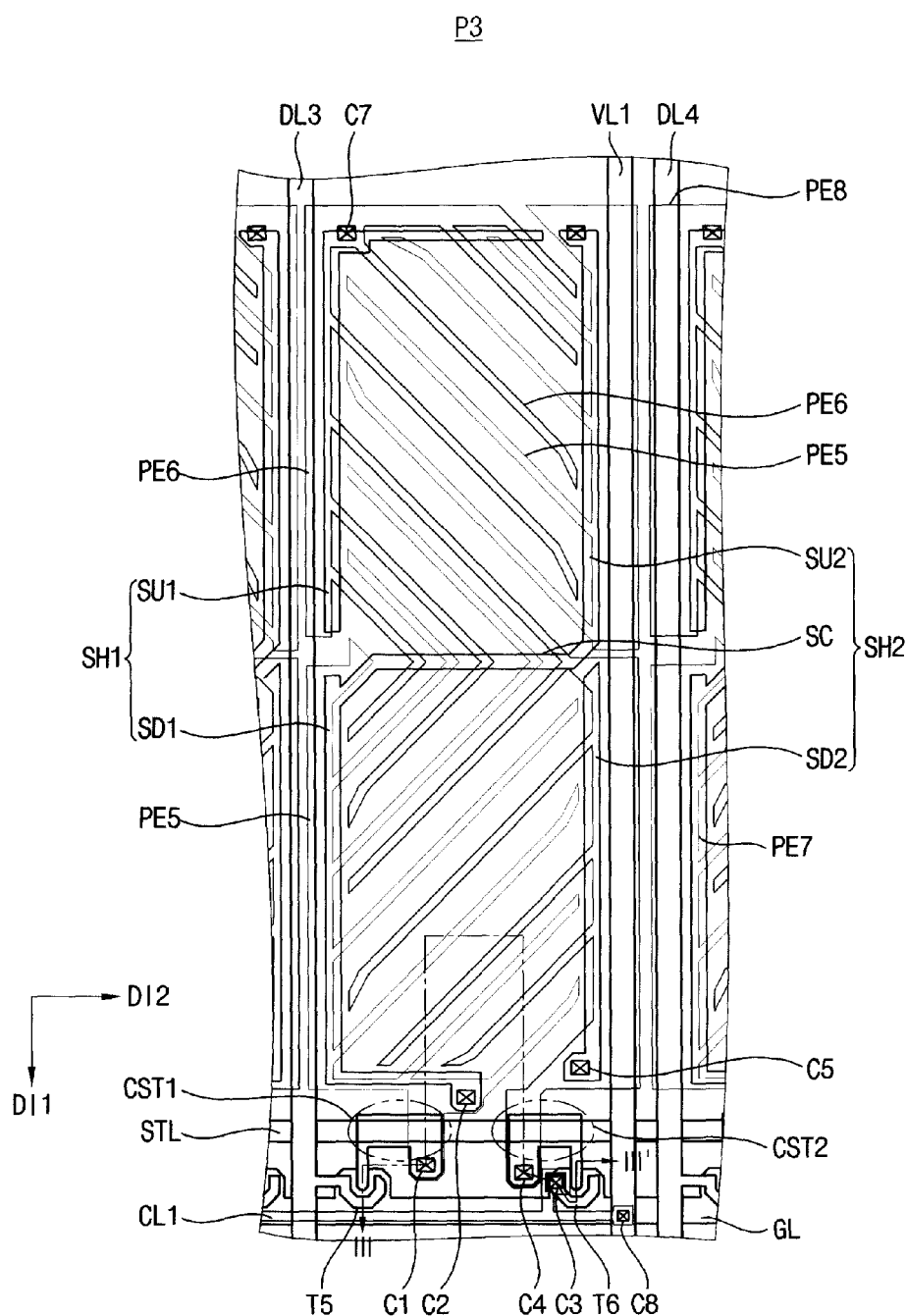
FIG. 10 is a plan view showing the LCD panel of FIG. 9.
Figure 11:
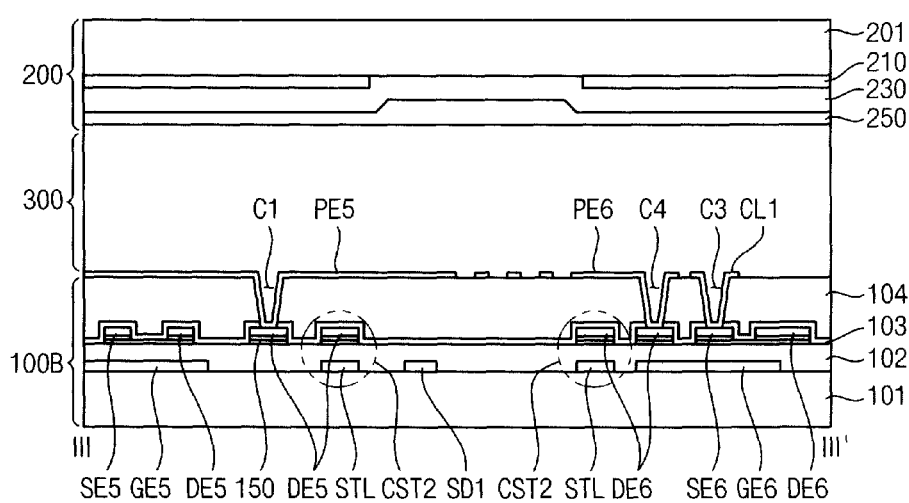
FIG. 11 is a cross-sectional view taken along line III-III' of FIG. 9.

FIG. 10 is a plan view showing the LCD panel of FIG. 9. FIG. 11 is a cross-sectional view taken along line III-III' of FIG. 10.

Referring to FIGS. 10 and 11, the LCD panel 1000B includes a display substrate 100B, an opposite substrate 200 and a liquid crystal layer 300. The LCD panel 1000B according to the present exemplary embodiment may be substantially the same as the LCD panel 1000 of FIG. 1, and thus any repetitive detailed explanation will hereinafter be omitted or simplified. Moreover, the display substrate 100B according to the present exemplary embodiment may be substantially the same as the display substrate 100 of FIG. 1, and thus any repetitive detailed explanation will hereinafter be simplified.

The display substrate 100B includes a first base substrate 101, the gate line GL, the storage line STL, a first shield part SH1, a second shield part SH2, the third data line DL3, the first power line VL1, the fourth data line DL4, a fifth pixel electrode PE5, a sixth pixel electrode PE6, a seventh pixel electrode PE7, an eighth pixel electrode PE8, and a first connection line CL1.

The gate line GL is extended in the second direction DI2. A fifth gate electrode GE5 and a sixth gate electrode GE6 are protruded from the gate line GL in a plan view.

The storage line STL is extended in the second direction DI2, and is disposed adjacent to the gate line GL.

The first shield part SH1 is disposed adjacent to a self data line, that is, the third data line DL3, which delivers a data voltage to the third pixel part P3. The first shield part SH1 includes a first upper shield SU1 adjacent to an upper portion of the third data line DL3 and a first lower shield SD1 adjacent to a lower portion of the third data line DL3. The second shield part SH2 is disposed adjacent to the first power line VL1 (or a neighboring data line). The second shield part SH2 includes a second upper shield SU2 adjacent to an upper portion of the first power line VL1 and a second lower shield SD2 adjacent to a lower portion of the first power line VL1. The first and second shield parts SH1 and SH2 may be formed by the first upper trench TU1, the first lower trench TD1, the second upper trench TU2 and the second lower trench TD2, as described in FIGS. 6 and 7.

The third data line DL3 is extended in the first direction DI1. A fifth source electrode SE5 is protruded from the third data line DL3 to be disposed on the fifth gate electrode GE5 in a plan view. A fifth drain electrode DE5 is spaced apart from the fifth source electrode SE5 to partially overlap with the fifth gate electrode GE5, and is electrically connected to the fifth pixel electrode PE5 through a first contact hole Cl. The fifth drain electrode DE5 includes an extending portion. The extending portion partially overlaps with the storage line STL to form a first storage capacitor CST1.

A sixth source electrode SE6 is electrically connected to the first connection line CL1 through a third contact hole C3, and is disposed on the sixth gate electrode GE6. The first connection line CL1 is electrically connected to the first power line VL1. A sixth drain electrode DE6 is spaced apart from the sixth source electrode SE6 to partially overlap with the sixth gate electrode GE6, and is electrically connected to the sixth pixel electrode PE6 through a fourth contact hole C4. The sixth drain electrode DE6 includes an extending portion. The extending portion partially overlaps with the storage line STL to form a second storage capacitor CST2.

The fourth data line DL4 is extended in the first direction DI1. A seventh pixel electrode PE7 is electrically connected to the fourth data line DL4 through a seventh switching element T7 (as shown in FIG. 9), and an eighth pixel electrode PE8 is electrically connected to a second connection line CL2 through an eighth switching element T8 (as shown in FIG. 9).

The third data line DL3 may overlap with a stem portion of the fifth pixel electrode PE5, and the fourth data line DL4 may overlap with a stem portion of the seventh pixel electrode PE7. Thus, a generation of a light leakage may be prevented, which is generated between the third and fourth pixel parts P3 and P4 having different polarities.

Moreover, the first power line VL1 and the fourth data line DL4 may be spaced apart from each other across an interval (gap). The interval between the first power line VL1 and the fourth data line DL4 may be about 7 μm to about 13 μm. Thus, a generation of a light leakage may be prevented, which would be generated between the third and fourth pixel parts P3 and P4 having different polarities.

The first connection line CL1 overlaps with the gate line GL (as shown in FIG. 10). Similarly, the second connection line CL2 (FIG. 9) overlaps with the gate line. Thus, an aperture ratio of the LCD panel may be enhanced.

Figure 12A:
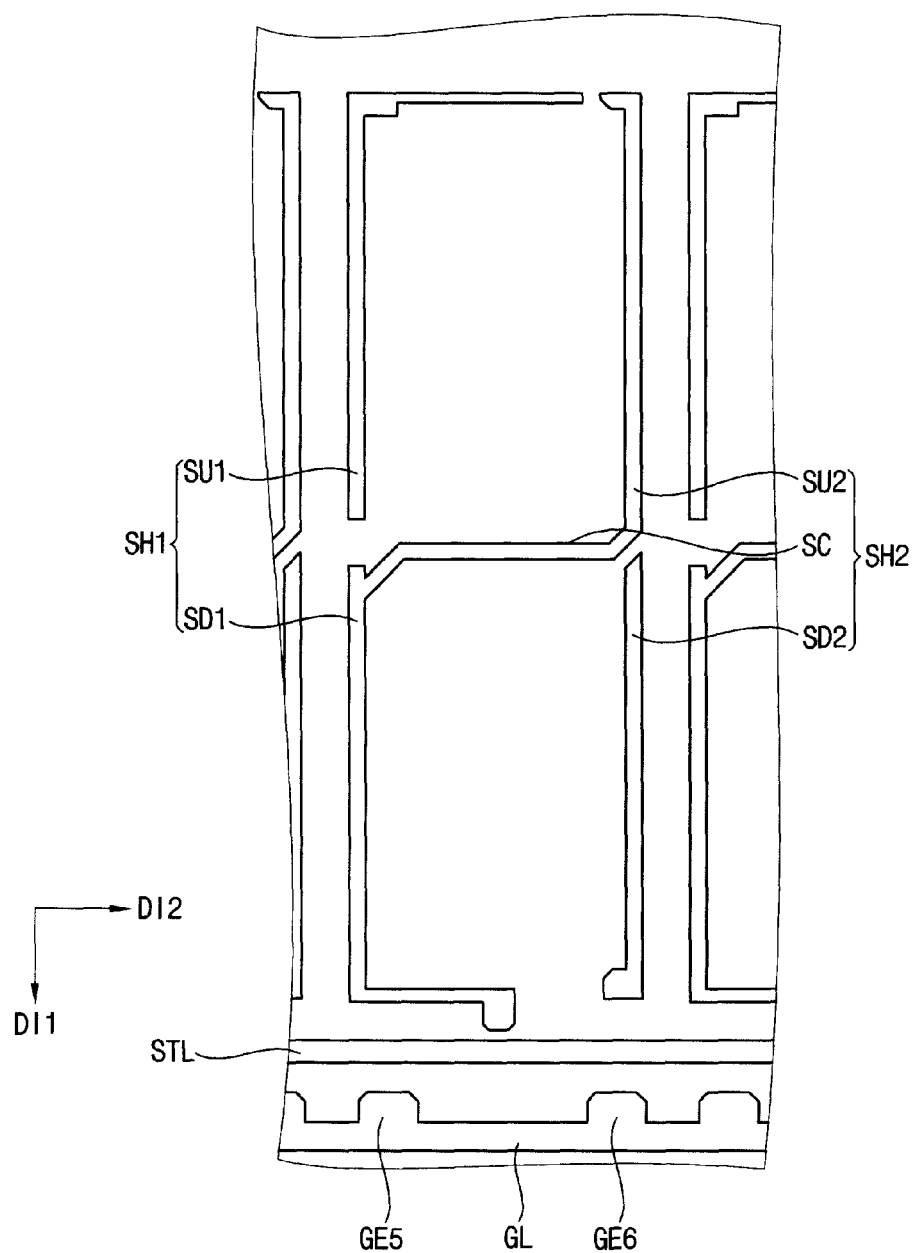
FIG. 12A, FIG. 12B and FIG. 12C are plan views explaining a method of manufacturing the display substrate of FIG. 11.
Figure 12B:
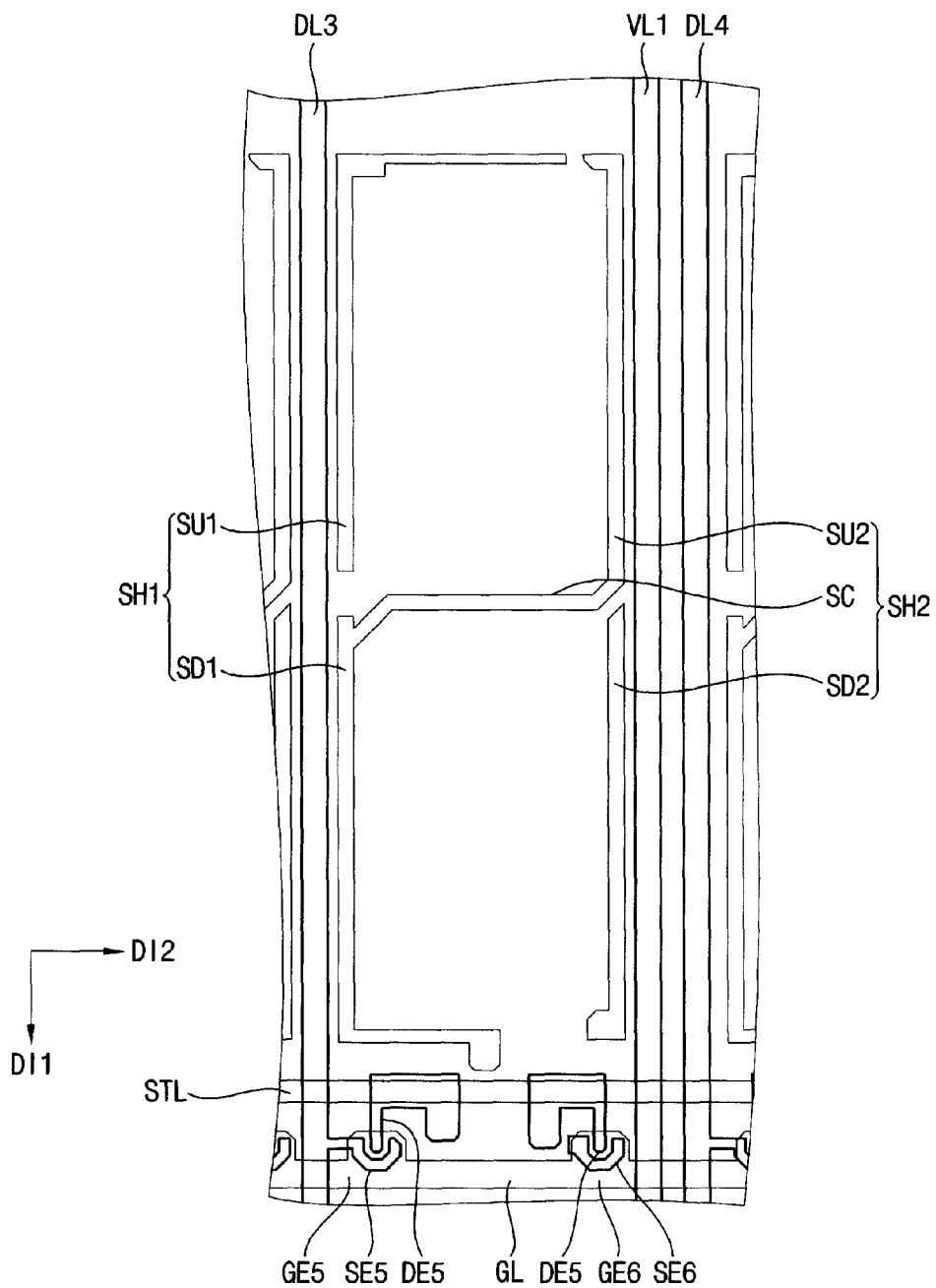
Figure 12C:
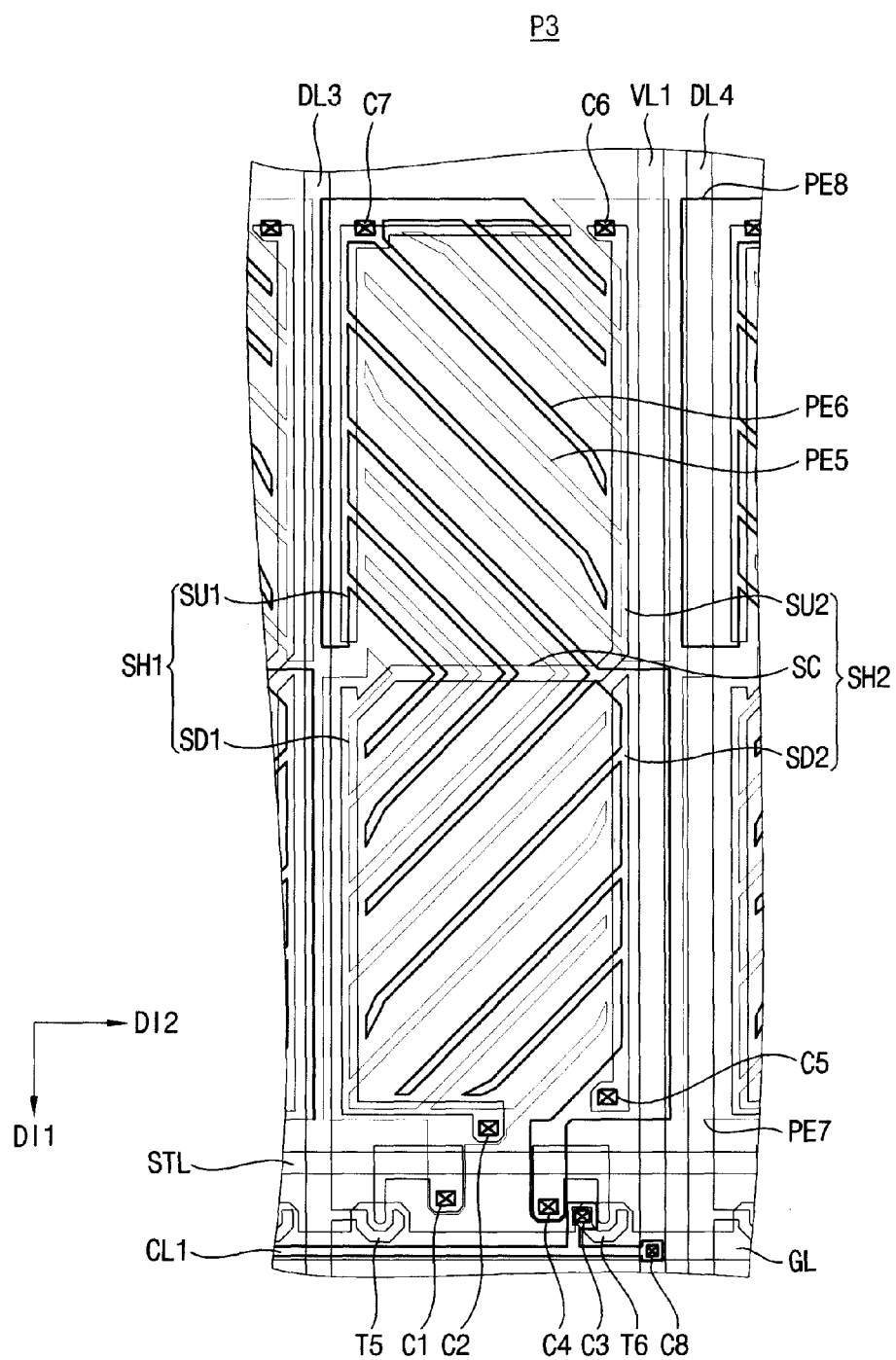

FIGS. 12A to 12C are plan views explaining a method of manufacturing the display substrate of FIG. 11. Hereinafter, any repetitive detailed explanation about the identical elements of FIG. 1 will be omitted.

Referring to FIGS. 11 and 12A, a first metal layer is formed on the first base substrate 101, and then the first metal pattern is patterned to form a first metal pattern. The first metal pattern includes the gate line GL, the fifth gate electrode GE5, the sixth gate electrode GE6, the storage line STL, the first shield part SH1 and the second shield part SH2.

The storage line STL is extended in the second direction DI2, and is disposed adjacent to the gate line GL.

A gate insulation layer 102 is formed on the first base substrate 101 on which the first metal pattern is formed, so that the first metal pattern is covered by the gate insulation layer 102.

Referring to FIGS. 11 and 12B, a semiconductor layer and a second metal layer are formed on the gate insulation layer 102, and then the semiconductor layer and the second metal layer are patterned to form a second metal pattern. The second metal pattern includes the third data line DL3, the fourth data line DL4, the fifth source electrode SE5, the fifth drain electrode DE5, the sixth source electrode SE6, the sixth drain electrode DE6 and the first power line VL1.

The fifth drain electrode DE5 is spaced apart from the fifth source electrode SE5, and an extending portion of the fifth drain electrode DE5 is partially overlapped with the storage line STL. The sixth drain electrode DE6 is spaced apart from the sixth source electrode SE6, and an extending portion of the sixth drain electrode DE6 is partially overlapped with the storage line STL.

Referring to FIGS. 11 and 12C, a protection insulation layer 103 covering the second metal pattern is formed on the first base substrate 101 on which the second metal pattern is formed. The protection insulation layer 103 and the gate insulation layer 102 are etched to form the first contact hole C1, the second contact hole C2, the third contact hole C3, the fourth contact hole C4, a fifth contact hole C5, a sixth contact hole C6, a seventh contact hole C7 and an eighth contact hole C8. An organic insulation layer 104 is formed on the first base substrate 101. The organic insulation layer 104 is patterned to remove the organic insulation layer 104 corresponding to the first to eighth contact holes C1, C2, C3, C4, C5, C6, C7 and C8. Although not shown in FIGS. 11 and 12C, the gate insulation layer 102, the protection insulation layer 103 and the organic insulation layer 104 may be removed from the first and second shield parts SH1 and SH2, so that a first upper trench TU1, a first lower trench TD1, a second upper trench TU2 and a second lower trench TD2 may be formed, in a similar manner to the exemplary embodiment described with reference to FIGS. 6 and 7.

A transparent conductive layer is formed on the first base substrate 101 having the first to eighth contact holes C1, C2, C3, C4, C5, C6, C7 and C8 formed therethrough, and then the transparent conductive layer is patterned to form a transparent electrode pattern. The transparent electrode pattern includes the fifth pixel electrode PE5, the sixth pixel electrode PE6, the seventh pixel electrode PE7, the eighth pixel electrode PE8 and the first connection line CL1.

A stem portion of the fifth pixel electrode PE5 may be formed to overlap with the third data line DL3, and a stem portion of the seventh pixel electrode PE7 may be formed to overlap with the fourth data line DL4.

The first connection line CL1 is formed on the gate line GL to overlap with the gate line GL.

According to the present exemplary embodiment, the storage line receiving a direct voltage of a uniform level is formed, so that voltage variation of a pixel part is decreased to enhance display quality. Moreover, a data line and a power line between pixel parts having different polarities are overlapped with an adjacent pixel electrode, so that light leakage may be prevented. Moreover, a connection line connecting the power line and a switching element is overlapped with a gate line, so that an aperture ratio may be enhanced.

Figure 13:
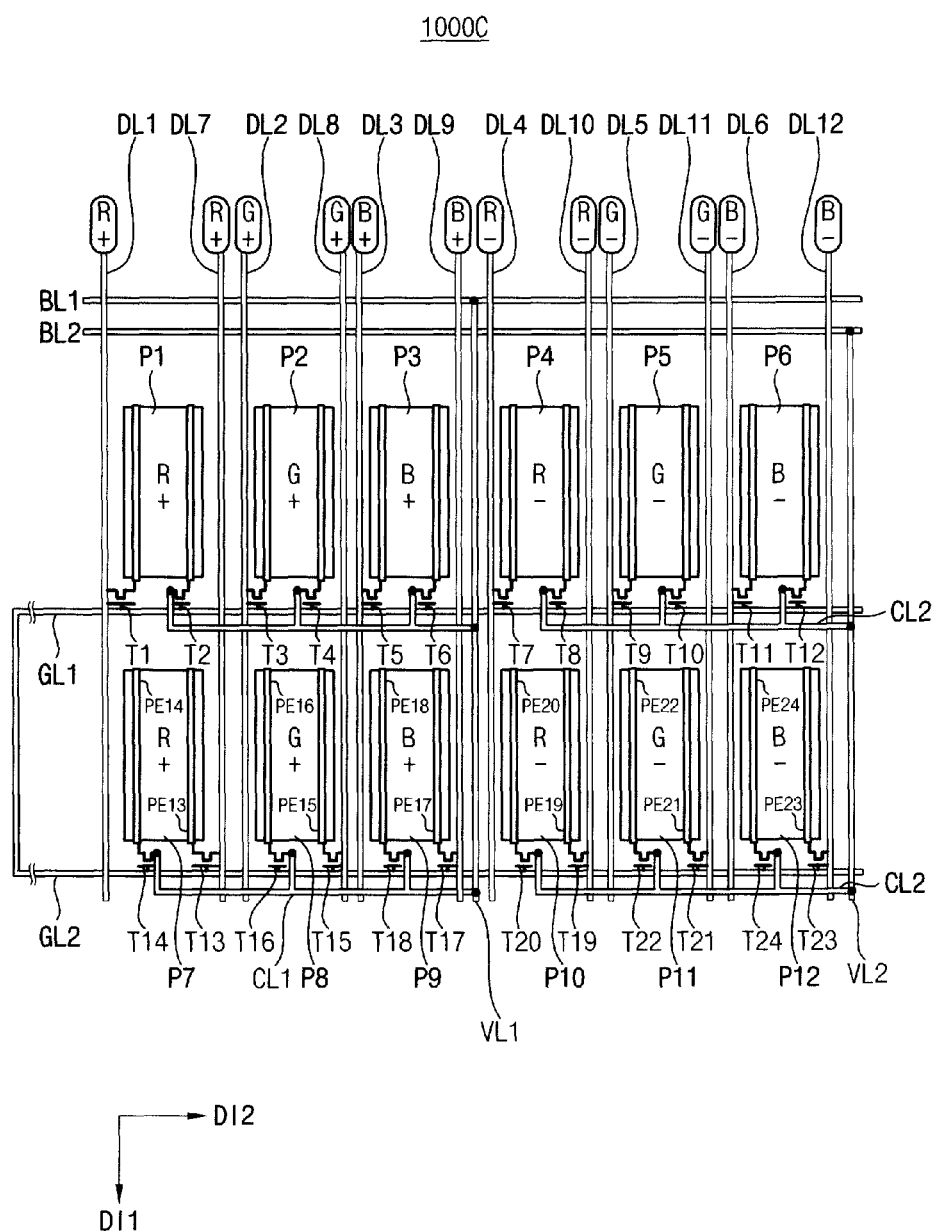
FIG. 13 is a schematic diagram illustrating an LCD panel according to another exemplary embodiment of the present invention.

FIG. 13 is a schematic diagram illustrating an LCD panel 1000C according to another exemplary embodiment of the present invention.

Referring to FIG. 13, the LCD panel 1000C includes plural data lines DL1, DL2, DL3, DL4, DL5, DL6, DL7, DL8, DL9, DL10, DL11 and DL12, a first bus line BL1, a second bus line BL2, a first power line VL1, a second power line VL2, a first gate line GL1, a second gate line GL2 and plural pixel parts P1, P2, P3, P4, P5, P6, P7, P8, P9, P10, P11 and P12. The plural pixel parts P1, P2, P3, P4, P5, P6, P7, P8, P9, P10, P11 and P12 include a primary color pixel.

As with the previous embodiment described in connection with FIGS. 1 to 4, the first to sixth pixel parts P1, P2, P3, P4, P5 and P6 include first to twelfth pixel electrodes PE1, PE2, . . . , PE12. The first to twelfth pixel electrodes PE1, PE2, . . . , PE12 are electrically connected to the first to sixth data lines DL1, DL2, DL3, DL4, DL5 and DL6, the power lines VL1 and VL2 and the first gate line GL1. In this exemplary embodiment, a detailed explanation for a connection structure concerning the first to sixth pixel parts P1, P2, P3, P4, P5 and P6 will be omitted.

The second gate line GL2 is extended in the second direction DI2.

As shown in FIG. 13, the first and second gate lines GL1 and GL2 may be connected to each other at a peripheral area of the LCD panel. In this case, a gate signal outputted from the gate driving part may be simultaneously applied to the first and second gate lines GL1 and GL2. Alternatively, the first and second gate lines GL1 and GL2 may be separated from each other. In this case, the gate driving part may simultaneously output the gate signal to each of the first and second gate lines GL1 and GL2. Accordingly, two pixel rows electrically connected to the first and second gate lines GL1 and GL2 may be simultaneously driven. The seventh pixel part P7 includes a thirteenth pixel electrode PE13, a fourteenth pixel electrode PE 14, a thirteenth switching element T13 and a fourteenth switching element T14. The thirteenth pixel electrode PE13 is connected to the seventh data line DL7 and the second gate line GL2 through the thirteenth switching element T13. The seventh data line DL7 is disposed between the first and second data lines DL1 and DL2, and is disposed adjacent to the second data line DL2. The fourteenth pixel electrode PE14 is spaced apart from the thirteenth pixel electrode PE13, and is connected to the first power line VL1 and the second gate line GL2 through the fourteenth switching element T14. The fourteenth switching element T14 is connected to the first power line VL1 through a first connection line CL1.

The eighth pixel part P8 includes a fifteenth pixel electrode PE15, a sixteenth pixel electrode PE16, a fifteenth switching element T15 and a sixteenth switching element T16. The fifteenth pixel electrode PE15 is connected to the eighth data line DL8 and the second gate line GL2 through the fifteenth switching element T15. The eighth data line DL8 is disposed between the second and third data lines DL2 and DL3, and is disposed adjacent to the third data line DL3. The sixteenth pixel electrode PE16 is spaced apart from the fifteenth pixel electrode PE15 to be connected to the first power line VL1 and the second gate line GL2 through the sixteenth switching element T16. The sixteenth switching element T16 is connected to the first power line VL1 through the first connection line CL1.

The ninth pixel part P9 includes a seventeenth pixel electrode PE17, an eighteenth pixel electrode PE18, a seventeenth switching element T17 and an eighteenth switching element T18. The seventeenth pixel electrode PE17 is connected to the ninth data line DL9 and the second gate line GL2 through the seventeenth switching element T17. The ninth data line DL9 is disposed between the third data line DL3 and the first power line VL1, and is disposed adjacent to the first power line VL1. The eighteenth pixel electrode PE18 is spaced apart from the seventeenth pixel electrode PE17 to be connected to the first power line VL1 and the second gate line GL2 through the eighteenth switching element T18. The eighteenth switching element T18 is connected to the first power line VL1 through the first connection line CL1.

The tenth pixel part P10 includes a nineteenth pixel electrode PE19, a twentieth pixel electrode PE20, a nineteenth switching element T19 and a twentieth switching element T20. The nineteenth pixel electrode PE19 is connected to the tenth data line DL10 and the second gate line GL2 through the nineteenth switching element T19. The tenth data line DL10 is disposed between the fourth and fifth data lines DL4 and DL5, and is disposed adjacent to the fifth data line DL5. The twentieth pixel electrode PE20 is spaced apart from the nineteenth pixel electrode PE19 to be connected to the second power line VL2 and the second gate line GL2 through the twentieth switching element T20. The twentieth switching element T20 is connected to the second power line VL2 through a second connection line CL2.

The eleventh pixel part P11 includes a twenty-first pixel electrode PE21, a twenty-second pixel electrode PE22, a twenty-first switching element T21 and a twenty-second switching element T22. The twenty-first pixel electrode PE21 is connected to the eleventh data line DL11 and the second gate line GL2 through the twenty-first switching element T21. The eleventh data line DL11 is disposed between the fifth and sixth data lines DL5 and DL6, and is disposed adjacent to the sixth data line DL6. The twenty-second pixel electrode PE22 is spaced apart from the twenty-first pixel electrode PE21 to be connected to the second power line VL2 and the second gate line GL2 through the twenty-second switching element T22. The twenty-second switching element T22 is connected to the second power line VL2 through the second connection line CL2.

The twelfth pixel part P12 includes a twenty-third pixel electrode PE23, a twenty-fourth pixel electrode PE24, a twenty-third switching element T23 and a twenty-fourth switching element T24. The twenty-third pixel electrode PE23 is connected to the twelfth data line DL12 and the second gate line GL2 through the twenty-third switching element T23. The twelfth data line DL12 is disposed between the sixth data line DL6 and a second power line VL2, and is disposed adjacent to the second power line VL2. The twenty-fourth pixel electrode PE24 is spaced apart from the twenty-third pixel electrode PE23 to be connected to the second power line VL2 and the second gate line GL2 through the twenty-fourth switching element T24. The twenty-fourth switching element T24 is connected to the second power line VL2 through the second connection line CL2.

A voltage of a first polarity (for example, a negative (−) polarity) with respect to a reference voltage is applied to the first power line VL1, and a voltage of a second polarity (for example, a positive (+) polarity) with respect to the reference voltage is applied to the second power line VL2. A voltage of a second polarity (a positive (+) polarity) having a level higher than a voltage applied to the first power line VL1 is applied to the first, second, third, seventh, eighth and ninth data lines DL1, DL2, DL3, DL7, DL8 and DL9, and a voltage of a first polarity (for example, a negative (−) polarity) having a level lower than a voltage applied to the second power line VL2 is applied to the fourth, fifth, sixth, tenth, eleventh and twelfth data lines DL4, DL5, DL6, DL10, DL11 and DL12.

According to the present exemplary embodiment, one pixel row receives a data voltage through two data lines, and two pixel columns receive one gate signal through two gate lines, so that two pixel columns may be driven for one horizontal period (1H). That is, the LCD panel 1000C may be driven at a high speed. Moreover, one power line is shared by three pixel parts and the same polarity data voltage is applied by the one power line, so that a generation of a light leakage in a black state may be minimized. Moreover, the number of power lines is decreased, so that an aperture ratio of a display substrate may be enhanced.

Figure 14:
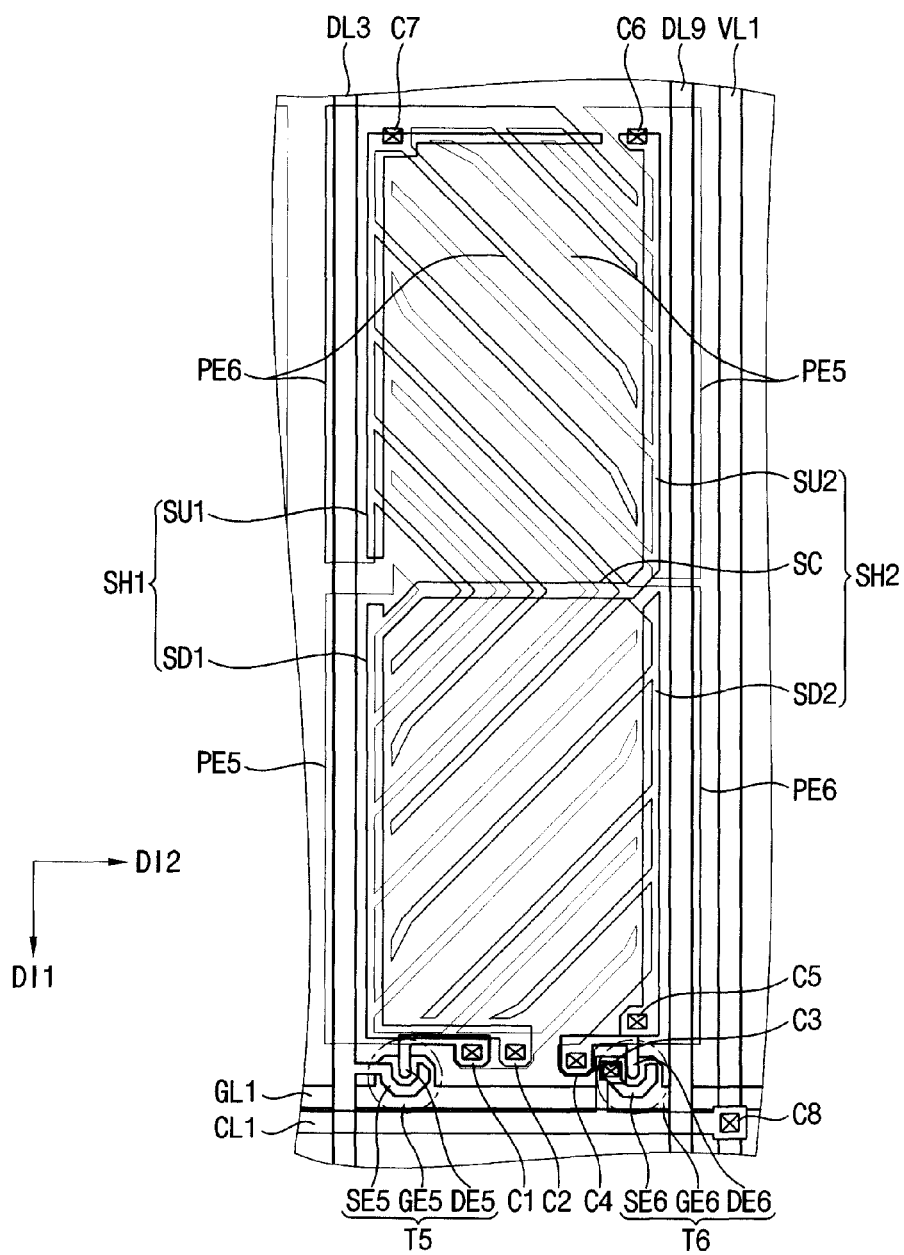
FIG. 14 is a plan view showing the LCD panel of FIG. 13.

FIG. 14 is a plan view showing the LCD panel 1000C of FIG. 13. Hereinafter, any repetitive detailed explanation about the identical elements of FIG. 1 will be omitted or simplified.

Referring to FIGS. 13 and 14, the LCD panel 1000C includes the third data line DL3, the ninth data line DL9, the first power line VL1, the first gate line GL1 and the third pixel part P3.

The third data line DL3 and the ninth data line DL9 are extended along a first direction DI1, and the third pixel part P3 is disposed between the third and ninth data lines DL3 and DL9. The first power line VL1 is disposed adjacent to the ninth data line DL9.

The first gate line GL1 is extended along the second direction DI2.

The third pixel part P3 includes a fifth switching element T5, a fifth pixel electrode PE5, a sixth switching element T6, a sixth pixel electrode PE6, a first shield part SH1 and a second shield part SH2. The fifth switching element T5 includes a fifth gate electrode GE5 connected to the first gate line GL1, a fifth source electrode SE5 connected to the third data line DL3, and a fifth drain electrode DE5 spaced apart from the fifth source electrode SE5 to be connected to the fifth pixel electrode PE5 through a first contact hole Cl.

The sixth switching element T6 includes a sixth gate electrode GE6 connected to the first gate line GL1, a sixth source electrode SE6 electrically connected to the first power line VL1 through the first connection line CL1, and a sixth drain electrode DE6 spaced apart from the sixth source electrode SE6 to be connected to the sixth pixel electrode PE6 through a fourth contact hole C4. The sixth source electrode SE6 is connected to the first connection line CL1 through a third contact hole C3.

The first shield part SH1 includes a first upper shield part SU1 and a first lower shield part SD1 to be disposed adjacent to a self data line, that is, the third data line DL3 delivering a data voltage to the third pixel part P3.

The second shield part SH2 includes a second upper shield SU2 and a second lower shield SD2 to be disposed adjacent to a neighboring data line, that is, the ninth data line DL9 delivering a data voltage to the ninth pixel part P9 adjacent to the third pixel part P3 in the first direction DI1. The first and second shield parts SH1 and SH2 may be a metal pattern. For example, the first and second shield parts SH1 and SH2 may be a metal pattern formed from a metal layer identical to the first gate line GL1.

A method of manufacturing the display substrate according to the present exemplary embodiment is substantially the same as the method of manufacturing the display substrate described in FIGS. 5A to 5D. In this case, the ninth data line DL9 may be formed when the second metal pattern including the third data line DL3 is formed. Thus, any explanation for the method of manufacturing the display substrate according to the present exemplary embodiment will hereinafter be omitted.

Figure 15:
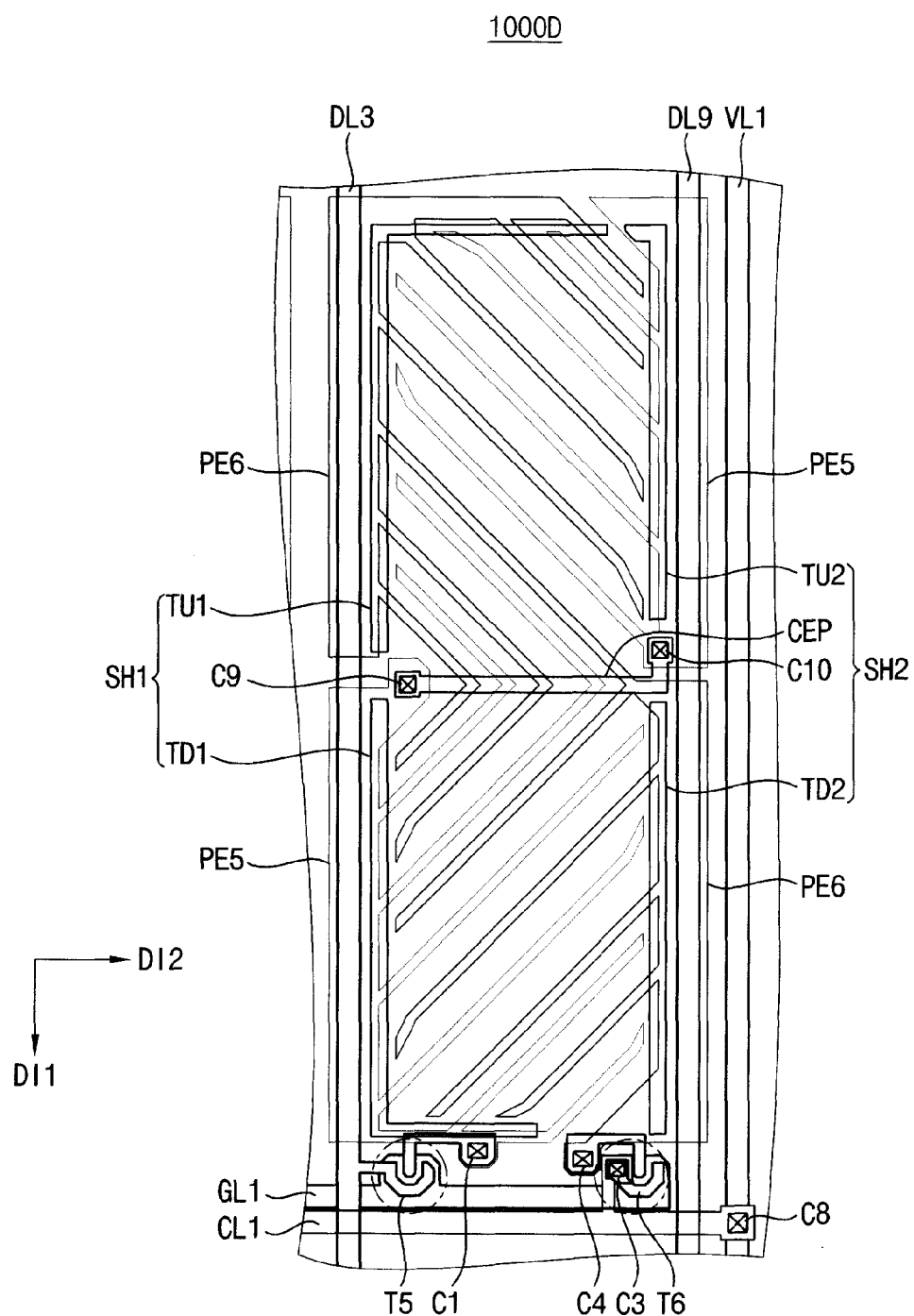
FIG. 15 is a plan view showing an LCD panel according to another exemplary embodiment of the present invention.

FIG. 15 is a plan view showing an LCD panel 1000D according to another exemplary embodiment of the present invention.

Referring to FIGS. 13 and 15, the LCD panel 1000D may be substantially the same as the LCD panel 1000C of FIG. 13 except that first and second shield parts SH1 and SH2 have a trench structure as shown in FIG. 7.

The LCD panel 1000D includes the first shield part SH1, the second shield part SH2 and a connection electrode pattern CEP. The first and second shield parts SH1 and SH2 will be explained with reference to the previous embodiment described in connection with FIG. 7.

The first shield part SH1 includes a first upper trench TU1 and a first lower trench TD1 to be disposed adjacent to a self data line, that is, the third data line DL3 delivering a data voltage to the third pixel part P3. The gate insulation layer 102, the protection insulation layer 103 and the organic insulation layer 104 are removed to form the first upper trench TU1 and the first lower trench TD1. The sixth pixel electrode PE6 partially overlapped with an upper portion of the third data line DL3 is formed through the first upper trench TU1, and the fifth pixel electrode PE5 partially overlapped with a lower portion of the third data line DL3 is formed through the first lower trench TD1.

The second shield part SH2 is disposed adjacent to a neighbor data line, that is the ninth data line DL9, which deliveries a data voltage to a ninth pixel part P9 neighboring the third pixel part P3 along the first direction DI1. The second shield part SH2 includes a second upper trench TU2 and a second lower trench TD2. The gate insulation layer 102, the protection insulation layer 103 and the organic insulation layer 104 are removed to form the second upper trench TU2 and the second lower trench TD2. The fifth pixel electrode PE5 partially overlapped with an upper portion of the ninth data line DL9 is formed through the second upper trench TU2, and the sixth pixel electrode PE6 partially overlapped with a lower portion of the ninth data line DL9 is formed through the second lower trench TD2.

The first metal pattern may include the connection electrode pattern CEP. The connection electrode pattern CEP is extended from a center portion of the pixel area along the second direction DI2 to be electrically connected to the fifth pixel electrode PE5 disposed in the lower pixel area and the fifth pixel electrode PE5 disposed in the upper pixel area in a plan view. The connection electrode CEP is electrically connected to the fifth pixel electrode PE5 partially overlapped with the third data line DL3 through a ninth contact hole C9, and is electrically connected to the fifth pixel electrode PE5 partially overlapped with the ninth data line DL9 through a tenth contact hole C10.

In a similar manner to the previous embodiment described in connection with FIGS. 1 to 4, the first and second shield parts SH1 and SH2 may prevent an electric field of the data line or the power line from being leaked, and may prevent a light leakage from being generated between the data line and the power line or between the data line and the pixel electrode. In addition, the first and second shield parts SH1 and SH2 have a structure in which the pixel electrode is formed through a trench, so that an aperture ratio of the display substrate may be enhanced in comparison with the display substrate according to the previous embodiment described in connection with FIGS. 1 to 4.

A method of manufacturing the display substrate according to the present exemplary embodiment is substantially the same as the method of manufacturing the display substrate described in FIGS. 8A to 8D. In this case, the ninth data line DL9 may be formed when the second metal pattern including the third data line DL3 is formed. Thus, any explanation for the method of manufacturing the display substrate according to the present exemplary embodiment will hereinafter be omitted.

Figure 16:
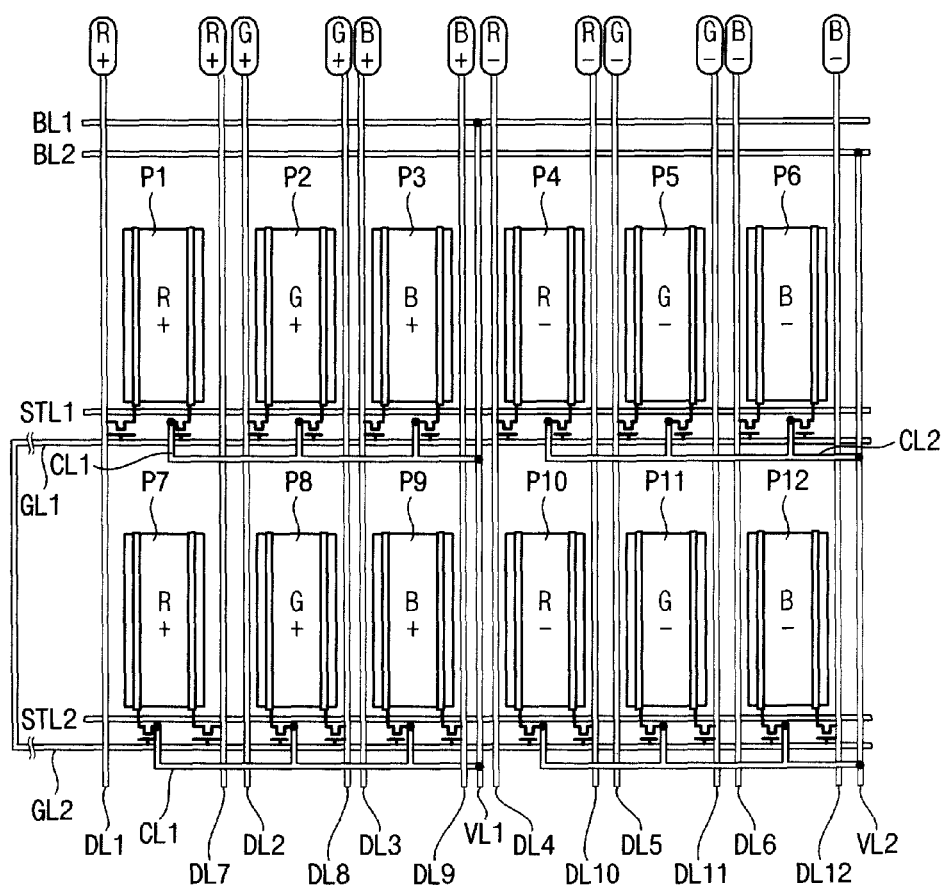
FIG. 16 is a schematic diagram illustrating an LCD panel according to another exemplary embodiment of the present invention.

FIG. 16 is a schematic diagram illustrating an LCD panel 1000E according to another exemplary embodiment of the present invention.

Referring to FIG. 16, the LCD panel 1000E further includes a first storage line STL1 and a second storage line STL2 in comparison with the LCD panel 1000C of FIG. 13.

The first storage line STL1 is extended in the second direction DI2 to be disposed adjacent to the first gate line GL1. The first storage line STL1 partially overlaps with extending portions of switching elements included in pixel parts corresponding to a pixel row electrically connected to the first gate line GL1, so that storage capacitors may be formed.

The second storage line STL2 is extended in the second direction DI2 to be disposed adjacent to the second gate line GL2. The second storage line STL2 partially overlaps with extending portions of switching elements included in pixel parts corresponding to a pixel row electrically connected to the second gate line GL2, so that storage capacitors may be formed. Each storage capacitor may decrease a voltage variation of the pixel part to enhance display quality.

As shown in FIG. 16, the first and second gate lines GL1 and GL2 may be connected to each other at a peripheral area of the LCD panel. In this case, a gate signal outputted from the gate driving part may be simultaneously applied to the first and second gate lines GL1 and GL2. Moreover, the first and second gate lines GL1 and GL2 may be separated from each other. In this case, the gate driving part may simultaneously output the gate signal to each of the first and second gate lines GL1 and GL2. Accordingly, two pixel rows electrically connected to the first and second gate lines GL1 and GL2 may be simultaneously driven.

A pixel part according to the present exemplary embodiment may include first and second shield parts SH1 and SH2 formed from the first metal pattern of FIGS. 1 to 4. Alternatively, a pixel part according to the present exemplary embodiment may include first and second shield parts SH1 and SH2 of a trench structure of FIGS. 6 to 8D.

Figure 17:
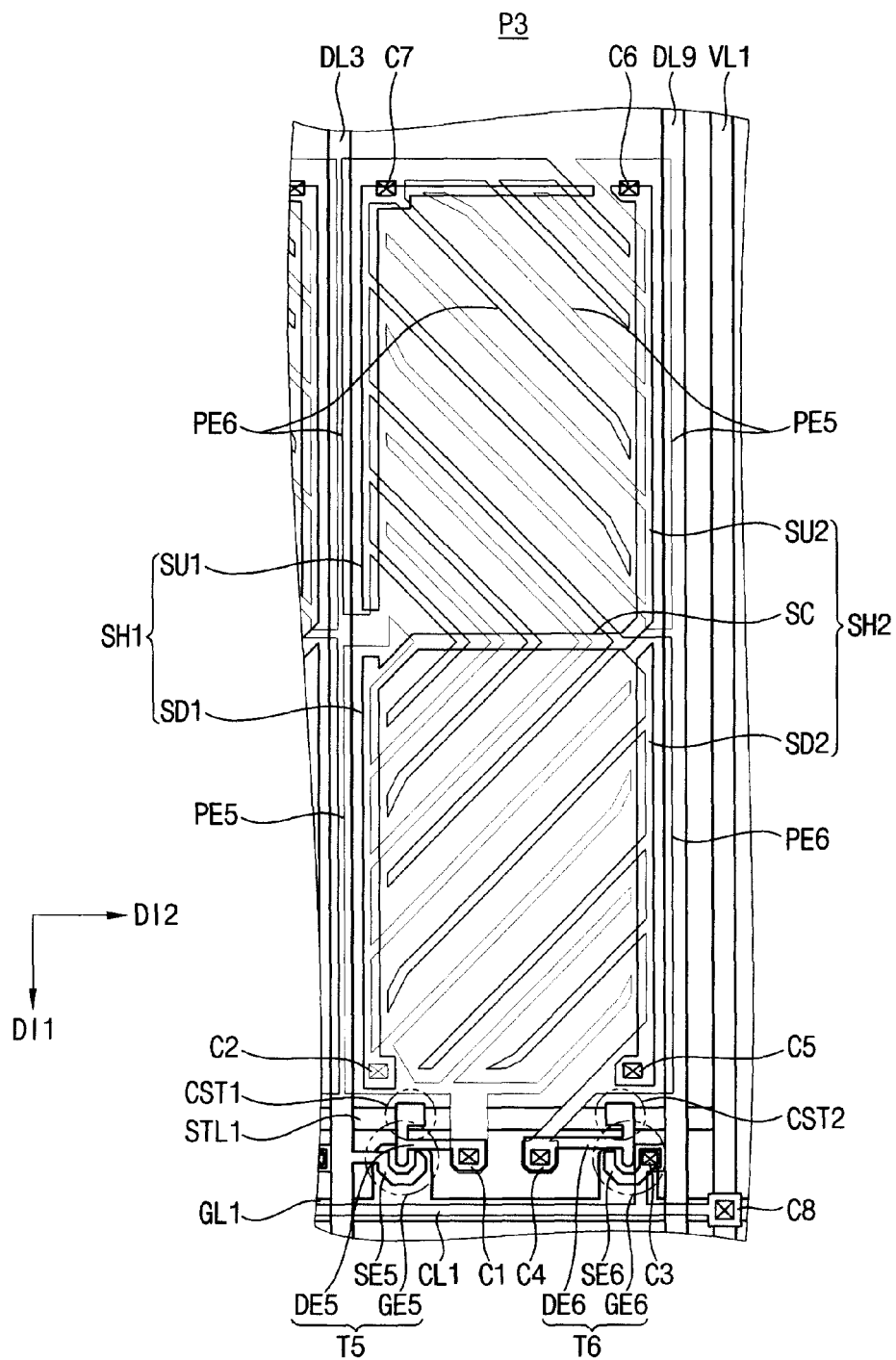
FIG. 17 is a plan view illustrating the LCD panel of FIG. 16.

FIG. 17 is a plan view illustrating an LCD panel 1000E of FIG. 16. Hereinafter, any repetitive detailed explanation about the identical elements of FIGS. 15, 16 and 17 will be omitted or simplified.

Referring to FIGS. 16 and 17, the LCD panel 1000E includes a third data line DL3, a ninth data line DL9, a first power line VL1, the first gate line GL1, the first storage line STL1 and a third pixel part P3.

The first gate line GL1 is extended in the second direction DI2.

The first storage line STL1 is extended in the second direction DI2 to be disposed adjacent to the first gate line GL1.

The third pixel part P3 includes a fifth switching element T5, a fifth pixel electrode PE5, a sixth switching element T6, a sixth pixel electrode PE6, a first shield part SH1 and a second shield part SH2.

The fifth switching element T5 includes a fifth gate electrode GE5 connected to the first gate line GL1, a fifth source electrode SE5 connected to the third data line DL3 and a fifth drain electrode DE5 spaced apart from the fifth source electrode SE5. An extending portion of the fifth drain electrode DE5 partially overlaps with the first storage line STL1 to be connected to the fifth pixel electrode PE5 through a first contact hole C1. The extending portion of the fifth drain electrode DE5, the first storage line STL1 partially overlapping with the extending portion and a gate insulation layer (not shown) disposed therebetween may define a first storage capacitor CST1.

The sixth switching element T6 includes a sixth gate electrode GE6 connected to the first gate line GL1, a sixth source electrode SE6 connected to the first power line VL1 through the first connection line CL1 and a sixth drain electrode DE6 spaced apart from the sixth source electrode SE6. An extending portion of the sixth drain electrode DE6 partially overlaps with the first storage line STL1 to be connected to the sixth pixel electrode PE6 through a fourth contact hole C4. The sixth source electrode SE6 is connected to the first connection line CL1 through a third contact hole C3. The extending portion of the sixth drain electrode DE6, the first storage line STL1 partially overlapping with the extending portion and a gate insulation layer (not shown) disposed therebetween may define a second storage capacitor CST2.

A method of manufacturing the display substrate according to the present exemplary embodiment is substantially the same as the method of manufacturing the display substrate described in FIGS. 12A to 12C. That is, a first metal pattern includes the first gate line GL1, the second gate line GL2, the first storage line STL1 and the second storage line STL2, and a second metal pattern includes the first to sixteenth data lines DL1, DL2, . . . , DL16. Thus, any explanation for the method of manufacturing the display substrate according to the present exemplary embodiment will hereinafter be omitted.

Figure 18:
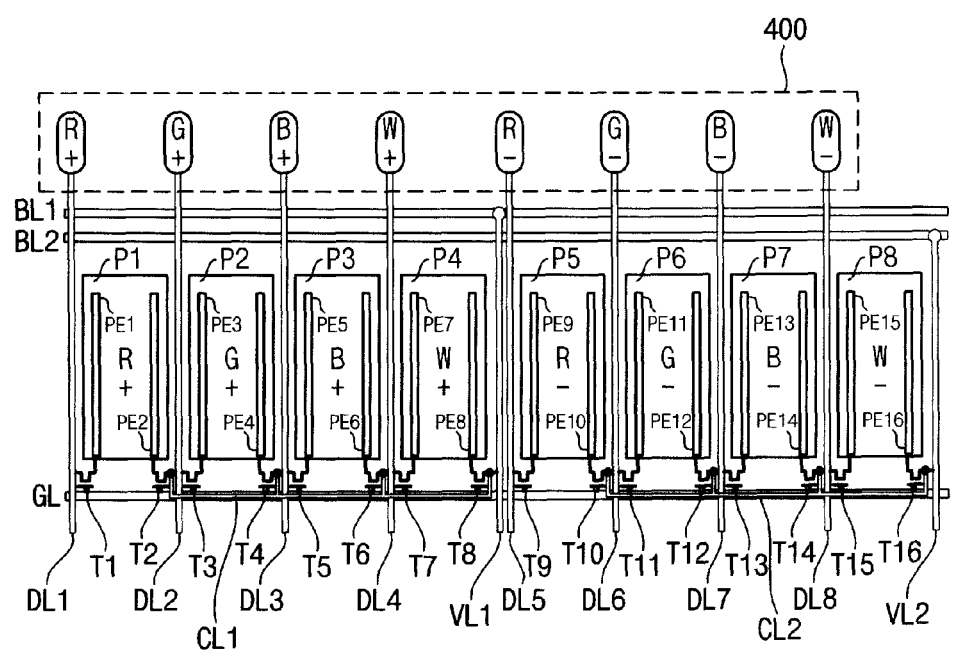
FIG. 18 is a schematic diagram illustrating an LCD panel according to another exemplary embodiment of the present invention.
Figure 18:
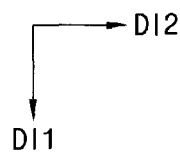

FIG. 18 is a schematic diagram illustrating an LCD panel according to another exemplary embodiment of the present invention.

Referring to FIGS. 1 and 18, the LCD panel 1000F includes a pad part 400, a plurality of data lines DL1, DL2, DL3, DL4, DL5, DL6, DL7 and DL8, a first bus line BL1, a second bus line BL2, a first power line VL1, a second power line VL2, a gate line GL, and a plurality of pixel parts P1, P2, P3, P4, P5, P6, P7 and P8. Hereinafter, any repetitive detailed explanation about the identical elements of FIG. 1 will be omitted or simplified.

The pad part 400 includes a plurality of pads disposed at a first peripheral area PA1 of the LCD panel 1000F to be connected to respective data lines.

Each of the data lines DL1, DL2, DL3, DL4, DL5, DL6, DL7 and DL8 is extended in the first direction DI1, and is arranged in the second direction DI2.

The first bus line BL1 may be extended in the second direction DI2 to be disposed in the first peripheral area PA1 of the LCD panel 1000F. The second bus line BL2 may be extended in the second direction DI2 to be disposed in the first peripheral area PA1 adjacent to the first bus line BL1.

The first power line VL1 is connected to the first bus line BL1 to be extended in the first direction DI1. The second power line VL2 is connected to the second bus line BL2 to be extended in the first direction DI2. A plurality of pixel parts P5, P6, P7 and P8 is arranged between the first and second power lines VL1 and VL2. Each of the first and second power lines VL1 and VL2 provides the pixel parts P1, P2, P3 and P4, and P5, P6, P7 and P8 with a voltage, respectively.

The gate line GL is extended in the second direction DI2.

The plural pixel parts P1, P2, P3, P4, P5, P6, P7 and P8 include primary color pixels and a multi-primary color pixel. The primary color pixels may be a red pixel, a green pixel and a blue pixel, and the multi-primary color pixel may include a white pixel, a yellow pixel, a cyan pixel, a magenta pixel, etc. In the present exemplary embodiment, the multi-primary color pixel is a white pixel. When the LCD panel further includes the multi-primary color pixel, a transmissivity of the LCD panel is enhanced and a range of color reproducibility (or a color range) is wider so that almost every color viewable by a viewer's eye may be reproduced. The first pixel part P1 includes a first pixel electrode PE1, a second pixel electrode PE2, a first switching element T1 and a second switching element T2. The first pixel electrode PE1 is connected to the first data line DL1 and the gate line GL through the first switching element T1 . The second pixel electrode PE2 is spaced apart from the first pixel electrode PE1 to be connected to the first power line VL1 and the gate line GL through the second switching element T2. The second switching element T2 is connected to the first power line VL1 through a first connection line CL1.

The second pixel part P2 includes a third pixel electrode PE3, a fourth pixel electrode PE4, a third switching element T3 and a fourth switching element T4. The third pixel electrode PE3 is connected to the second data line DL2 and the gate line GL through the third switching element T3. The fourth pixel electrode PE4 is spaced apart from the third pixel electrode PE3 to be connected to the first power line VL1 and the gate line GL through the fourth switching element T4. The fourth switching element T4 is connected to the first power line VL1 through the first connection line CL1.

The third pixel part P3 includes a fifth pixel electrode PE5, a sixth pixel electrode PE6, a fifth switching element T5 and a sixth switching element T6. The fifth pixel electrode PE5 is connected to the third data line DL3 and the gate line GL through the fifth switching element T5. The sixth pixel electrode PE6 is spaced apart from the fifth pixel electrode PE5 to be connected to the first power line VL1 and the gate line GL through the sixth switching element T6. The sixth switching element T6 is connected to the first power line VL1 through the first connection line CL1.

The fourth pixel part P4 includes a seventh pixel electrode PE7, an eighth pixel electrode PE8, a seventh switching element T7 and an eighth switching element T8. The seventh pixel electrode PE7 is connected to the fourth data line DL4 and the gate line GL through the seventh switching element T7. The eighth pixel electrode PE8 is spaced apart from the seventh pixel electrode PE7 to be connected to the first power line VL1 and the gate line GL through the eighth switching element T8. The eighth switching element T8 is connected to the first power line VL1 through the first connection line CL1.

The fifth pixel part P5 includes a ninth pixel electrode PE9, a tenth pixel electrode PE10, a ninth switching element T9 and a tenth switching element T10. The ninth pixel electrode PE9 is connected to the fifth data line DL5 and the gate line GL through the ninth switching element T9. The tenth pixel electrode PE10 is spaced apart from the ninth pixel electrode PE9 to be connected to the second power line VL2 and the gate line GL through the tenth switching element T10. The tenth switching element T10 is connected to the second power line VL2 through a second connection line CL2.

The sixth pixel part P6 includes an eleventh pixel electrode PE11, a twelfth pixel electrode PE12, an eleventh switching element T11 and a twelfth switching element T12. The eleventh pixel electrode PE11 is connected to the sixth data line DL6 and the gate line GL through the eleventh switching element T11. The twelfth pixel electrode PE12 is spaced apart from the eleventh pixel electrode PE11 to be connected to the second power line VL2 and the gate line GL through the twelfth switching element T12. The twelfth switching element T12 is connected to the second power line VL2 through the second connection line CL2.

The seventh pixel part P7 includes a thirteenth pixel electrode PE13, a fourteenth pixel electrode PE14, a thirteenth switching element T13 and a fourteenth switching element T14. The thirteenth pixel electrode PE13 is connected to the seventh data line DL7 and the gate line GL through the thirteenth switching element T13. The fourteenth pixel electrode PE14 is spaced apart from the thirteenth pixel electrode PE13 to be connected to the second power line VL2 and the gate line GL through the fourteenth switching element T14. The fourteenth switching element T14 is connected to the second power line VL2 through the second connection line CL2.

The eighth pixel part P8 includes a fifteenth pixel electrode PE15, a sixteenth pixel electrode PE16, a fifteenth switching element T15 and a sixteenth switching element T16. The fifteenth pixel electrode PE15 is connected to the eighth data line DL8 and the gate line GL through the fifteenth switching element T15. The sixteenth pixel electrode PE16 is spaced apart from the fifteenth pixel electrode PE15 to be connected to the second power line VL2 and the gate line GL through the sixteenth switching element T16. The sixteenth switching element T16 is connected to the second power line VL2 through the second connection line CL2.

A voltage of a first polarity (for example, a negative (−) polarity) with respect to a reference voltage is applied to the first power line VL1, and a voltage of a second polarity (for example, a positive (+) polarity) with respect to the reference voltage is applied to the second power line VL2. A voltage of a second polarity (a positive (+) polarity) having a level higher than a voltage applied to the first power line VL1 is applied to the first, second, third and fourth data lines DL1, DL2, DL3 and DL4, and a voltage of a first polarity (for example, a negative (−) polarity) having a level lower than a voltage applied to the second power line VL2 is applied to the fifth, sixth, seventh and eighth data lines DL5, DL6, DL7 and DL8. For example, a level of the first polarity (−) may be lower than a level of the reference voltage, and a level of the second polarity (+) may be higher than a level of the reference voltage.

According to the present exemplary embodiment, one power line is shared by four pixel parts and the same polarity data voltage is applied via the one power line, so that a generation of a light leakage in a black state may be minimized. Moreover, the number of the power lines is decreased, so that an aperture ratio of a display substrate may be enhanced.

A pixel structure of the fourth pixel part P4 according to the present exemplary embodiment may be substantially the same as that of the third pixel part P3 of FIG. 3. Similar to the previous embodiment described in connection with FIG. 3, the pixel part according to the present exemplary embodiment may include a first shield part SH1 and a second shield part SH2, and the first and second shield parts SH1 and SH2 may be formed from a metal pattern. In this case, a method of manufacturing the display substrate according to the present exemplary embodiment may be substantially the same as that of manufacturing the display substrate described in connection with FIGS. 5A to 5D. However, each of the first and second power lines VL1 and VL2 may be arranged in units of four pixel parts (FIG. 18).

Moreover, a pixel structure of the fourth pixel part P4 according to the present exemplary embodiment may be substantially the same as that of the third pixel part P3 of FIG. 6. Similar to the previous embodiment described in connection with FIG. 6, the pixel part according to the present exemplary embodiment may include a first shield part SH1 and a second shield part SH2, and the first and second shield parts SH1 and SH2 may be formed in a trench structure. In this case, a method of manufacturing the display substrate according to the present exemplary embodiment may be substantially the same as that of manufacturing the display substrate described in connection with FIGS. 8A to 8D. However, each of the first and second power lines VL1 and VL2 may be arranged in units of four pixel parts.

Figure 19:
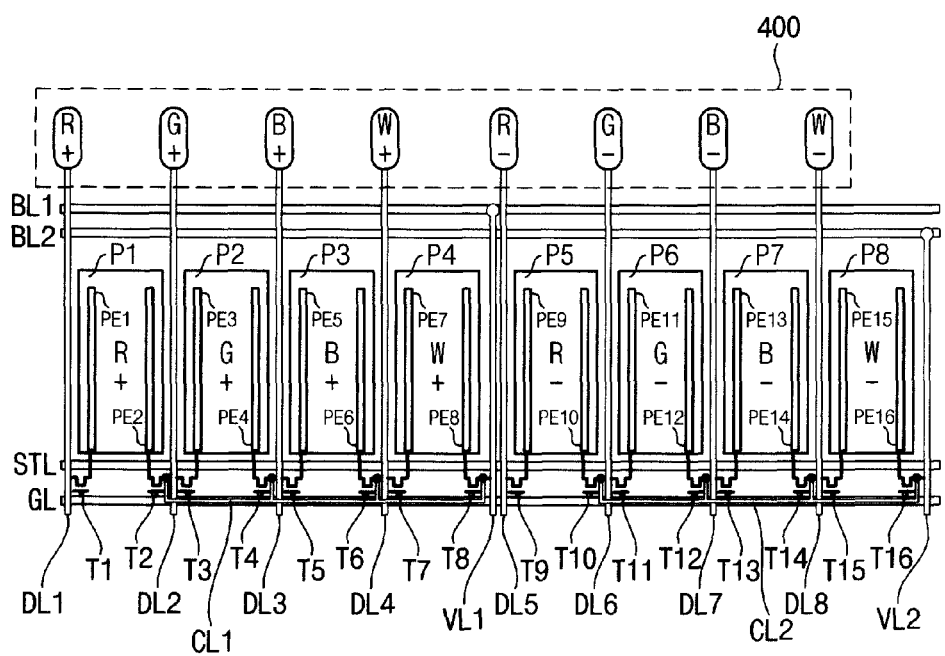
FIG. 19 is a schematic diagram illustrating an LCD panel according to another exemplary embodiment of the present invention.
Figure 19:
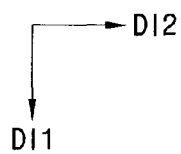

FIG. 19 is a schematic diagram illustrating an LCD panel according to another exemplary embodiment of the present invention.

Referring to FIG. 19, the LCD panel 1000G may further include a storage line STL in comparison with the LCD panel 1000F of FIG. 18.

The storage line STL is extended in the second direction DI2, and is disposed adjacent to the gate line GL. A storage voltage is applied to the storage line STL. The storage voltage may be a direct current (DC) having a predetermined level in spite of a frame.

For example, the storage line STL partially overlaps with extending portions of first to sixteenth switching elements T1, T2, . . . , T16 included in the first, second, third, fourth, fifth, sixth, seventh and eighth pixel parts P1, P2, P3, P4, P5, P6, P7 and P8, so that a plurality of storage capacitors may be defined. A variation of a voltage applied to the pixel parts P1, P2, P3, P4, P5, P6, P7 and P8 is decreased by the storage capacitors, so that display quality may be enhanced.

A pixel structure of the fourth pixel part P4 according to the present exemplary embodiment may be substantially the same as that of the third pixel part P3 of FIG. 10. Similar to the previous embodiment described in connection with FIG. 10, an extending portion of the seventh switching element of the fourth pixel part P4 according to the present exemplary embodiment may be partially overlapped with the storage line STL to form a first storage capacitor, and an extending portion of the eighth switching element may be partially overlapped with the storage line STL to form a second storage capacitor. In this case, a method of manufacturing the display substrate according to the present exemplary embodiment may be substantially the same as that of manufacturing the display substrate described in connection with FIGS. 12A to 12C. However, each of the first and second power lines VL1 and VL2 may be arranged in units of four pixel parts.

Moreover, similar to the previous embodiment described in connection with FIGS. 1 to 4, the pixel part according to the present exemplary embodiment may include first and second shield parts SH1 and SH2 of a metal pattern. In this case, a method of manufacturing the display substrate according to the present exemplary embodiment may be substantially the same as the method of manufacturing the display substrate described in FIGS. 5A to 5D.

Furthermore, similar to the previous embodiment described in connection with FIGS. 6 and 7, the pixel part according to the present exemplary embodiment may include first and second shield parts SH1 and SH2 of a trench structure. In this case, a method of manufacturing the display substrate according to the present exemplary embodiment may be substantially the same as the method of manufacturing the display substrate described in FIGS. 8A to 8D.

Figure 20:
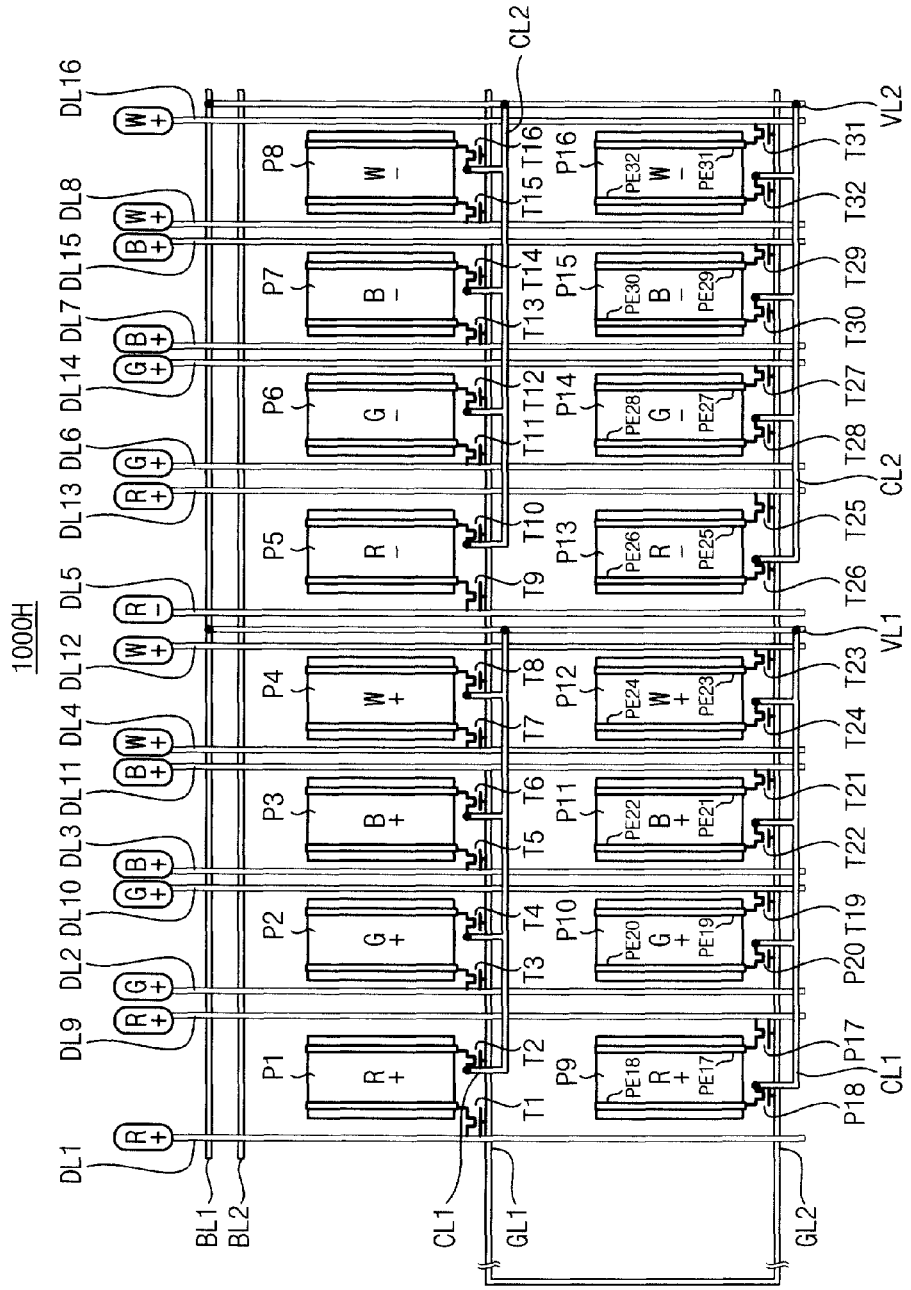
FIG. 20 is a schematic diagram illustrating an LCD panel according to another exemplary embodiment of the present invention.

FIG. 20 is a schematic diagram illustrating an LCD panel according to another exemplary embodiment of the present invention.

Referring to FIG. 20, the LCD panel 1000H includes a plurality of data lines DL1, DL2, DL3, DL4, DL5, DL6, DL7, DL8, DL9, DL10, DL11, DL12, DL13, DL14, DL15 and DL16, a first bus line BL1, a second bus line BL2, a first power line VL1, a second power line VL2, a first gate line GL1, a second gate line GL2, and a plurality of pixel parts P1, P2, P3, P4, P5, P6, P7, P8, P9, P10, P11, P12, P13, P14, P15 and P16. The plural pixel parts P1, P2, P3, P4, P5, P6, P7, P8, P9, P10, P11, P12, P13, P14, P15 and P16 include primary color pixels and multi-primary color pixels. The primary color pixels may be a red pixel, a green pixel and a blue pixel, and the multi-primary color pixel may include a white pixel, a yellow pixel, a cyan pixel, a magenta pixel, etc. In the present exemplary embodiment the multi-primary color pixel is a white pixel.

As with the previous embodiment described in connection with FIG. 18, the first to eighth pixel parts P1, P2, P3, P4, P5, P6, P7 and P8 include first to sixteenth pixel electrodes PE1, PE2, . . . , PE16. The first to sixteenth pixel electrodes PE1, PE2, . . . , PE16 are electrically connected to the first to eighth data lines DL1, DL2, DL3, DL4, DL5, DL6, DL7 and DL8, the power lines VL1 and VL2 and the first gate line GL1. In this exemplary embodiment, a detailed explanation for a connection structure concerning the first to eighth pixel parts P1, P2, P3, P4, P5, P6, P7 and P8 will be omitted.

The second gate line GL2 is extended in the second direction DI2 to be electrically connected to the first gate line GL1. As shown in FIG. 20, the first and second gate lines GL1 and GL2 may be connected to each other at a peripheral area of the LCD panel. In this case, a gate signal outputted from a gate driving part may be simultaneously supplied to the first and second gate lines GL1 and GL2 that are connected to each other. Alternatively, the first and second gate lines GL1 and GL2 may be separated from each other. In this case, a gate driving part may output a gate signal to the first and second gate lines GL1 and GL2 at a same point of time. Thus, two pixel rows respectively and electrically connected to the first and second gate lines GL1 and GL2 may be simultaneously driven.

The ninth pixel part P9 includes a seventeenth pixel electrode PE17, an eighteenth pixel electrode PE18, a seventeenth switching element T17 and an eighteenth switching element T18. The seventeenth pixel electrode PE17 is connected to the ninth data line DL9 and the second gate line GL2 through the seventeenth switching element T17. The ninth data line DL9 is disposed between the first data line DL1 and the second data line DL2, and is disposed adjacent to the second data line DL2. The eighteenth pixel electrode PE18 is spaced apart from the seventeenth pixel electrode PE17 to be connected to the first power line VL1 and the second gate line GL2 through the eighteenth switching element T18. The eighteenth switching element T18 is connected to the first power line VL1 through a first connection line CL1.

The tenth pixel part P10 includes a nineteenth pixel electrode PE19, a twentieth pixel electrode PE20, a nineteenth switching element T19 and a twentieth switching element T20. The nineteenth pixel electrode PE19 is connected to the tenth data line DL10 and the second gate line GL2 through the nineteenth switching element T19. The tenth data line DL10 is disposed between the second and third data lines DL2 and DL3, and is disposed adjacent to the third data line DL3. The twentieth pixel electrode PE20 is spaced apart from the nineteenth pixel electrode PE19 to be connected to the first power line VL1 and the second gate line GL2 through the twentieth switching element T20. The twentieth switching element T20 is connected to the first power line VL1 through the first connection line CL1.

The eleventh pixel part P11 includes a twenty-first pixel electrode PE21, a twenty-second pixel electrode PE22, a twenty-first switching element T21 and a twenty-second switching element T22. The twenty-first pixel electrode PE21 is connected to the eleventh data line DL11 and the second gate line GL2 through the twenty-first switching element T21. The eleventh data line DL11 is disposed between the third and fourth data lines DL3 and DL4, and is disposed adjacent to the fourth data line DL4. The twenty-second pixel electrode PE22 is spaced apart from the twenty-first pixel electrode PE21 to be connected to the first power line VL1 and the second gate line GL2 through the twenty-second switching element T22. The twenty-second switching element T22 is connected to the first power line VL1 through the first connection line CL1.

The twelfth pixel part P12 includes a twenty-third pixel electrode PE23, a twenty-fourth pixel electrode PE24, a twenty-third switching element T23 and a twenty-fourth switching element T24. The twenty-third pixel electrode PE23 is connected to the twelfth data line DL12 and the second gate line GL2 through the twenty-third switching element T23. The twelfth data line DL12 is disposed between the fourth data line DL4 and the first power line VL1, and is disposed adjacent to the first power line VL1. The twenty-fourth pixel electrode PE24 is spaced apart from the twenty-third pixel electrode PE23 to be connected to the first power line VL1 and the second gate line GL2 through the twenty-fourth switching element T24. The twenty-fourth switching element T24 is connected to the first power line VL1 through the first connection line CL1.

The thirteenth pixel part P13 includes a twenty-fifth pixel electrode PE25, a twenty-sixth pixel electrode PE26, a twenty-fifth switching element T25 and a twenty-sixth switching element T26. The twenty-fifth pixel electrode PE25 is connected to the thirteenth data line DL13 and the second gate line GL2 through the twenty-fifth switching element T25. The thirteenth data line DL13 is disposed between the fifth data line DL5 and the sixth data line DL6, and is disposed adjacent to the sixth data line DL6. The twenty-sixth pixel electrode PE26 is spaced apart from the twenty-fifth pixel electrode PE25 to be connected to the second power line VL2 and the second gate line GL2 through the twenty-sixth switching element T26. The twenty-sixth switching element T26 is connected to the second power line VL2 through a second connection line CL2.

The fourteenth pixel part P14 includes a twenty-seventh pixel electrode PE27, a twenty-eighth pixel electrode PE28, a twenty-seventh switching element T27 and a twenty-eighth switching element T28. The twenty-seventh pixel electrode PE27 is connected to the fourteenth data line DL14 and the second gate line GL2 through the twenty-seventh switching element T27. The fourteenth data line DL14 is disposed between the sixth data line DL6 and the seventh data line DL7, and is disposed adjacent to the seventh data line DL7. The twenty-eighth pixel electrode PE28 is spaced apart from the twenty-seventh pixel electrode PE27 to be connected to the second power line VL2 and the second gate line GL2 through the twenty-eighth switching element T28. The twenty-eighth switching element T28 is connected to the second power line VL2 through the second connection line CL2.

The fifteenth pixel part P15 includes a twenty-ninth pixel electrode PE29, a thirtieth pixel electrode PE30, a twenty-ninth switching element T29 and a thirtieth switching element T30. The twenty-ninth pixel electrode PE29 is connected to the fifteenth data line DL15 and the second gate line GL2 through the twenty-ninth switching element T29. The fifteenth data line DL15 is disposed between the seventh data line DL7 and the eighth data line DL8, and disposed adjacent to the eighth data line DL8. The thirtieth pixel electrode PE30 is spaced apart from the twenty-ninth pixel electrode PE29 to be connected to the second power line VL2 and the second gate line GL2 through the thirtieth switching element T30. The thirtieth switching element T30 is connected to the second power line VL2 through the second connection line CL2.

The sixteenth pixel part P16 includes a thirty-first pixel electrode PE31, a thirty-second pixel electrode PE32, a thirty-first switching element T31 and a thirty-second switching element T32. The thirty-first pixel electrode PE31 is connected to the sixteenth data line DL16 and the second gate line GL2 through the thirty-first switching element T31. The sixteenth data line DL16 is disposed between the eighth data line DL8 and the second power line VL2, and is disposed adjacent to the second power line VL2. The thirty-second pixel electrode PE32 is spaced apart from the thirty-first pixel electrode PE31 to be connected to the second power line VL2 and the second gate line GL2 through the thirty-second switching element T32. The thirty-second switching element T32 is connected to the second power line VL2 through the second connection line CL2.

A voltage of a first polarity (for example, a negative (−) polarity) with respect to a reference voltage is applied to the first power line VL1, and a voltage of a second polarity (for example, a positive (+) polarity) with respect to the reference voltage is applied to the second power line VL2. A voltage of a second polarity (a positive (+) polarity) having a level higher than a voltage applied to the first power line VL1 is applied to the first, second, third, fourth, ninth, tenth, eleventh and twelfth data lines DL1, DL2, DL3, DL4, DL9, DL10, DL11 and DL12, and a voltage of a first polarity (for example, a negative (−) polarity) having a level lower than a voltage applied to the second power line VL2 is applied to the fifth, sixth, seventh, eighth, thirteenth, fourteenth, fifteenth and sixteenth data lines DL5, DL6, DL7, DL8, DL13, DL14, DL15 and DL16.

According to the present exemplary embodiment, one pixel row receives a data voltage through two data lines, and two pixel columns receive one gate signal through two gate lines, so that two pixel columns may be driven for one horizontal period (1H). That is, the LCD panel 1000H may be driven at a high speed. Moreover, one power line is shared by four pixel parts and the same polarity data voltage is applied via the one power line, so that a generation of a light leakage in a black state may be minimized. Moreover, the number of power lines is decreased, so that an aperture ratio of a display substrate may be enhanced.

A pixel structure of the fourth pixel part P4 according to the present exemplary embodiment may be substantially the same as that of the third pixel part P3 of FIG. 14. Similar to the previous embodiment described in connection with FIG. 14, the pixel part according to the present exemplary embodiment may include a first shield part SH1 and a second shield part SH2, and the first and second shield parts SH1 and SH2 may be formed from a metal pattern. In this case, a method of manufacturing the display substrate according to the present exemplary embodiment may be substantially the same as that of manufacturing the display substrate described in connection with FIGS. 5A to 5D. However, each of the first and second power lines VL1 and VL2 may be arranged in units of four pixel parts.

Moreover, a pixel structure of the fourth pixel part P4 according to the present exemplary embodiment may be substantially the same as that of the third pixel part P3 of FIG. 15. Similar to the previous embodiment described in connection with FIG. 15, the pixel part according to the present exemplary embodiment may include a first shield part SH1 and a second shield part SH2, and the first and second shield parts SH1 and SH2 may be formed in a trench structure. In this case, a method of manufacturing the display substrate according to the present exemplary embodiment may be substantially the same as that of manufacturing the display substrate described in connection with FIGS. 8A to 8D. However, each of the first and second power lines VL1 and VL2 may be arranged in units of four pixel parts.

Figure 21:
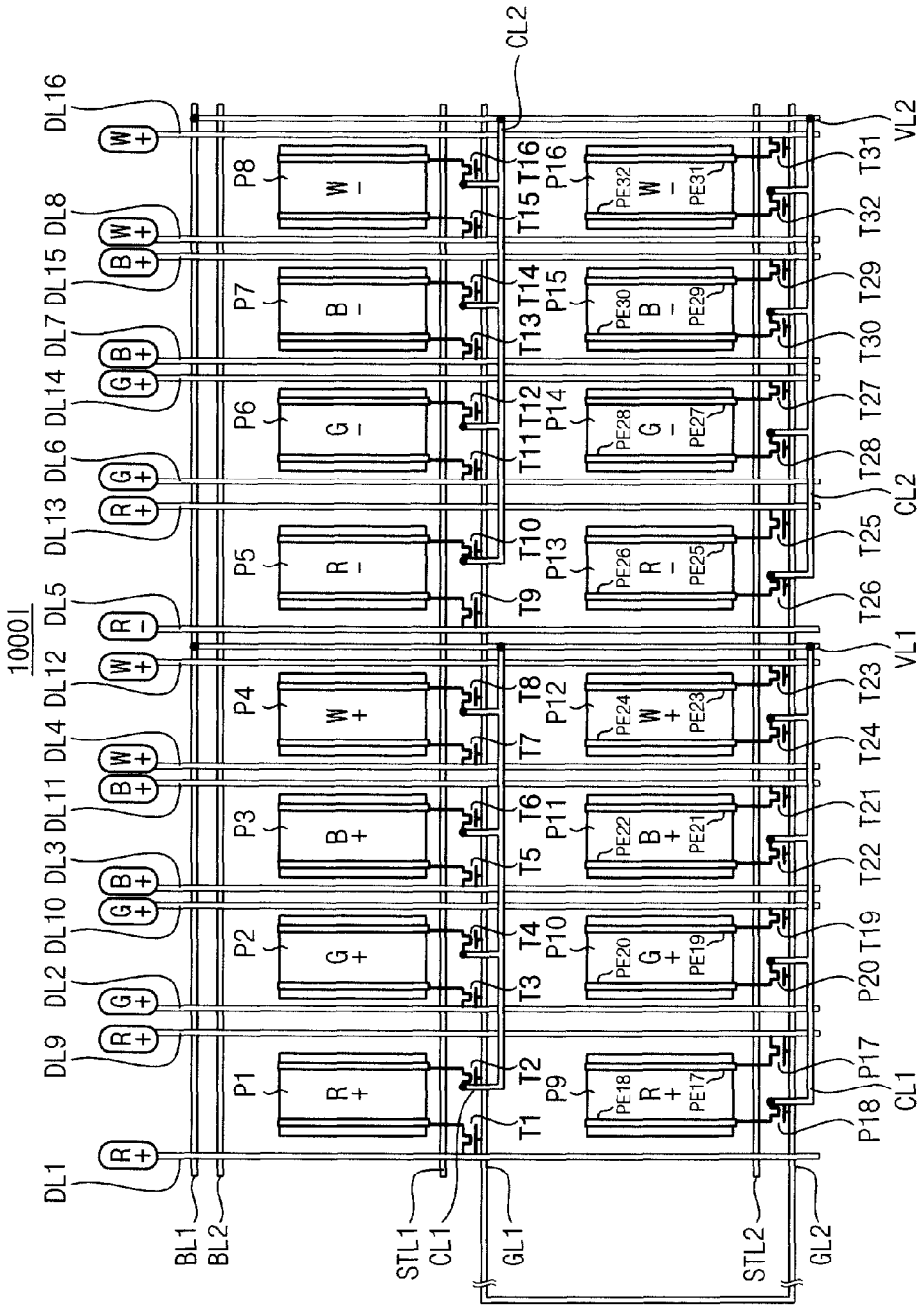
FIG. 21 is a schematic diagram illustrating an LCD panel according to another exemplary embodiment of the present invention.

FIG. 21 is a schematic diagram illustrating an LCD panel according to another exemplary embodiment of the present invention.

Referring to FIG. 21, the LCD panel 10001 may further include a first storage line STL1 and a second storage line STL2 in comparison with the LCD panel 1000H of FIG. 20.

The first storage line STL1 is disposed adjacent to the first gate line GL1 in parallel with the first gate line GL1. The first storage line STL1 partially overlaps with respective extending portions of switching elements included in pixel parts corresponding to a pixel row electrically connected to the first gate line GL1, so that a storage capacitor may be formed.

The second storage line STL2 is disposed adjacent to the second gate line GL2 in parallel with the second gate line GL2. The second storage line STL2 partially overlaps with respective extending portions of switching elements included in pixel parts corresponding to a pixel row electrically connected to the second gate line GL2, so that a storage capacitor may be formed.

The storage capacitors may decrease voltage variations of the pixel parts to enhance display quality.

As shown in FIG. 21, the first and second gate lines GL1 and GL2 may be connected to each other at a peripheral area of the LCD panel. In this case, a gate signal outputted from a gate driving part may be simultaneously applied to the first and second gate lines GL1 and GL2 that are connected to each other. Alternatively, the first and second gate lines GL1 and GL2 may be separated from each other. In this case, the gate driving part may simultaneously output the gate signal to each of the first and second gate lines GL1 and GL2. Accordingly, two pixel rows electrically connected to the first and second gate lines GL1 and GL2 may be simultaneously driven.

Each of the pixel parts according to the present exemplary embodiment may include first and second shield parts SH1 and SH2 of the metal pattern described in FIGS. 1 to 5D. Alternatively, each of the pixel parts according to the present exemplary embodiment may include first and second shield parts SH1 and SH2 of the trench structure described in FIGS. 6 to 8D.

A method of manufacturing the display substrate according to the present exemplary embodiment is substantially the same as the method of manufacturing the display substrate described in FIGS. 12A to 12C. That is, a first metal pattern includes the first gate line GL1, the second gate line GL2, the first storage line STL1 and the second storage line STL2, and a second metal pattern includes the first to sixteenth data lines DL1, DL2, . . . , DL16. Thus, any explanation for the method of manufacturing the display substrate according to the present exemplary embodiment will hereinafter be omitted.

Figure 22:
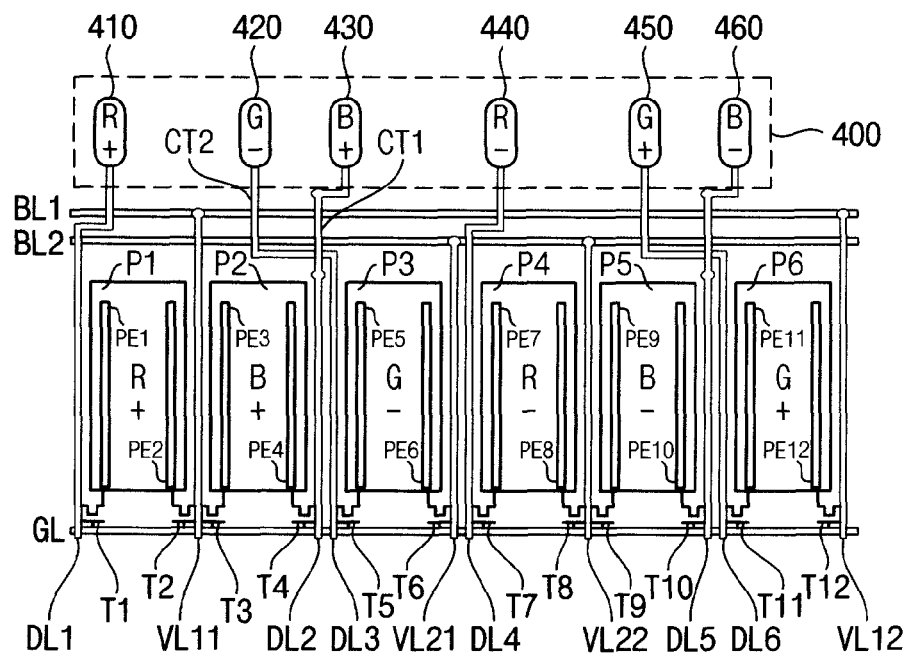
FIG. 22 is a schematic diagram illustrating an LCD panel according to another exemplary embodiment of the present invention.
Figure 22:
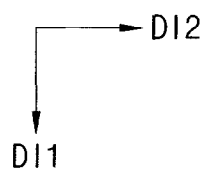

FIG. 22 is a schematic diagram illustrating an LCD panel according to another exemplary embodiment of the present invention.

Referring to FIGS. 1 and 22, the LCD panel 1000J includes a pad part 400, a first bus line BL1, a second bus line BL2, a plurality of first power lines VL11 and VL12, a plurality of second power lines VL21 and VL22, a plurality of data lines DL1, DL2, DL3, DL4, DL5 and DL6, a plurality of connection electrodes CT1 and CT2, a gate line GL and a plurality of pixel parts P1, P2, P3, P4, P5 and P6.

The pad part 400 includes plural pads 410, 420, 430, 440, 450 and 460 receiving plural data voltages outputted from the data driving part 1030, respectively.

The first bus line BL1 is extended in the second direction DI2. The first bus line BL1 may be disposed at a first peripheral area PA1 of the LCD panel 1000J. The second bus line BL2 is extended in the second direction DI2. The second bus line BL2 may be disposed at the first peripheral area PA1 adjacent to the first bus line BL1.

Each of the first power lines VL11 and VL12 is connected to the first bus line BL1 to be extended in the first direction DI1, respectively. Each of the first power lines VL11 and VL12 is electrically connected to two pixel parts to provide two pixel parts with a voltage. For example, the first power line VL11 is disposed between the first pixel part P1 and the second pixel part P2 adjacent to the first pixel part P1 along the second direction DI2 to provide the first and second pixel parts P1 and P2 with a voltage.

Each of the second power lines VL21 and VL22 is connected to the second bus line BL2 to be extended in the first direction DI1, respectively. Each of the second power lines VL21 and VL22 is electrically connected to one pixel part to provide one pixel part with a voltage. For example, the second power line VL21 is disposed between the third pixel part P3 and the fourth pixel part P4 adjacent to the third pixel part P3 along the second direction DI2 to provide the third pixel part P3 with a voltage.

The first to sixth data lines DL1, DL2, DL3, DL4, DL5 and DL6 are extended in the first direction DI1, and are arranged in the second direction DI2. The first data line DL1 is directly connected to the first pad 410, the second data line DL2 is connected to the third pad 430 through a first connection electrode CT1, and the third data line DL3 is connected to a second pad 420 through a second connection electrode CT2. The fourth data line DL4 is directly connected to the fourth pad 440, a fifth data line DL5 is connected to a sixth pad 460 through another first connection electrode CT1, and the sixth data line DL6 is connected to the fifth pad 450 through another second connection electrode CT2. The first and second connection electrodes CT1 and CT2 may be a transparent electrode pattern.

The gate line GL is extended in the second direction DI2.

The plural pixel parts P1, P2, P3, P4, P5 and P6 include primary color pixels. The primary color pixels may be a red pixel, a green pixel and a blue pixel.

The first pixel part P1 includes a first pixel electrode PE1, a second pixel electrode PE2, a first switching element T1 and a second switching element T2. The first pixel electrode PE1 is connected to the first data line DL1 and the gate line GL through the first switching element T1. The second pixel electrode PE2 is spaced apart from the first pixel electrode PE1, and is connected to the first power line VL11 and the gate line GL through the second switching element T2.

The second pixel part P2 includes a third pixel electrode PE3, a fourth pixel electrode PE4, a third switching element T3 and a fourth switching element T4. The third pixel electrode PE3 is connected to the first power line VL11 and the gate line GL through the third switching element T3. The fourth pixel electrode PE4 is spaced apart from the third pixel electrode PE3, and is connected to the second data line DL2 and the gate line GL through the fourth switching element T4.

The third pixel part P3 includes a fifth pixel electrode PE5, a sixth pixel electrode PE6, a fifth switching element T5 and a sixth switching element T6. The fifth pixel electrode PE5 is connected to the third data line DL3 and the gate line GL through the fifth switching element T5. The sixth pixel electrode PE6 is spaced apart from the fifth pixel electrode PE5, and is connected to the second power line VL21 and the gate line GL through the sixth switching element T6.

The fourth pixel part P4 includes a seventh pixel electrode PE7, an eighth pixel electrode PE8, a seventh switching element T7 and an eighth switching element T8. The seventh pixel electrode PE7 is connected to the fourth data line DL4 and the gate line GL through the seventh switching element T7. The eighth pixel electrode PE8 is spaced apart from the seventh pixel electrode PE7, and is connected to the first power line VL12 and the gate line GL through the eighth switching element T8.

The fifth pixel part P5 includes a ninth pixel electrode PE9, a tenth pixel electrode PE10, a ninth switching element T9 and a tenth switching element T10. The ninth pixel electrode PE9 is connected to the first power line VL12 and the gate line GL through the ninth switching element T9. The tenth pixel electrode PE10 is spaced apart from the ninth pixel electrode PE9, and is connected to the fifth data line DL5 and the gate line GL through the tenth switching element T10.

The sixth pixel part P6 includes an eleventh pixel electrode PE11, a twelfth pixel electrode PE12, an eleventh switching element T11 and a twelfth switching element T12. The eleventh pixel electrode PE11 is connected to the sixth data line DL6 and the gate line GL through the eleventh switching element T11. The twelfth pixel electrode PE12 is spaced apart from the eleventh pixel electrode PE11, and is connected to the second power line VL22 and the gate line GL through the twelfth switching element T12.

A voltage of a first polarity (for example, a negative (−) polarity) with respect to a reference voltage is applied to the first power lines VL11 and VL12, and a voltage of a second polarity (for example, a positive (+) polarity) with respect to the reference voltage is applied to the second power lines VL21 and VL22. A voltage of a second polarity (a positive (+) polarity) having a level higher than a voltage applied to the first power lines VL11 and VL12 is applied to the first, second and sixth data lines DL1, DL2 and DL6, and a voltage of a first polarity (for example, a negative (−) polarity) having a level lower than a voltage applied to the second power lines VL21 and VL22 is applied to the third, fourth and fifth data lines DL3, DL4 and DL5. For example, a level of the first polarity (−) may be lower than a level of the reference voltage, and a level of the second polarity (+) may be higher than a level of the reference voltage.

According to the present exemplary embodiment, the same polarity data voltage is applied to adjacent pixel parts, so that a generation of a light leakage in a black state may be minimized. Moreover, adjacent pixel parts share a power line, so that the number of the power lines is decreased so that an aperture ratio of a display substrate may be enhanced.

Figure 23:
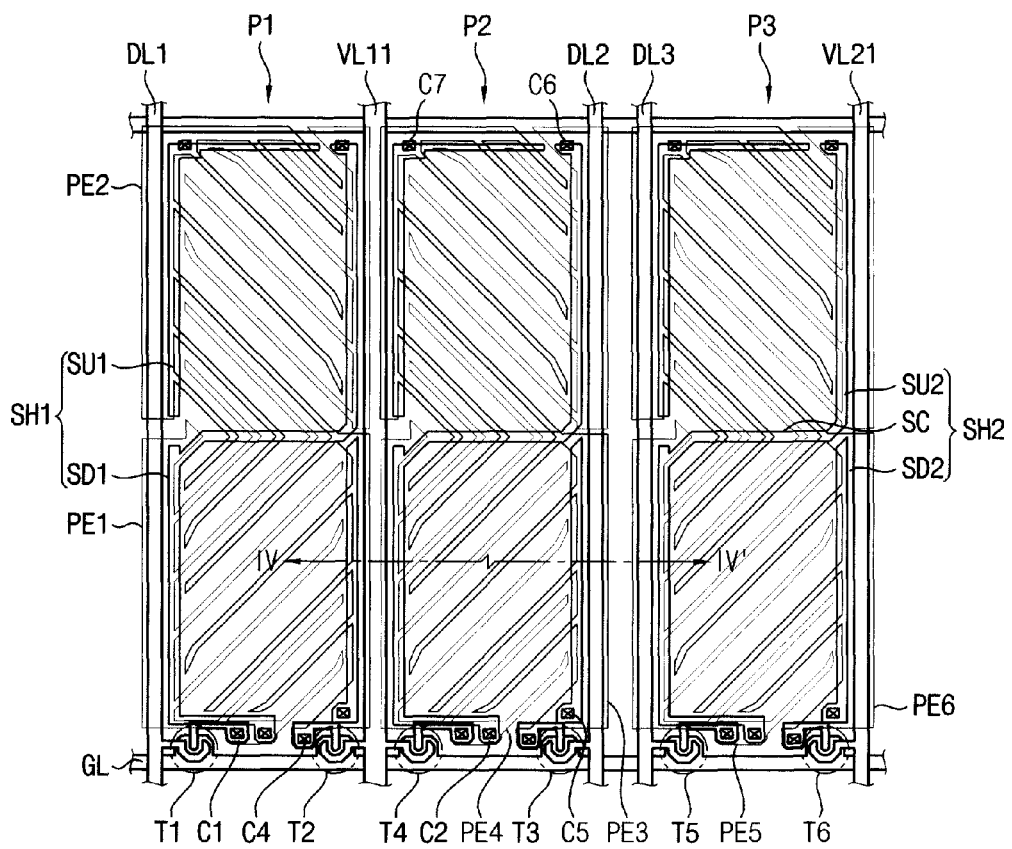
FIG. 23 is a plan view illustrating the LCD panel of FIG. 22.
Figure 23:
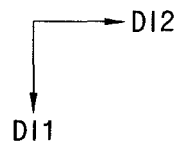
Figure 24:
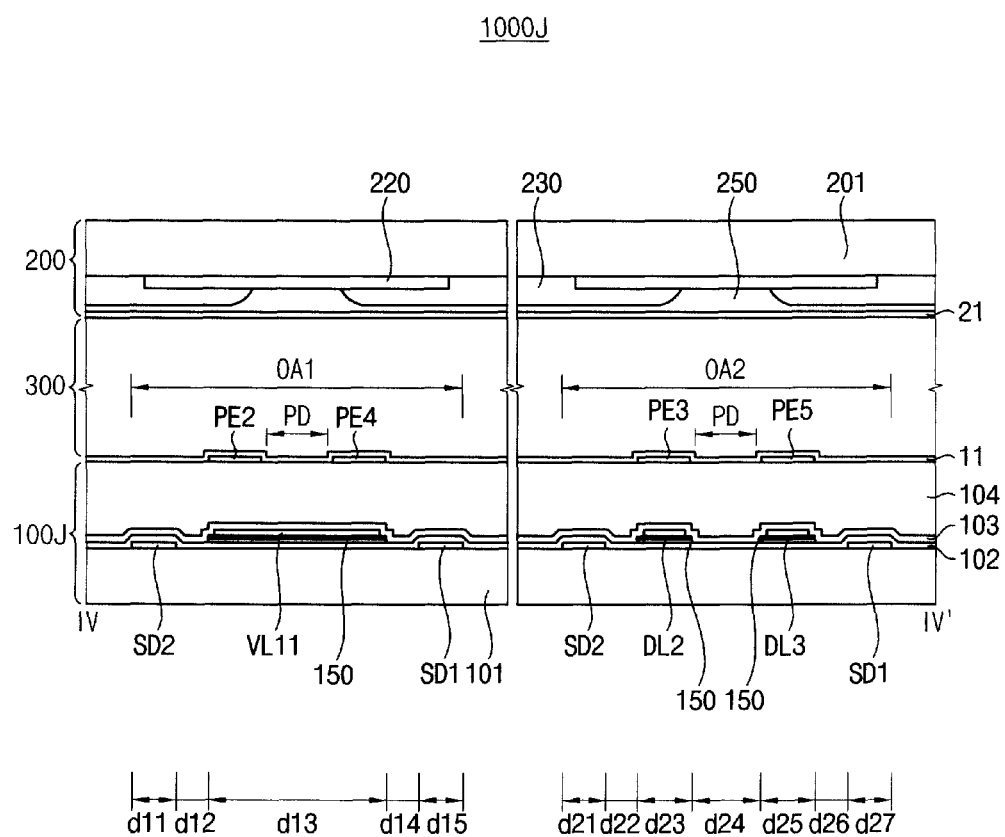
FIG. 24 is a cross-sectional view taken along line IV-IV' of FIG. 23.

FIG. 23 is a plan view illustrating the LCD panel of FIG. 22. FIG. 24 is a cross-sectional view taken along line IV-IV' of FIG. 23.

Referring to FIGS. 23 and 24, the LCD panel 1000J includes a display substrate 100J, an opposite substrate 200 and a liquid crystal layer 300. The opposite substrate 200 and the liquid crystal layer 300 may be substantially the same as the opposite substrate 200 and the liquid crystal layer 300 described with reference to FIG. 1, and thus any repetitive detailed explanation may hereinafter be omitted.

The display substrate 100J includes a first base substrate 101, a first metal pattern, a second metal pattern and a transparent electrode pattern. The display substrate 100J further includes a gate insulation layer 102 covering the first metal pattern, a data insulation layer covering the second metal pattern and a first alignment layer 11 covering the transparent electrode pattern. For one example, the data insulation layer may be formed in a multiple layered structure including a protection insulation layer 103 and an organic insulation layer 104. For another example, the data insulation layer may be formed in a single layer structure including the protection insulation layer 103.

The first metal pattern includes the gate line GL, a plurality of control electrodes of switching elements T1, T2, T3, T4, T5 and T6 connected to the gate line GL, a first shield part SH1 and a second shield part SH2. The second metal pattern includes the data lines DL1, DL2 and DL3, input electrodes of the switching elements T1, T2, T3, T4, T5 and T6 connected to the data lines DL1, DL2 and DL3, output electrodes of the switching elements T1, T2, T3, T4, T5 and T6 that are spaced apart from the input electrodes, a first power line VL11 and a second power line VL21. The transparent electrode pattern includes a plurality of pixel electrodes PE1, PE2, PE3, PE4, PE5 and PE6, and the first and second connection electrodes CT1 and CT2 shown in FIG. 22.

Hereinafter, as an example, a pixel structure of the present exemplary embodiment will be explained by using the first pixel part P1.

The first pixel part P1 includes the first switching element Ti, the first pixel electrode PE1, the second switching element T2, the second pixel electrode PE2, the first shield part SH1 and the second shield part SH2. The switching element T1 is connected to the first data line DL1 and the gate line GL, and is connected to the first pixel electrode PE1 through a first contact hole Cl. The second switching element T2 is connected to the first power line VL11 and the gate line GL, and is connected to the second pixel electrode PE2 through a fourth contact hole C4.

The first and second pixel electrodes PE1 and PE2 are disposed in an alternating arrangement to receive different voltages from the first data line DL1 and the first power line VL11. Thus, when a horizontal electric field is formed between the first and second pixel electrodes PE1 and PE2, various gradations may be realized.

In a lower portion of the first pixel part P1, the first pixel electrode PE1 has a first stem portion extending to a center line to partially overlap with the first data line DL1. Moreover, the first pixel electrode PE1 has a first branch portion inclinedly extending from the first stem portion by an angle of about 45 degrees with respect to an extending direction of the gate line GL.

In the lower portion of the first pixel part P1, the second pixel electrode PE2 has a second stem portion extending to the center line to partially overlap with the first power line VL11. Moreover, the second pixel electrode PE2 has a second branch portion inclinedly extending from the second stem portion by an angle of about −45 degrees with respect to an extending direction of the gate line GL.

In an upper portion of the first pixel part P1, the first pixel electrode PE1 has a third stem portion extending from the center line to an upper portion of the first pixel part P1 to partially overlap with the first power line VL11. Moreover, the first pixel electrode PE1 has a third branch portion inclinedly extended from the first branch portion by an angle of about 135 degrees with respect to an extending direction of the gate line GL or inclinedly extended from the third stem portion by an angle of about 135 degrees with respect to an extending direction of the gate line GL.

In an upper portion of the first pixel part P1, the second pixel electrode PE2 has a fourth stem portion extended from the center line to an upper portion of the first pixel part P1 to partially overlap with the first data line DL1 . Moreover, the second pixel electrode PE2 has a fourth branch portion inclinedly extended from the second stem portion by an angle of about 135 degrees with respect to an extending direction of the gate line GL or inclinedly extended from the fourth stem portion by an angle of about −45 degrees with respect to an extending direction of the gate line GL.

Hereinafter, an area adjacent to the first peripheral area PA1 of FIG. 1 will be referred to as an upper portion of the display area DA.

On an upper portion of the display area DA, a plurality of stem portions of pixel electrodes formed on a first portion of each pixel part may be formed to have a first width, and a plurality of stem portions of pixel electrodes formed on a second portion of each pixel part may be formed to have a second width less than the first width. On a lower portion of the display area DA, a plurality of stem portions of pixel electrodes formed on a second portion of each pixel part may be formed to have a third width, and a plurality of stem portions of pixel electrodes formed on a first portion of each pixel part may be formed to have a fourth width less than the third width. The first and third widths may be the same and the second and fourth widths may be the same. Here, the first portions may be a right portion of each pixel part in the display area DA in a plan view, and the second portions may be a left portion of each pixel part in the display area DA in a plan view.

Referring again to FIG. 22, more light leakage may be generated between the second pixel part P2 and the third pixel part P3 and between the fifth pixel part P5 and the sixth pixel part P6 in which a polarity of a data voltage is varied, so that light leakage between the second pixel part P2 and the third pixel part P3 and between the fifth pixel part P5 and the sixth pixel part P6, as examples, will hereinafter be described.

For example, when a plurality of pixel rows (shown in FIG. 22) is arranged on the display area DA in the first direction DI1, a data voltage having a different polarity to a previous data voltage may be sequentially provided to the pixel parts in the first direction DI1 when frames are altered. Since a first polarity data voltage is applied to an upper pixel row of the display area DA in an initial frame interval and a second polarity data voltage is applied to a lower pixel row of the display area DA in a following frame interval, more light leakage may be generated at each right portion of the second pixel part P2 and the fifth pixel part P5 in the upper pixel row and more light leakage may be generated at each left portion of the third pixel part P3 and the sixth pixel parts P6 in the lower pixel row. Similar to the above, an amount of light leakage may be generated in a similar amount at a left portion and a right portion of each pixel part positioned at a middle portion of the display area DA.

Thus, in order to effectively prevent a light leakage at each portion of the display area DA, on an upper pixel row of the display area DA, stem portions of pixel electrodes corresponding to a right portion of the second and fifth pixel parts P2 and P5 may be formed to have a first width, and stem portions of pixel electrodes corresponding to a left portion of the third and sixth pixel parts P3 and P6 may be formed to have a second width less than the first width. On a lower pixel row of the display area DA stem portions of pixel electrodes corresponding to a right portion of the second and fifth pixel parts P2 and P5 may be formed to have a third width, and stem portions of pixel electrodes corresponding to a left portion of the third and sixth pixel parts P3 and P6 may be formed to have a fourth width greater than the third width.

As a result, since widths of the stem portions of each pixel electrode of each pixel part are different from each other in accordance with portions of the display area DA, when data voltages inverted at every frame interval are applied thereto, a light leakage may be effectively prevented, which would otherwise be locally generated at some area as the data voltages are applied to the upper and lower portions of the display area DA at a different point of time to have a time interval therebetween.

The first shield part SH1 is disposed adjacent to a data line electrically connected to a pixel electrode of a self pixel part, the second shield part SH2 is disposed adjacent to a power line electrically connected to a pixel electrode of the self pixel part, and the first and second shield parts SH1 and SH2 are electrically connected to pixel electrodes of the self pixel part.

For example, the first shield part SH1 is disposed adjacent to the first data line DL1 delivering a data voltage to the first pixel part P1 to include a first upper shield SU1 and a first lower shield SD1. The second shield part SH2 is disposed adjacent to the first power line VL11 delivering a voltage to the first pixel part P1 to include a second upper shield SU2, a second lower shield SD2 and a connection shield SC. The connection shield SC is extended along the second direction DI2 so as to connect the first lower shield SD1 and the second upper shield SU2, so that the first pixel part P1 is divided into an upper portion and a lower portion.

The first upper shield SU1 partially overlaps with a fourth stem portion of the second pixel electrode PE2 overlapping with the first data line DL1, and the first lower shield SD1 partially overlaps with a first stem portion of the first pixel electrode PE1 overlapping with the first data line DL1. The second upper shield SU2 partially overlaps with a third stem portion of the first pixel electrode PE1 overlapping with the first power line VL11, and the second lower shield SD2 partially overlaps with a second stem portion of the second pixel electrode PE2 overlapping with the first power line VL11.

The first lower shield SD1 is connected to the first pixel electrode PE1 through a second contact hole C2, and the second upper shield SU2 is connected to the first pixel electrode PE1 through a sixth contact hole C6. The first upper shield SU1 is connected to the second pixel electrode PE2 through a seventh contact hole C7, and the second lower shield SD2 is connected to the second pixel electrode PE2 through a fifth contact hole C5.

The first lower shield SD1 overlaps with the first pixel electrode PE1 to receive a voltage equal to a voltage applied to the first pixel electrode PE1, so that it may block a light leakage generated between the first data line DL1 and the first pixel electrode PE1. Moreover, the first upper shield SU1 overlaps with the second pixel electrode PE2 to receive a voltage equal to a voltage applied to the second pixel electrode PE2, so that it may block a light leakage generated between the first data line DL1 and the second pixel electrode PE2. Furthermore, the second lower shield SD2 overlaps with the second pixel electrode PE2 to receive a voltage equal to a voltage applied to the second pixel electrode PE2, so that it may block a light leakage generated between the first power line VL11 and the second pixel electrode PE2. Furthermore, the second upper shield SU2 overlaps with the first pixel electrode PE1 to receive a voltage equal to a voltage applied to the first pixel electrode PE1, so that it may block a light leakage generated between the first power line VL11 and the first pixel electrode PE1.

Referring to FIG. 24, a metal pattern and a transparent electrode pattern that are formed on a boundary between the first pixel part P1 and the second pixel part P2 may be realized as follows. A first distance 'd11' that is a width of the second lower shield SD2, a second distance 'd12' that is a distance between the second lower shield SD2 and a semiconductor layer 150 formed below the first power line VL11, a third distance 'd13' that is a width of the semiconductor layer 150, a fourth distance 'd14' that is a distance between the semiconductor layer 150 and the first lower shield SD1, and a fifth distance 'd15' that is a width of the second lower shield SD2 may be about 5 µm, about 3 µm, about 9 µm, about 3 µm and about 5 µm, respectively. Moreover, a distance PD between the second pixel electrode PE2 and the fourth pixel electrode PE4 may be about 6.5 µm. Thus, a non-transparent width OA1 may be about 25 µm.

A metal pattern and a transparent electrode pattern that are formed on a boundary between the second pixel part P2 and the third pixel part P3 may be realized as follows. A first distance 'd21' that is a width of the second lower shield SD2, a second distance 'd22' that is a distance between the second lower shield SD2 and a semiconductor layer 150 formed below the second data line DL2, a third distance 'd23' that is a width of the semiconductor layer 150, a fourth distance 'd24' that is a distance between the semiconductor layers 150 that are formed below the second and third data lines DL2 and DL3, respectively, a fifth distance 'd25' that is a width of the semiconductor layer 150 formed below the third data line DL3, a sixth distance 'd26' that is a distance between the semiconductor layer 150 and the first lower shield SD1, and a seventh distance 'd27' that is a width of the first lower shield SD1 may be about 4 µm, about 2 µm, about 6 µm, about 6 µm, about 6 µm, about 2 µm and about 4 µm, respectively. Moreover, a distance PD between the third pixel electrode PE3 and the fifth pixel electrode PE5 may be about 6.5 µm. Thus, a non-transparent width OA2 may be about 30 µm.

In this case, when the second and third data lines DL2 and DL3 may be formed to have a greater thickness in a low resistively material such as copper (Cu), the non-transparent width OA1 may be maintained as about 25 µm.

According to the present exemplary embodiment, the first bus line BL1 and the second bus line BL2 may be formed on a first peripheral area PA1 due to the first and second power lines VL11 and VL21 that are disposed between pixel rows.

Thus, a horizontal power line formed along a horizontal direction (or a second direction) is removed from the display area DA, so that an aperture ratio of the LCD panel may be increased. In addition, a voltage drop is generated by a line resistance of the horizontal power line, so that a charge decrease of a pixel electrode generated at a first side of the display area DA may be prevented.

Moreover, the first connection electrode CT1 which connects the second data line DL2 and the third pad 430 and the second connection electrode CT2 which connects the third data line DL3 and the second pad 420 are electrically separated from each other and cross with each other, so that the pixel parts adjacent to each other share the first power line VL11 and may receive the same polarity data voltages. Therefore, a generation of a light leakage in a black state may be minimized between adjacent pixel parts and the number of the first power lines VL11 is decreased, so that an aperture ratio of a display substrate may be enhanced.

Figure 25:
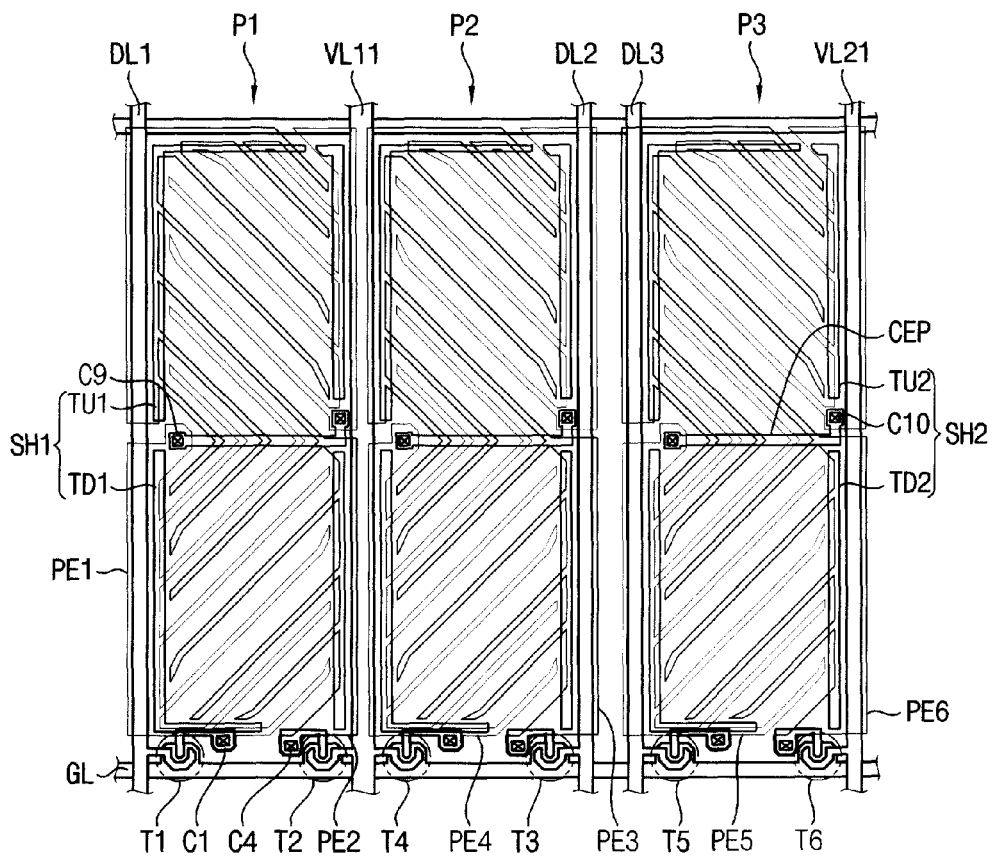
FIG. 25 is a plan view illustrating an LCD panel according to another exemplary embodiment of the present invention.
Figure 25:
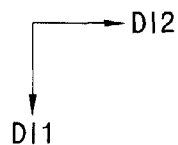

FIG. 25 is a plan view illustrating an LCD panel according to another exemplary embodiment of the present invention.

Referring to FIG. 25, the LCD panel 1000K may be substantially the same as the LCD panel 1000J of FIGS. 22 and 23 except for a first shield part SH1, a second shield part SH2 and a connection electrode pattern CEP. Hereinafter, any repetitive detailed explanation will hereinafter be omitted or simplified.

In a description of the first and second shield parts SH1 and SH2, the first pixel part P1 as an example will be described with reference to FIGS. 7, 24 and 25.

The first shield part SH1 includes a first upper trench TU1 and a first lower trench TD1 to be disposed adjacent to a self pixel part, that is, the first data line DL1 delivering a data voltage to the first pixel part P1. The gate insulation layer 102, the protection insulation layer 103 and the organic insulation layer 104 are removed to form the first upper trench TU1 and the first lower trench TD1. The second pixel electrode PE2 partially overlapped with an upper portion of the first data line DL1 is formed through the first upper trench TU1, and the first pixel electrode PE1 partially overlapped with a lower portion of the first data line DL1 is formed through the first lower trench TD1.

The second shield part SH2 is disposed adjacent to a first power line VL11 which delivers a voltage to the first pixel part P1. The second shield part SH2 includes a second upper trench TU2 and a second lower trench TD2. The gate insulation layer 102, the protection insulation layer 103 and the organic insulation layer 104 are removed to form the second upper trench TU2 and the second lower trench TD2. The first pixel electrode PE1 partially overlapped with an upper portion of the first power line VL11 is formed through the second upper trench TU2, and the second pixel electrode PE2 partially overlapped with a lower portion of the first power line VL11 is formed through the second lower trench TD2.

The connection electrode pattern CEP may be the first metal pattern. The connection electrode pattern CEP is extended from a center portion of the pixel area along the second direction DI2 to be electrically connected to the first pixel electrode PE1 disposed below the center portion of the pixel area and the first pixel electrode PE1 disposed above the center portion of the pixel area in a plan view. The connection electrode CEP is electrically connected to the first pixel electrode PE1 partially overlapped with the first data line DL1 through a ninth contact hole C9, and is electrically connected to the first pixel electrode PE1 partially overlapped with the first power line VL11 through a tenth contact hole C10.

Similar to the previous embodiment described in connection with FIGS. 1 to 4, the first and second shield parts SH1 and SH2 may prevent an electric field of the data line or the power line from being leaked, and may prevent a light leakage from being generated between the power line and the pixel electrode or between the data line and the pixel electrode. In addition, the first and second shield parts SH1 and SH2 have a structure in which the pixel electrode is formed through a trench, so that an aperture ratio of the display substrate may be enhanced in comparison with the display substrate according to the previous embodiment described in connection with FIGS. 1 to 4.

Figure 26:
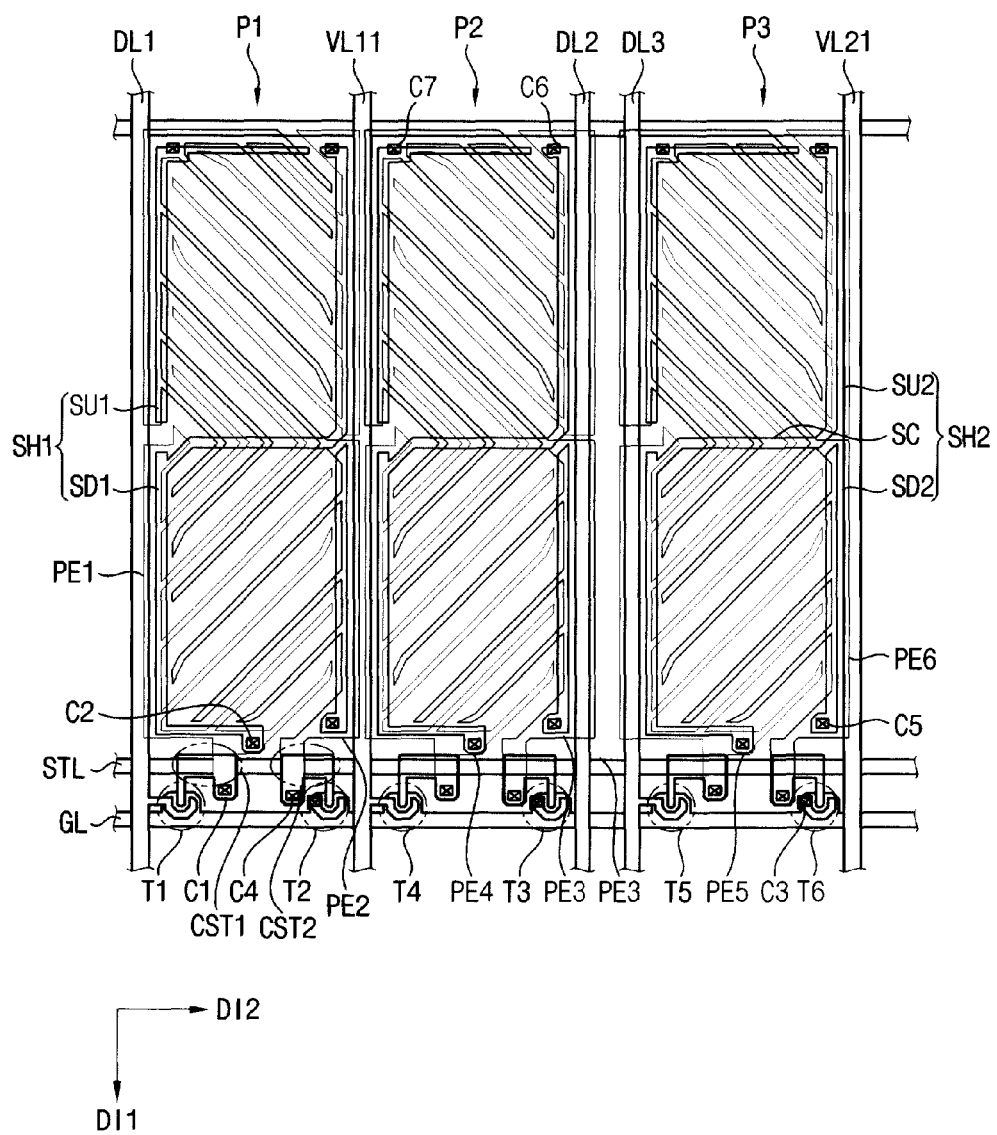
FIG. 26 is a plan view illustrating an LCD panel according to another exemplary embodiment of the present invention.

FIG. 26 is a plan view illustrating an LCD panel 1000L according to another exemplary embodiment of the present invention.

Referring to FIG. 26, the LCD panel 1000L further includes a storage line STL formed from a first metal pattern in comparison with the LCD panel 1000J of FIGS. 22 and 23.

The storage line STL is extended in the second direction DI2, and is disposed adjacent to the gate line GL. A storage voltage is applied to the storage line STL. The storage voltage may be a direct current (DC) having a predetermined level in spite of a frame.

For example, the storage line STL partially overlaps with extending portions extended from a drain electrode of the first switching element T1 included in the first pixel part P1 to form a first storage capacitor CST1, and partially overlaps with extending portions extended from a drain electrode of the second switching element T2 to form a second storage capacitor CST2. A variation of a voltage applied to the first pixel part P1 is decreased by the first and second storage capacitors, so that display quality may be enhanced.

The pixel part according to the present exemplary embodiment may include the first and second shield parts SH1 and SH2 formed as a first metal pattern, in a similar manner to an exemplary embodiment described in connection with FIGS. 1 to 4. Alternatively, the pixel part according to the present exemplary embodiment may include the first and second shield parts SH1 and SH2 of a trench structure, in a similar manner to another exemplary embodiment described in connection with FIGS. 6 and 7.

Figure 27:
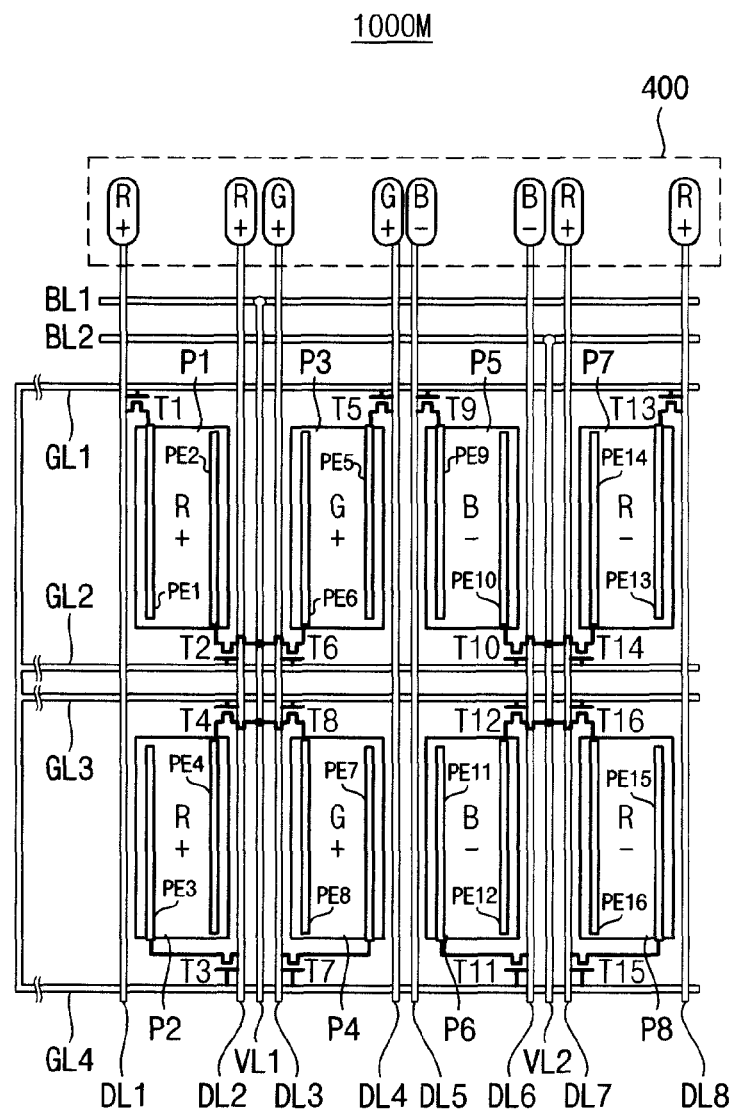
FIG. 27 is a plan view illustrating an LCD panel according to another exemplary embodiment of the present invention.

FIG. 27 is a plan view illustrating an LCD panel 1000M according to another exemplary embodiment of the present invention.

Referring to FIGS. 1 and 27, the LCD panel 1000M includes a pad part 400, a plurality of data lines DL1, DL2, DL3, DL4, DL5, DL6, DL7 and DL8, a first bus line BL1, a second bus line BL2, a first power line VL1, a second power line VL2, a first gate line GL1, a second gate line GL2, a third gate line GL3, a fourth gate line GL4 and a plurality of pixel parts P1, P2, P3, P4, P5, P6, P7 and P8. The plural pixel parts P1, P2, P3, P4, P5, P6, P7 and P8 include primary color pixels. The primary color pixels may be a red pixel, a green pixel and a blue pixel.

The pad part 400 includes a plurality of pads disposed at a first peripheral area PA1 of the LCD panel 1000M to be connected to respective data lines.

Each of the data lines DL1, DL2, DL3, DL4, DL5, DL6, DL7 and DL8 is extended in the first direction DI1, and is arranged in the second direction DI2.

The first bus line BL1 may be extended in the second direction DI2 to be disposed on the first peripheral area PA1 of the LCD panel 1000M. The second bus line BL2 may be extended in the second direction DI2 to be disposed on the first peripheral area PA1 adjacent to the first bus line BL1.

The first power line VL1 is connected to the first bus line BL1 to be extended in the first direction DI1. The second power line VL2 is connected to the second bus line BL2 to be extended in the first direction DI2. The first power line VL1 is disposed between two pixel rows adjacent to each other to provide pixel parts P1 and P3 of the pixel rows with a voltage, and the second power line VL2 is disposed between two pixel rows adjacent to each other to provide pixel parts P5 and P7 of the pixel rows with a voltage.

The first, second, third and fourth gate lines GL1, GL2, GL3 and GL4 are extended in the second direction DI2 to be arranged in the first direction DI1. The first, second, third and fourth gate lines GL1, GL2, GL3 and GL4 are electrically connected to each other to receive the same gate signal. As shown in FIG. 27, the first to fourth gate lines GL1, GL2, GL3 and GL4 may be connected to each other at a peripheral area of the LCD panel 1000M. In this case, a gate signal outputted from the gate driving part may be simultaneously applied to the first, second, third and fourth gate lines GL1, GL2, GL3 and GL4. Alternatively, the first to fourth gate lines GL1, GL2, GL3 and GL4 may be separated from each other. In this case, the gate driving part may simultaneously output the gate signal to each of the first to fourth gate lines GL1, GL2, GL3 and GL4. Accordingly, two pixel rows electrically connected to the first to fourth gate lines GL1, GL2, GL3 and GL4 may be simultaneously driven.

The plural pixel parts P1, P2, P3, P4, P5, P6, P7 and P8 include primary color pixels. The primary color pixels may be a red pixel, a green pixel and a blue pixel.

The first pixel part P1 includes a first pixel electrode PE1, a second pixel electrode PE2, a first switching element T1 and a second switching element T2. The first pixel electrode PE1 is connected to the first data line DL1 and the first gate line GL1 through the first switching element T1. The second pixel electrode PE2 is spaced apart from the first pixel electrode PE1 to be connected to the first power line VL1 and the second gate line GL2 through the second switching element T2.

The second pixel part P2 is adjacent to the first pixel part P1 along the first direction DI1 to include a third pixel electrode PE3, a fourth pixel electrode PE4, a third switching element T3 and a fourth switching element T4. The third pixel electrode PE3 is connected to the second data line DL2 and the fourth gate line GL4 through the third switching element T3. The fourth pixel electrode PE4 is spaced apart from the third pixel electrode PE3 to be connected to the first power line VL1 and the third gate line GL3 through the fourth switching element T4.

The third pixel part P3 is adjacent to the first pixel part P1 along the second direction DI2 to include a fifth pixel electrode PE5, a sixth pixel electrode PE6, a fifth switching element T5 and a sixth switching element T6. The fifth pixel electrode PE5 is connected to the fourth data line DL4 and the first gate line GL1 through the fifth switching element T5. The sixth pixel electrode PE6 is spaced apart from the fifth pixel electrode PE5 to be connected to the first power line VL1 and the second gate line GL2 through the sixth switching element T6.

The fourth pixel part P4 is adjacent to the second pixel part P2 along the second direction DI2 to include a seventh pixel electrode PE7, an eighth pixel electrode PE8, a seventh switching element T7 and an eighth switching element T8. The seventh pixel electrode PE7 is connected to the third data line DL3 and the fourth gate line GL4 through the seventh switching element T7. The eighth pixel electrode PE8 is spaced apart from the seventh pixel electrode PE7 to be connected to the first power line VL1 and the third gate line GL3 through the eighth switching element T8.

The fifth pixel part P5 is adjacent to the third pixel part P3 along the second direction DI2 to include a ninth pixel electrode PE9, a tenth pixel electrode PE10, a ninth switching element T9 and a tenth switching element T10. The ninth pixel electrode PE9 is connected to the fifth data line DL5 and the first gate line GL1 through the ninth switching element T9. The tenth pixel electrode PE10 is spaced apart from the ninth pixel electrode PE9 to be connected to the second power line VL2 and the second gate line GL2 through the tenth switching element T10.

The sixth pixel part P6 is adjacent to the fifth pixel part P5 along the first direction DI1 to include an eleventh pixel electrode PE11, a twelfth pixel electrode PE12, an eleventh switching element T11 and a twelfth switching element T12. The eleventh pixel electrode PE11 is connected to the sixth data line DL6 and the fourth gate line GL4 through the eleventh switching element T11. The twelfth pixel electrode PE12 is spaced apart from the eleventh pixel electrode PE11 to be connected to the second power line VL2 and the third gate line GL3 through the twelfth switching element T12.

The seventh pixel part P7 is adjacent to the fifth pixel part P5 along the second direction DI2 to include a thirteenth pixel electrode PE13, a fourteenth pixel electrode PE14, a thirteenth switching element T13 and a fourteenth switching element T14. The thirteenth pixel electrode PE13 is connected to the eighth data line DL8 and the first gate line GL1 through the thirteenth switching element T13. The fourteenth pixel electrode PE14 is spaced apart from the thirteenth pixel electrode PE13 to be connected to the second power line VL2 and the second gate line GL2 through the fourteenth switching element T14.

The eighth pixel part P8 is adjacent to the seventh pixel part P7 along the first direction DI1 to include a fifteenth pixel electrode PE15, a sixteenth pixel electrode PE16, a fifteenth switching element T15 and a sixteenth switching element T16. The fifteenth pixel electrode PE15 is connected to the seventh data line DL7 and the fourth gate line GL4 through the fifteenth switching element T15. The sixteenth pixel electrode PE16 is spaced apart from the fifteenth pixel electrode PE15 to be connected to the second power line VL2 and the third gate line GL3 through the sixteenth switching element T16.

A voltage of a first polarity (for example, a negative (−) polarity) with respect to a reference voltage is applied to the first power line VL1, and a voltage of a second polarity (for example, a positive (+) polarity) with respect to the reference voltage is applied to the second power line VL2. A voltage of a second polarity (a positive (+) polarity) having a level higher than a voltage applied to the first power line VL1 is applied to the first, second, third and fourth data lines DL1, DL2, DL3 and DL4, and a voltage of a first polarity (for example, a negative (−) polarity) having a level lower than a voltage applied to the second power line VL2 is applied to the fifth, sixth, seventh and eighth data lines DL5, DL6, DL7 and DL8. For example, a level of the first polarity (−) may be lower than a level of the reference voltage, and a level of the second polarity (+) may be higher than a level of the reference voltage.

According to the present exemplary embodiment, one pixel row receives a data voltage through two data lines and two pixel columns receive one gate signal through four gate lines, so that two pixel columns may be driven for one horizontal period (1H). That is, the LCD panel 1000M may be driven at a high speed. Moreover, one power line is shared by two pixel parts and the same polarity data voltage is applied via the one power line, so that a generation of a light leakage in a black state may be minimized. Moreover, the number of the power lines is decreased, so that an aperture ratio of a display substrate may be enhanced.

The pixel parts according to the present exemplary embodiment may include the first and second shield parts SH1 and SH2 similar to an exemplary embodiment described in connection with FIGS. 1 to 4 and another exemplary embodiment described in connection with FIGS. 6 and 7. The first shield part SH1 according to the present exemplary embodiment is disposed adjacent to a data line electrically connected to a pixel electrode of a self pixel part, the second shield part SH2 according to the present exemplary embodiment is disposed adjacent to a power line electrically connected to a pixel electrode of the self pixel part, and the first and second shield parts SH1 and SH2 are electrically connected to pixel electrodes of the self pixel part. That is, in a similar manner to the previous exemplary embodiment described in connection with FIGS. 1 to 4, the first and second shield parts SH1 and SH2 may be formed from a first metal pattern. Alternatively, in a similar manner to the previous exemplary embodiment described in connection with FIGS. 6 and 7, the first and second shield parts SH1 and SH2 may be formed of a trench structure. The LCD panel 1000M according to the present exemplary embodiment may further include first to fourth storage lines adjacent to the first to fourth gate lines, respectively.

Figure 28:
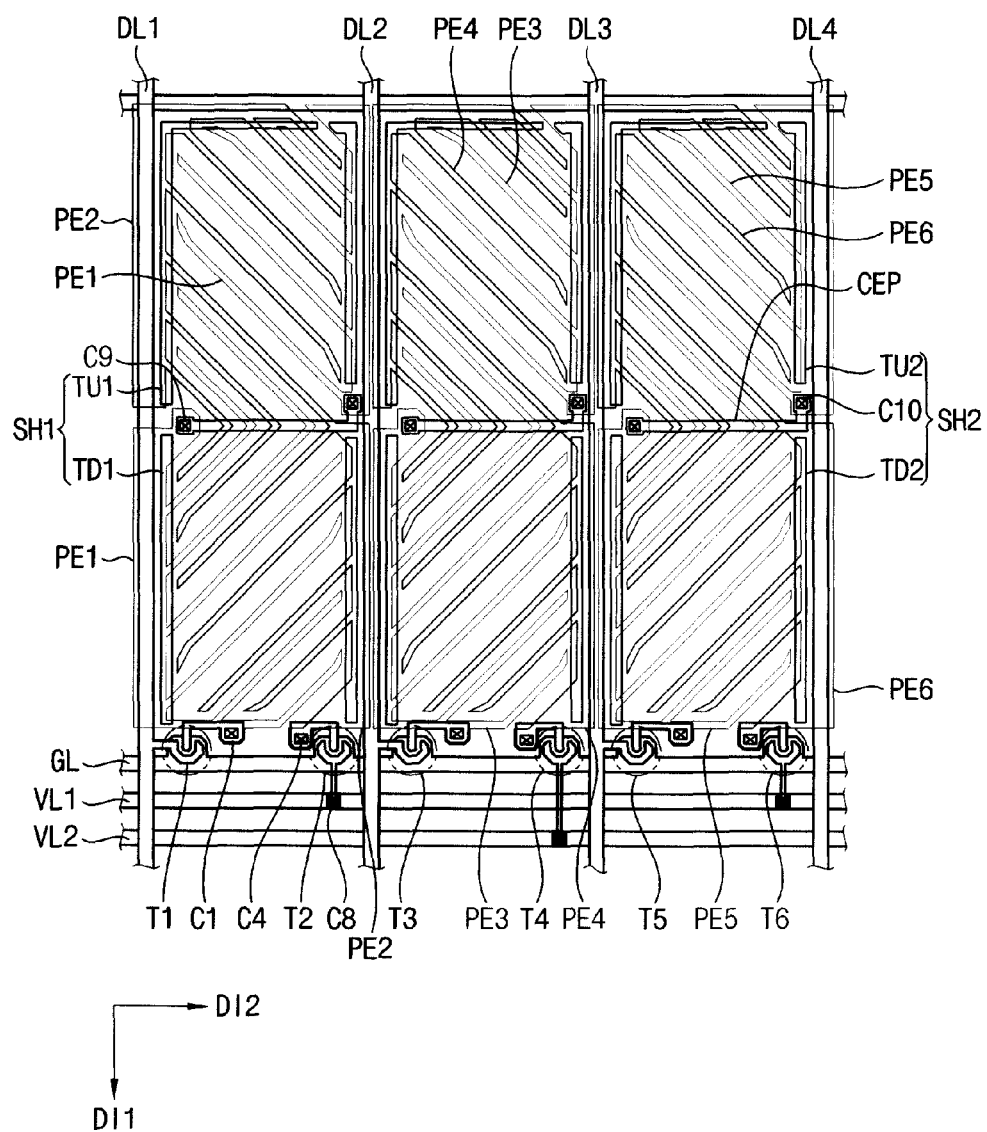
FIG. 28 is a plan view illustrating an LCD panel according to another exemplary embodiment of the present invention.

FIG. 28 is a plan view illustrating an LCD panel 1000N according to another exemplary embodiment of the present invention.

Referring to FIG. 28, the LCD panel 1000N includes a plurality of data lines DL1, DL2, DL3 and DL4, a gate line GL, a first power line VL1, a second power line VL2 and a plurality of pixel parts P1, P2 and P3.

The data lines DL1, DL2, DL3 and DL4 are extended in a first direction DI1, and are arranged in a second direction DI2 crossing the first direction DI1.

The gate line GL is extended in the second direction DI2.

The first power line VL1 is extended in the second direction DI2, and is disposed adjacent to the gate line GL.

The second power line VL2 is extended in the second direction DI2, and is disposed adjacent to the first power line VL1.

The first pixel part P1 includes a first pixel electrode PE1, a second pixel electrode PE2, a first switching element T1, a second switching element T2, a connection electrode pattern CEP, a first shield part SH1 and a second shield part SH2. The first pixel electrode PE1 is connected to the first data line DL1 and the gate line GL through the first switching element T1. The second pixel electrode PE2 is spaced apart from the first pixel electrode PE1, and is connected to the first power line VL1 and the gate line GL through the second switching element T2.

The connection electrode pattern CEP may be the first metal pattern. The connection electrode pattern CEP is extended in the second direction DI2 at a center portion of the pixel part area to electrically connect with a first pixel electrode PE1 disposed below the center portion of the pixel part area and the first pixel electrode PE1 disposed above the center portion of the pixel part area. The connection electrode pattern CEP is electrically connected to the first pixel electrode PE1 partially overlapped with the first data line DL1 through a ninth contact hole C9, and is electrically connected to the first pixel electrode PE1 partially overlapped with the second data line DL2 through a tenth contact hole C10.

Referring to FIG. 7, the first shield part SH1 is disposed adjacent to a self data line, that is, the first data line DL1, which delivers a data voltage to the first pixel part P1. The first shield part SH1 includes a first upper trench TU1 and a first lower trench TD1. The gate insulation layer 102, the protection insulation layer 103 and the organic insulation layer 104 are removed to form the first upper trench TU1 and the first lower trench TD1. The second pixel electrode PE2 partially overlapped with an upper portion of the first data line DL1 is formed through the first upper trench TU1, and the first pixel electrode PE1 partially overlapped with a lower portion of the first data line DL1 is formed through the first lower trench TD1. The second shield part SH2 is disposed adjacent to a neighboring data line, which is the second data line DL2, which delivers a data voltage to a neighboring pixel part P2. The second shield part SH2 includes a second upper trench TU2 and a second lower trench TD2. The gate insulation layer 102, the protection insulation layer 103 and the organic insulation layer 104 are removed to form the second upper trench TU2 and the second lower trench TD2. The first pixel electrode PE1 partially overlapped with an upper portion of the second data line DL2 is formed through the second upper trench TU2, and the second pixel electrode PE2 partially overlapped with a lower portion of the second data line DL2 is formed through the second lower trench TD2.

In a similar manner to the previous exemplary embodiment described in connection with FIGS. 1 to 4, the first and second shield parts SH1 and SH2 may prevent an electric field of the data line or the power line from being leaked, and may prevent a light leakage from being generated between the power line and the pixel electrode or between the data line and the pixel electrode. In addition, the first and second shield parts SH1 and SH2 have a structure in which the pixel electrode is formed through a trench, so that an aperture ratio of the display substrate may be enhanced in comparison with the display substrate according to the previous exemplary embodiment described in connection with FIGS. 1 to 4.

As described above, according to exemplary embodiments of the present invention, pixel parts adjacent to each other in the display substrate have a same polarity, so that a light leakage may be prevented. Moreover, one power line is shared by the pixel parts adjacent to each other, so that an aperture ratio of a display substrate may be enhanced.

The foregoing is illustrative of the present invention and is not to be construed as limiting thereof. In the claims, meansplus-function clauses are intended to cover the structures described herein as performing the recited function and not only structural equivalents but also equivalent structures. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
a substrate;
a gate line extending along a first direction and disposed on the substrate;
a first power line extending along a second direction crossing the first direction;
a second power line extending along the second direction and adjacent to the first power line;
a first data line, a second data line, a third data line, and a fourth data line extending along the second direction, respectively;
a first pixel unit comprising a first sub-pixel unit and a second sub-pixel unit sequentially disposed along the first direction, wherein the first sub-pixel unit comprises a first pixel electrode and a second pixel electrode electrically connected to the first data line and the first power line, respectively, and wherein the second sub-pixel unit comprises a third pixel electrode and a fourth pixel electrode electrically connected to the second data line and the first power line, respectively; and
a second pixel unit adjacent to the first pixel unit and comprising a third sub-pixel unit and a fourth sub-pixel unit sequentially disposed along the first direction, wherein the third sub-pixel unit comprises a fifth pixel electrode and a sixth pixel electrode electrically connected to the third data line and the second power line, respectively, and wherein the fourth sub-pixel unit comprises a seventh pixel electrode and an eighth pixel electrode electrically connected to the fourth data line and the second power line, respectively,
wherein a polarity of a voltage applied to the first power line is different from a polarity of a voltage applied to the second power line.

2. The LCD device of claim 1, further comprising a first bus line disposed in parallel with the gate line and connected to the first power line.

3. The LCD device of claim 2, further comprising:
a third data line, a fourth data line and a second power line that are insulated from the gate line and cross the gate line;
a fifth switching element connected to the gate line and the third data line;
a sixth switching element connected to the gate line and the second power line;
a seventh switching element connected to the gate line and the fourth data line;
an eighth switching element connected to the gate line and the second power line; and
a fifth pixel electrode, a sixth pixel electrode, a seventh pixel electrode and an eighth pixel electrode that are respectively connected to the fifth switching element, the sixth switching element, the seventh switching element and the eighth switching element.

4. The LCD device of claim 3, further comprising a second connection line connected to the second power line,
wherein the sixth switching element is connected to the second connection line, and the eighth switching element is connected to the second connection line.

5. The LCD device of claim 3, further comprising a second bus line disposed in parallel with the gate line to be connected to the second power line.

6. The LCD device of claim 3, wherein the first power line is configured to receive a voltage of a first polarity with respect to a reference voltage, and the second power line is configured to receive a voltage of a second polarity with respect to the reference voltage, the first voltage polarity being opposite to the second voltage polarity.

7. The LCD device of claim 3, further comprising:
a first shield pattern connected to the first pixel electrode; and
a second shield pattern connected to the second pixel electrode.

8. The LCD device of claim 7, further comprising a first connection line connected to the first power line,
wherein a portion of the first shield pattern overlaps with the first pixel electrode.

9. The LCD device of claim 7, wherein the first connection line is disposed on a layer identical to the first pixel electrode, the second pixel electrode, the third pixel electrode and the fourth pixel electrode.

10. The LCD device of claim 3, further comprising a first connection line connected to the first power line,
wherein the first connection line is disposed on a layer identical to the first pixel electrode, the second pixel electrode, the third pixel electrode and the fourth pixel electrode.

11. The LCD device of claim 2, further comprising:
a first shield pattern connected to the first pixel electrode; and
a second shield pattern connected to the second pixel electrode.

12. The LCD device of claim 11, wherein a portion of the first shield pattern overlaps with the first pixel electrode.

13. The LCD device of claim 11, further comprising a first connection line connected to the first power line,
wherein the first connection line is disposed on a layer identical to the first pixel electrode, the second pixel electrode, the third pixel electrode and the fourth pixel electrode.

14. The LCD device of claim 2, further comprising a first connection line connected to the first power line,
wherein the first connection line is disposed on a layer identical to the first pixel electrode, the second pixel electrode, the third pixel electrode and the fourth pixel electrode.

15. The LCD device of claim 1, further comprising a first connection line connected to the first power line,
wherein the first connection line is disposed on a layer identical to the first pixel electrode, the second pixel electrode, the third pixel electrode and the fourth pixel electrode.

16. The LCD device of claim 15, wherein a polarity of a voltage applied to the first pixel electrode is different from a polarity of a voltage applied to the fifth pixel electrode with respect to a reference voltage.

17. The LCD device of claim 1, further comprising a storage line positioned in parallel with the gate line to overlap with portions of the first pixel electrode, the second pixel electrode, the third pixel electrode and the fourth pixel electrode.

18. The LCD device of claim 1, wherein the first pixel electrode and the second pixel electrode form a first pixel part comprising a first area and a second area, an interval distance between the first pixel electrode and the second pixel electrode in the first area being different from an interval distance between the first pixel electrode and the second pixel electrode in the second area.

19. The LCD device of claim 1, further comprising a storage line disposed in parallel with the gate line to overlap with a portion of a first switching element configured to electrically connect the first pixel electrode and the first data line, a portion of a second switching element configured to electrically connect the second pixel electrode and the first power line, a portion of a third switching element configured to electrically connect the third pixel electrode and the second data line, and a portion of a fourth switching element configured to electrically connect the fourth pixel electrode and the first power line.

20. A liquid crystal display (LCD) device, comprising:
a substrate;
a gate line disposed on the substrate;
a first data line, a second data line, and a first power line that are disposed on the substrate, insulated from the gate line, and cross the gate line;
a first switching element connected to the gate line and the first data line;
a second switching element connected to the gate line and the first power line;
a third switching element connected to the gate line and the second data line;
a fourth switching element connected to the gate line and the first power line; and
a first pixel electrode, a second pixel electrode, a third pixel electrode, and a fourth pixel electrode that are respectively connected to the first switching element, the second switching element, the third switching element, and the fourth switching element;
a first bus line disposed in parallel with the gate line and connected to the first power line;
a third data line, a fourth data line, and a second power line that are insulated from the gate line and cross the gate line;
a fifth switching element connected to the gate line and the third data line;
a sixth switching element connected to the gate line and the second power line;
a seventh switching element connected to the gate line and the fourth data line;
an eighth switching element connected to the gate line and the second power line; and
a fifth pixel electrode, a sixth pixel electrode, a seventh pixel electrode, and an eighth pixel electrode that are connected to the fifth switching element, the sixth switching element, the seventh switching element and the eighth switching element, respectively.

21. The LCD device of claim 20, further comprising a second bus line disposed in parallel with the gate line to be connected to the second power line.

22. The LCD device of claim 20, wherein the first power line is configured to receive a voltage of a first polarity with respect to a reference voltage, and the second power line is configured to receive a voltage of a second polarity with respect to the reference voltage, the first voltage polarity being opposite to the second voltage polarity.

23. The LCD device of claim 22, wherein the first pixel electrode and the second pixel electrode form a first pixel part, the third pixel electrode and the fourth pixel electrode form a second pixel part, the fifth pixel electrode and the sixth pixel electrode form a third pixel part, the seventh pixel electrode and the eighth pixel electrode form a fourth pixel part, the first pixel part, the second pixel part, the third pixel part and the fourth pixel part sequentially repeat in a row having the first power line disposed between the second pixel part and the third pixel part.

24. The LCD device of claim 23, further comprising:
a fifth pixel part disposed between the first pixel part and the second pixel part; and
a sixth pixel part disposed between the third pixel part and the fourth pixel part.

25. The LCD device of claim 20, further comprising a second connection line connected to the second power line,
wherein the sixth switching element is connected to the second connection line, and the eighth switching element is connected to the second connection line.

26. The LCD device of claim 20, further comprising:
a first shield pattern connected to the first pixel electrode; and
a second shield pattern connected to the second pixel electrode.

27. The LCD device of claim 26, wherein a portion of the first shield pattern overlaps with the first pixel electrode.

28. The LCD device of claim 26, further comprising a first connection line connected to the first power line,
wherein the first connection line is disposed on a layer identical to the first pixel electrode, the second pixel electrode, the third pixel electrode and the fourth pixel electrode.

29. The LCD device of claim 28, wherein a polarity of a voltage applied to the first pixel electrode is different from a polarity of a voltage applied to the second pixel electrode with respect to a reference voltage.

30. The LCD device of claim 26, wherein a polarity of a voltage applied to the first pixel electrode is different from a polarity of a voltage applied to the second pixel electrode with respect to a reference voltage.

31. The LCD device of claim 20, further comprising a first connection line connected to the first power line,
wherein the first connection line is disposed on a layer identical to the first pixel electrode, the second pixel electrode, the third pixel electrode and the fourth pixel electrode.

32. The LCD device of claim 31, wherein a polarity of a voltage applied to the first pixel electrode is different from a polarity of a voltage applied to the second pixel electrode with respect to a reference voltage.

33. The LCD device of claim 20, wherein a polarity of a voltage applied to the first pixel electrode is different from a polarity of a voltage applied to the second pixel electrode with respect to a reference voltage.

34. A liquid crystal display (LCD) device, comprising:
a substrate:
a gate line disposed on the substrate;
a first data line, a second data line, and a first power line that are disposed on the substrate, insulated from the gate line, and cross the gate line;
a first switching element connected to the gate line and the first data line;
a second switching element connected to the gate line and the first power line;
a third switching element connected to the gate line and the second data line;
a fourth switching element connected to the gate line and the first power line;
a first pixel electrode, a second pixel electrode, a third pixel electrode, and a fourth pixel electrode that are respectively connected to the first switching element, the second switching element, the third switching element and the fourth switching element;
a first shield pattern connected to the first pixel electrode; and
a second shield pattern connected to the second pixel electrode.

35. The LCD device of claim 34, wherein a portion of the first shield pattern overlaps with the first pixel electrode.

36. The LCD device of claim 34, further comprising a first connection line connected to the first power line,
wherein the first connection line is disposed on a layer identical to the first pixel electrode, the second pixel electrode, the third pixel electrode and the fourth pixel electrode.

37. The LCD device of claim 36, wherein a polarity of a voltage applied to the first pixel electrode is different from a polarity of a voltage applied to the second pixel electrode with respect to a reference voltage.

38. The LCD device of claim 34, wherein a polarity of a voltage applied to the first pixel electrode is different from a polarity of a voltage applied to the second pixel electrode with respect to a reference voltage.

39. The LCD device of claim 34, wherein the first pixel electrode comprises a lower stem portion disposed on a first side of a first pixel part and an upper stem portion disposed on a second side of the first pixel part spaced apart from the first side,
the second pixel electrode comprises a lower stem portion on the second side of the first pixel part and an upper stem portion on the first side of the first pixel part,
the first shield pattern comprises a first upper shield disposed adjacent to the first data line overlapped with a portion of the second pixel electrode upper stem portion and a first lower shield spaced apart from the first upper shield adjacent to the first data line overlapped with a portion of the first pixel electrode lower stem portion,
the second shield pattern comprises a second upper shield disposed adjacent to the second data line overlapped with a portion of the first pixel electrode upper stem portion and a second lower shield spaced apart from the second upper shield adjacent to the second data line overlapped with a portion of the second pixel electrode lower stem portion.

40. The LCD device of claim 39, further comprising a connection shield extending from the first side of the first pixel part to the second side of the first pixel part at a center portion to connect the second upper shield to the first lower shield.

41. The LCD device of claim 40, wherein the first pixel part and the second pixel part are adjacent to each other.

42. The LCD device of claim 41, wherein a polarity of the first pixel part is equal to a polarity of the second pixel part.

43. The LCD device of claim 39, wherein the first shield pattern and the second shield pattern comprise one of a metal pattern disposed in the identical layer as the gate line and a trench pattern.

44. The LCD device of claim 39, wherein the third pixel electrode comprises a lower stem portion disposed on a first side of a second pixel part and an upper stem portion disposed on a second side of the second pixel part spaced apart from the first side,
the fourth pixel electrode comprises a lower stem portion on the second side of the second pixel part and an upper stem portion on the first side of the second pixel part,
the first shield pattern further comprises a third upper shield disposed adjacent to the second data line overlapped with a portion of the fourth pixel electrode upper stem portion and a third lower shield spaced apart from the first upper shield adjacent to the second data line overlapped with a portion of the third pixel electrode lower stem portion,
the second shield pattern further comprises a fourth upper shield disposed adjacent to the first power line overlapped with a portion of the third pixel electrode upper stem portion and a fourth lower shield spaced apart from the fourth upper shield adjacent to the first power line overlapped with a portion of the fourth pixel electrode lower stem portion.

45. The LCD device of claim 39, wherein the lower stem portion of the first pixel electrode and the upper stem portion of the second pixel electrode are of a first width, and the upper stem portion of the first electrode and the lower stem portion of the second pixel electrode are of a second width, the first width being greater than the second width of the first pixel part disposed in an upper display area portion, and the second width being greater than the first width of the first pixel part disposed in a lower display area portion.

* * * * *